(12) United States Patent
Wang et al.

(10) Patent No.: US 12,022,180 B2
(45) Date of Patent: *Jun. 25, 2024

(54) ARRAY CAMERA MODULE AND APPLICATION THEREOF

(71) Applicant: NINGBO SUNNY OPOTECH CO., LTD., Zhejiang (CN)

(72) Inventors: Mingzhu Wang, Zhejiang (CN); Bojie Zhao, Zhejiang (CN); Zhenyu Chen, Zhejiang (CN); Nan Guo, Zhejiang (CN); Takehiko Tanaka, Nara (JP)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/488,876

(22) Filed: Sep. 29, 2021

(65) Prior Publication Data

US 2022/0021792 A1    Jan. 20, 2022

Related U.S. Application Data

(63) Continuation of application No. 16/472,425, filed as application No. PCT/CN2017/118337 on Dec. 25, 2017, now Pat. No. 11,165,941.

(30) Foreign Application Priority Data

Dec. 23, 2016  (CN) .......................... 201611207393.9
Apr. 1, 2017   (CN) .......................... 201710214811.5
(Continued)

(51) Int. Cl.
*H04N 23/57*    (2023.01)
*G01N 15/06*    (2024.01)
(Continued)

(52) U.S. Cl.
CPC ......... *H04N 23/57* (2023.01); *G01N 15/0656* (2013.01); *G03B 17/02* (2013.01);
(Continued)

(58) Field of Classification Search
CPC ............... H04N 5/2257; H04N 5/2253; H04N 5/2254; H04N 5/2251; G01N 15/0656; G03B 17/02; G03B 17/28; H04M 1/0264
See application file for complete search history.

(56) References Cited

U.S. PATENT DOCUMENTS 6,795,120 B2    9/2004  Takagi et al.
6,893,169 B1    5/2005  Exposito et al.
(Continued)

FOREIGN PATENT DOCUMENTS

CA    2 752 491    8/2010
CN    1591884      3/2005
(Continued)

OTHER PUBLICATIONS

International Search Report issued Mar. 14, 2018 in International Application No. PCT/CN2017/118337.

*Primary Examiner* — Padma Haliyur
(74) *Attorney, Agent, or Firm* — Wenderoth, Lind & Ponack, L.L.P.

(57) ABSTRACT

The present invention discloses an array camera module and application thereof, wherein the array camera module comprises at least one optical lens and at least one circuit board assembly. The circuit board assembly further comprises at least one photosensitive chip, at least one circuit board, and at least one electronic component, wherein the photosensitive chip and the circuit board are conductively connected, at least one of the electronic components is attached to a back face of the circuit board, and the optical lens is held in a photosensitive path of the photosensitive chip. In this way, (Continued)

at least one of the length and the width of the array camera module can be reduced, so as to be beneficial to the miniaturization of the array camera module, so that the array camera module can be conveniently applied to a light-weighted and thinned electronic device.

13 Claims, 51 Drawing Sheets

(30) Foreign Application Priority Data

| Apr. 1, 2017 | (CN) | 201710214886.3 |
| Apr. 1, 2017 | (CN) | 201710214887.8 |
| Apr. 1, 2017 | (CN) | 201720344605.1 |
| Apr. 1, 2017 | (CN) | 201720344964.7 |
| Apr. 1, 2017 | (CN) | 201720346336.2 |

(51) Int. Cl.
*G03B 17/02* (2021.01)
*H04M 1/02* (2006.01)
*H04N 23/54* (2023.01)
*H04N 23/55* (2023.01)

(52) U.S. Cl.
CPC .......... *H04M 1/0264* (2013.01); *H04N 23/54* (2023.01); *H04N 23/55* (2023.01)

(56) References Cited

U.S. PATENT DOCUMENTS

| 7,045,888 | B2 | 5/2006 | Tsai et al. |
| 9,313,389 | B2* | 4/2016 | Chuang ................ H04N 5/2258 |
| 9,681,032 | B1* | 6/2017 | Tam ....................... H04N 23/54 |
| 2004/0166763 | A1 | 8/2004 | Hanada et al. |
| 2006/0091487 | A1 | 5/2006 | Hanada et al. |
| 2008/0273111 | A1 | 11/2008 | Gustavsson et al. |
| 2016/0286169 | A1 | 9/2016 | Sannala |
| 2016/0381260 | A1 | 12/2016 | Narayanswamy |
| 2017/0012069 | A1* | 1/2017 | Rudmann ............... H01L 24/48 |
| 2017/0244872 | A1 | 8/2017 | Wang et al. |
| 2018/0020160 | A1* | 1/2018 | Lin ........................ H04N 5/247 |
| 2018/0170279 | A1 | 6/2018 | Achenbach et al. |
| 2018/0226443 | A1 | 8/2018 | Yu et al. |

FOREIGN PATENT DOCUMENTS

| CN | 104486465 | 4/2015 |
| CN | 105187697 | 12/2015 |
| CN | 105611134 | 5/2016 |
| CN | 105681637 | 6/2016 |
| CN | 105744131 | 7/2016 |
| CN | 105763780 | 7/2016 |
| CN | 106131386 | 11/2016 |
| CN | 207251756 | 4/2018 |
| EP | 3 334 145 | 6/2018 |
| JP | 2006-148473 | 6/2006 |
| JP | 2007-306282 | 11/2007 |
| KR | 10-1488831 | 2/2015 |

* cited by examiner

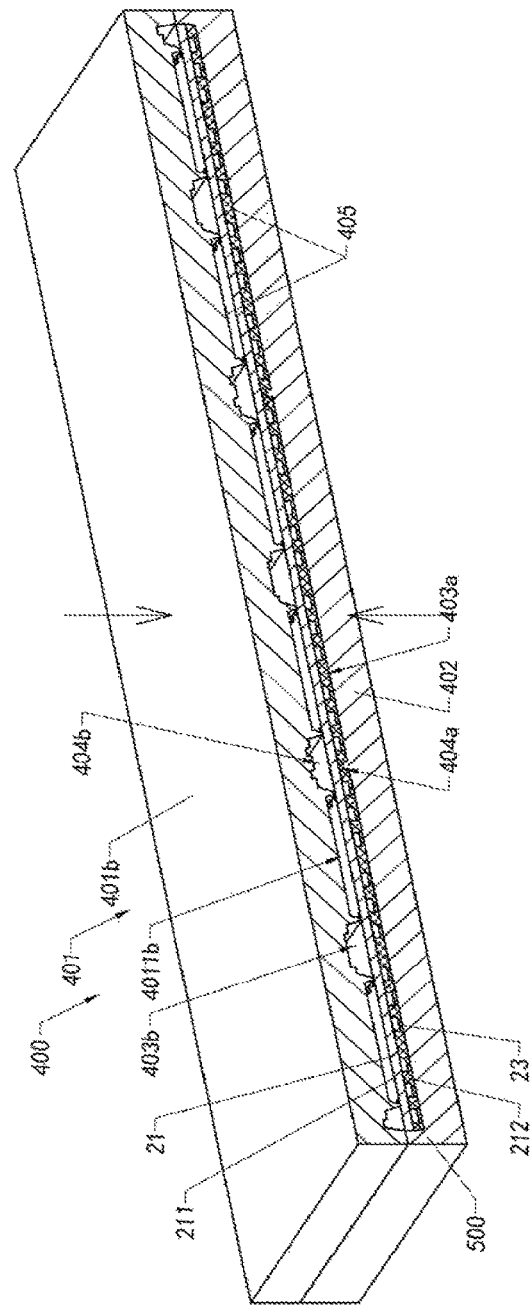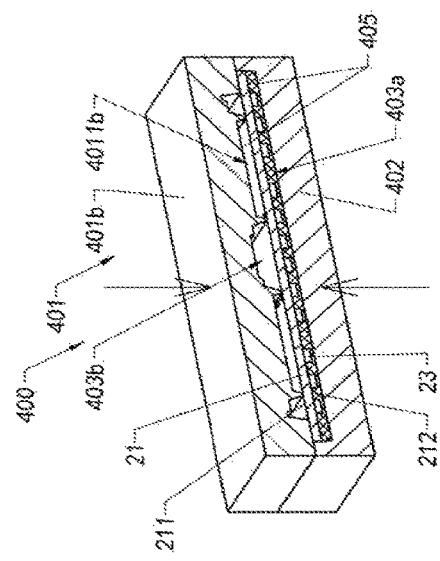
Fig.16A
Fig.16B

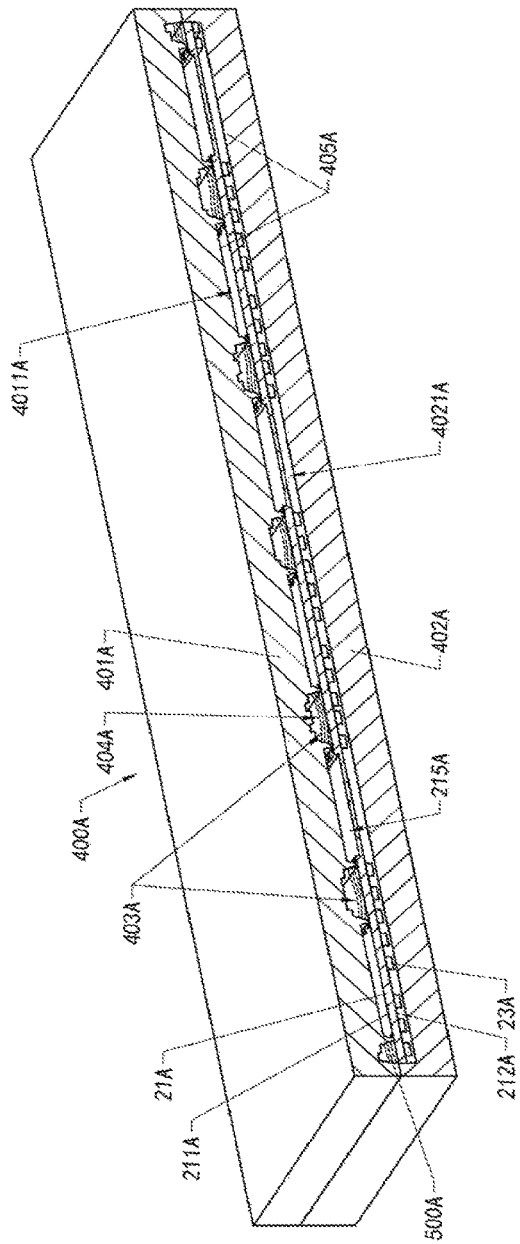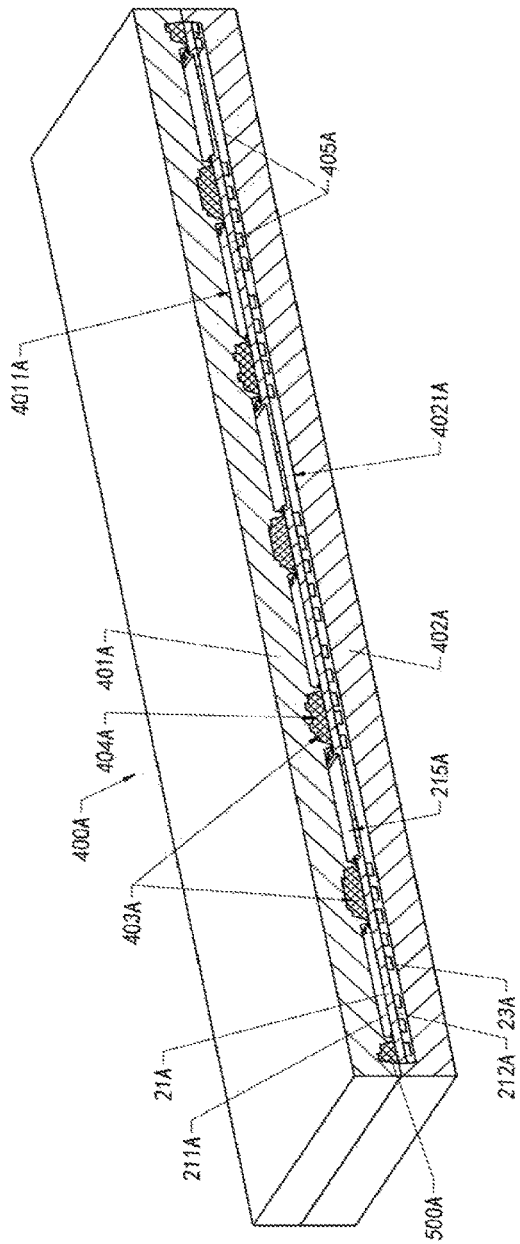
Fig. 79
Fig. 80

ARRAY CAMERA MODULE AND APPLICATION THEREOF

TECHNICAL FIELD

The present invention relates to the field of optical imaging, and in particular, to an array camera module and application thereof.

BACKGROUND

It is an important trend for portable electronic devices to become more intelligent, lighter and thinner. During the procedure that the portable electronic devices are developed to be more intelligent, lighter and thinner, structures of various portion with which the portable electronic devices are configured are inevitably required to be further minimized, which also means that the portable electronic devices impose more strict requirements on the size and imaging quality of a camera module, which is one of the standard configurations of the portable electronic devices. Since double-lens camera modules are advantageous over single-lens camera modules in imaging, the double-lens camera module has gradually become the first choice for the portable electronic devices in recent years. However, the volume of the double-lens camera module is larger compared to the single-lens camera modules. Therefore, how to reduce the volume of the double camera module is an urgent technical problem to be resolved in the art.

Current double-lens camera modules are similar to conventional single-lens camera modules in structure and manufacturing process, which mainly comprises the following steps: attaching two photosensitive chips on a front face of a circuit board respectively in a mutually spaced manner; disposing a plurality of passive electronic components around the photosensitive chip by attaching the plurality of passive electronic components to the front face of the circuit board in a mutually spaced manner; attaching a prefabricated lens frame to the front face of the circuit board by means of glue and keeping a safe distance between the inner surface of the lens frame and the outer surface of the passive electronic component, and enabling a photosensitive area of each photosensitive chip to correspond to each light through hole of the lens frame respectively; attaching a lens to the lens frame directly, or attaching the lens to the lens frame by means of a motor or a lens tube, and enabling each lens to be held in a photosensitive path of each photosensitive chip. Although the current double-lens camera modules are advantageous over the single-lens camera modules in imaging, they still have numerous defects.

For example, in order to further improve the imaging capability of the double-lens camera module to meet the requirement for the portable electronic devices to become more intelligent, the photosensitive chip of the double-lens camera module requires larger photosensitive area, and more passive electronic components with larger size are also needed. However, due to the current packaging process of the double-lens camera module, on one hand, the passive electronic components need to be disposed in a circumferential direction of the photosensitive chip, and on the other hand, a safe distance needs to be reserved between adjacent passive electronic components to avoid interference. In this way, the size of the double-lens camera module may be increased further, which is disadvantageous for the miniaturization of the double-lens camera module, thereby resulting in the development trend of the double-lens camera module going against the development trend of the portable electronic device. In other words, under conditions of the current packaging process of the double-lens camera module, improving the imaging capability of the double-lens camera module by increasing the photosensitive area of the photosensitive chip and the number and size of the passive electronic components may inevitably result in increasingly larger double-lens camera modules. Therefore, how to further improve the imaging capability of the double-lens camera module on the premise of reducing the volume of the double-lens camera module is an urgent technical problem to be resolved in the art.

In addition, array camera modules manufactured by the current packaging process also have other defects. For example, a lens frame needs to be prefabricated, and generally, the lens frame is an injection molding member. Since the lens frame is small in thickness and relatively larger in length and width, deformation may occur to the lens frame, which may affect the flatness of the lens frame, thereby affecting the imaging capability of the double-lens camera module. Moreover, it can be understood that the smaller the thickness and the larger the length and width of the lens frame, the larger the probability that the lens frame is deformed and the larger the amplitude of the deformation of the lens frame, which may affect the imaging capability of the double-lens camera module more significantly. Also for example, the prefabricated lens frame needs to be attached to the front face of the circuit board by means of glue. Firstly, since glue is fluid, in the process, the glue may readily contaminate the inner surface of the lens frame and the outer surface of the passive electronic component, and even may contaminate a photosensitive surface of the photosensitive chip with poor control over a manufacturing procedure. Once the above case occurs, the imaging capability of the double-lens camera module may be affect, or even, the double-lens camera module may be useless. Secondly, after the lens frame is attached to the front face of the circuit board by means of glue, baking needs to be performed so as to solidify the glue. In the process, both the uniformity of the glue applied and the consistence of the shrinking of the glue disposed in each position may affect the flatness of the lens frame. Once the flatness of the lens frame is affected, the degree of overlapping between the central axis of a lens and the central axis of a photosensitive chip may be affected, and the coaxiality of two optical systems formed by the lens and the photosensitive chip may also be affected, thereby greatly affecting the imaging capability of the double-lens camera module.

SUMMARY

An object of the present invention is to provide an array camera module and application thereof, wherein the size of the array camera module can be reduced effectively, so that the array camera module is particularly suitable for being applied to an electronic device that is intended to be lighter and thinner.

An object of the present invention is to provide an array camera module and application thereof, wherein at least one of the length and the width of the array camera module can be reduced so as to facilitate the miniaturization of the array camera module.

An object of the present invention is to provide an array camera module and application thereof, wherein the length and width of the camera module can be reduced effectively, so that when the array camera module is applied to an electronic device that is intended to be lighter and thinner, the array camera module may occupy less space, thereby facilitating making the array camera module more intelligent.

An object of the present invention is to provide an array camera module and application thereof, wherein a circuit board assembly comprises a circuit board and at least one electronic component, wherein at least one of the electronic components is attached to a back face of the circuit board or half-embedded in the back face of the circuit board, so that a space reserved for attaching the electronic components on a front face of the circuit board may be reduced, thereby facilitating reducing at least one of the length and the width of the array camera module.

An object of the present invention is to provide an array camera module and application thereof, wherein each of the electronic components is attached to the back face of the circuit board and/or half-embedded in the back face of the circuit board respectively, so that there is no need to reserve a space for attaching the electronic components on the front face of the circuit board, thereby facilitating reducing at least one of the length and the width of the array camera module.

An object of the present invention is to provide an array camera module and application thereof, wherein the at least one of the electronic components that is attached to the back face of the circuit board is embedded by an embedding portion so as to prevent the electronic component from coming into contact with the external environment, thereby preventing the surface of the electronic component from being oxidized.

An object of the present invention is to provide an array camera module and application thereof, wherein the embedding portion can reinforce the strength of the circuit board so as to ensure the flatness of the circuit board.

An object of the present invention is to provide an array camera module and application thereof, wherein even if the thickness of the circuit board is reduced, with the embedding portion reinforcing the circuit board, the flatness of the circuit board also can be ensured, for example, the circuit board may be a thinner PCB board, FPC board, soft and hard plate, and the like.

An object of the present invention is to provide an array camera module and application thereof, wherein the at least one of the electronic components that is attached to the back face of the circuit board is embedded by the embedding portion, so that adjacent electronic components are isolated by the embedding portion, and in this way, even if the distance between two adjacent electronic components is relatively short, an undesirable phenomenon of mutual interference may not occur to the adjacent electronic components, thereby improving the imaging quality of the array camera module.

An object of the present invention is to provide an array camera module and application thereof, wherein the embedding portion is integrally bonded to the circuit board in a molding process, and in this way, not only steps of manufacturing the array camera module can be reduced, but also the reliability and stability of the embedding portion being bonded to the circuit board can be ensured.

An object of the present invention is to provide an array camera module and application thereof, wherein the embedding portion has at least one notch, thus when the array camera module is assembled into an electronic device subsequently, components of the electronic device can be accommodated in the notch of the embedding portion, so that the electronic device can be overlapped with the array camera module in length and width directions of the electronic device, thereby facilitating making the electronic device lighter and thinner.

An object of the present invention is to provide an array camera module and application thereof, wherein at least one photosensitive chip of the camera module can be attached to the front face of the circuit board of the circuit board assembly.

An object of the present invention is to provide an array camera module and application thereof, wherein at least one of the photosensitive chips can be attached to the embedding portion so as to ensure the flatness of the photosensitive chip and further reduce the height of the array camera module.

An object of the present invention is to provide an array camera module and application thereof, wherein there is a height difference between a photosensitive surface of at least one of the photosensitive chips and a photosensitive surface of other photosensitive chips so as to improve the imaging capability of the array camera module.

An object of the present invention is to provide an array camera module and application thereof, wherein there is a height difference between a photosensitive surface of at least one of the photosensitive chips and a photosensitive surface of other photosensitive chips so as to increase functions of the array camera module.

An object of the present invention is to provide an array camera module and application thereof, wherein the electronic component and the photosensitive chip may be corresponding to each other in the height direction of the array camera module, so that the electronic components of the array camera module may not be disposed along the circumferential direction of the photosensitive chip like a conventional array camera module, and in this way, at least one of the length and the width of the array camera module can be reduced effectively.

An object of the present invention is to provide an array camera module and application thereof, wherein the circuit board has at least one accommodation space for accommodating the photosensitive chip, thereby further reducing the height of the array camera module.

An object of the present invention is to provide an array camera module and application thereof, wherein a molding base is formed on the front face of the circuit board, and thus, on one hand, there is no need to prefabricate the molding base, and on the other hand, there is no need to apply glue or similar adhesives between the molding base and the circuit board assembly.

An object of the present invention is to provide an array camera module and application thereof, wherein the molding base embeds at least one of the electronic components that is attached to the front face of the circuit board, so that there is no need to reserve a mounting distance between the molding base and the electronic component, which is advantageous for reducing the size of the array camera module.

An object of the present invention is to provide an array camera module and application thereof, wherein the molding base is configured to prevent the electronic component from coming into contact with the external environment, thereby avoiding the oxidation of the surface of the electronic component.

An object of the present invention is to provide an array camera module and application thereof, wherein the molding base can isolate adjacent electronic components, so that even if the distance between two adjacent electronic components is relatively short, an undesirable phenomenon of mutual interference may not occur to the adjacent electronic components, thereby improving the imaging quality of the array camera module.

An object of the present invention is to provide an array camera module and application thereof, wherein the molding base isolates the electronic component from a photosensitive area of the photosensitive chip so as to prevent the photosensitive area of the photosensitive chip from being contaminated.

An object of the present invention is to provide an array camera module and application thereof, wherein the molding base embeds the electronic component that is attached to the front face of the circuit board, so that the molding base is prevented from falling off from the circuit board by the electronic component, thereby ensuring the reliability of the array camera module.

An object of the present invention is to provide an array camera module and application thereof, wherein the molding base can reinforce the strength of the circuit board so as to ensure the flatness of the circuit board.

An object of the present invention is to provide an array camera module and application thereof, wherein even if the size of the circuit board is reduced, with the molding base reinforcing the circuit board, the flatness of the circuit board also can be ensured, for example, the circuit board may be a thinner PCB board, FPC board, soft and hard plate, and the like.

An object of the present invention is to provide an array camera module and application thereof, wherein both the embedding portion and the molding base can enable adjacent electronic components to be closer, so that more electronic components with larger size can be attached on a limited attaching area of the circuit board, thereby improving the performance of the array camera module.

An object of the present invention is to provide an array camera module and application thereof, wherein a distance from an outer side of the photosensitive chip to an edge of the circuit board can be 0.1 mm to 3 mm, for example, on the side provided with a lead, the distance from the outer side of the photosensitive chip to the edge of the circuit board can be 0.1 mm to 3 mm, preferably 0.3 mm to 1 mm.

An object of the present invention is to provide an array camera module and application thereof, wherein a distance from an outer side of the photosensitive chip to an edge of the circuit board can be 0.05 mm to 3 mm, for example, on the side without a lead, the distance from the outer side of the photosensitive chip to the edge of the circuit board can be 0.05 mm to 3 mm, preferably 0.1 mm to 0.8 mm.

An object of the present invention is to provide an array camera module and application thereof, wherein the thickness of the embedding portion can be 0.1 mm to 2 mm, preferably 0.2 mm to 1 mm.

According to an aspect of the present invention, the present invention provides an array camera module, comprising at least two optical lenses and a circuit board assembly, wherein the circuit board assembly further comprises:

at least one circuit board;

at least two photosensitive chips, wherein each of the photosensitive chips is conductively connected to the circuit board respectively, and each of the optical lenses is held in a photosensitive path of each of the photosensitive chips respectively; and at least one electronic component, wherein each of the electronic components is conductively connected to the circuit board respectively, and at least one of the electronic components is located on a back face of the circuit board.

According to an embodiment of the present invention, the circuit board assembly comprises at least one embedding portion, wherein the embedding portion is integrally bonded to the back face of the circuit board.

According to an embodiment of the present invention, the embedding portion embeds at least a part of at least one of the electronic components that protrudes from the back face of the circuit board.

According to an embodiment of the present invention, the ratio of the area to which the embedding portion is bonded of the back face of the circuit board to the total area of the back face of the circuit board is greater than or equal to 1:2 and is less than or equal to 2:3.

According to an embodiment of the present invention, at least one notch is disposed in a middle portion and/or a side portion of the embedding portion.

According to an embodiment of the present invention, the circuit board assembly comprises at least two circuit boards, wherein each of the photosensitive chips is conductively connected to each of the circuit boards respectively.

According to an embodiment of the present invention, the circuit board assembly comprises one circuit board, wherein each of the photosensitive chips is conductively connected to the circuit board respectively.

According to an embodiment of the present invention, each of the photosensitive chips is attached to a front face of the circuit board respectively.

According to an embodiment of the present invention, the circuit board assembly comprises one circuit board, the circuit board has at least one through hole shaped accommodation space, and a part of the embedding portion is exposed to the accommodation space of the circuit board; and wherein at least one of the photosensitive chips is attached to the front face of the circuit board, and at least one of the photosensitive chips is attached to the embedding portion via the accommodation space of the circuit board.

According to an embodiment of the present invention, the circuit board assembly further comprises a molding base which has at least one light window, wherein the molding base is integrally bonded to the front face of the circuit board and surrounds a photosensitive area of each of the photosensitive chips, so that the photosensitive area of each of the photosensitive chips corresponds to each of the light windows of the molding base respectively, wherein each of the light windows of the molding base forms a light path between each of the optical lenses and each of the photosensitive chips respectively.

According to an embodiment of the present invention, the molding base embeds at least a part of a non-photosensitive area of at least one of the photosensitive chips.

According to an embodiment of the present invention, the array camera module further comprises at least one filtering element, wherein each of the filtering elements is attached to the molding base and held between each of the optical lenses and each of the photosensitive chips.

According to an embodiment of the present invention, the array camera module further comprises at least one frame-type bracket and at least one filtering element attached to the bracket, wherein the frame-type bracket is attached to the molding base, so that the filtering element is held between the optical lens and the photosensitive chip by the bracket.

According to an embodiment of the present invention, the molding base is molded on the front face of the circuit board at the same time when the embedding portion is molded on the back face of the circuit board.

According to an embodiment of the present invention, the molding base is molded on the front face of the circuit board after the embedding portion is molded on the back face of the circuit board.

According to an embodiment of the present invention, the circuit board assembly further comprises at least one lens frame which has at least one light through hole, wherein the lens frame is attached to the front face of the circuit board and surrounds a photosensitive area of each of the photosensitive chips, so that the photosensitive area of each of the photosensitive chips corresponds to each of the light through holes of the lens frame respectively, wherein each of the light through holes of the lens frame form a light path between each of the optical lenses and each of the photosensitive chips respectively.

According to an embodiment of the present invention, the circuit board assembly further comprises at least one lens frame which has at least one light thought hole and at least one molding base which has at least one light window, wherein the lens frame is attached to the front face of the circuit board and surrounds a photosensitive area of the photosensitive chip, so that the photosensitive area of the photosensitive chip corresponds to the light through hole of the lens frame; wherein the molding base is integrally bonded to the front face of the circuit board and surrounds the photosensitive area of the photosensitive chip, so that the photosensitive area of the photosensitive chip corresponds to the light window of the molding base; and wherein the molding base is adjacent to the lens frame, and the light through hole of the lens frame and the light window of the molding base respectively form a light path between each of the optical lenses and each of the photosensitive chips.

According to another aspect of the present invention, the present invention further provides an electronic device, comprising:
  an electronic device body; and
  at least one array camera module, wherein the array camera module is disposed in the electronic device body; and wherein the array camera module further comprises at least two optical lenses and a circuit board assembly, wherein the circuit board assembly further comprises:
  at least one circuit board;
  at least two photosensitive chips, wherein each of the photosensitive chips is conductively connected to the circuit board respectively, and each of the optical lenses is held in a photosensitive path of each of the photosensitive chips respectively; and
  at least one electronic component, wherein each of the electronic components is conductively connected to the circuit board respectively, and at least one of the electronic components is located on a back face of the circuit board.

According to an embodiment of the present invention, the electronic device body is a smart phone.

According to an embodiment of the present invention, the array camera module is a rear camera module of the smart phone.

According to another aspect of the present invention, the present invention further provides a circuit board assembly, comprising:
  at least one circuit board;
  at least two photosensitive chips, wherein each of the photosensitive chips is conductively connected to the circuit board respectively; and
  at least one electronic component, wherein each of the electronic components is conductively connected to the circuit board respectively, and at least one of the electronic components is located on a back face of the circuit board.

According to an embodiment of the present invention, the circuit board assembly further comprises at least one embedding portion, wherein the embedding portion is integrally bonded to the back face of the circuit board.

According to an embodiment of the present invention, the embedding portion embeds at least a part of at least one of the electronic components that protrudes from the back face of the circuit board.

According to an embodiment of the present invention, the ratio of the area to which the embedding portion is bonded of the back face of the circuit board to the total area of the back face of the circuit board is greater than or equal to 1:2 and is less than or equal to 2:3.

According to an embodiment of the present invention, at least one notch is disposed in a middle portion and/or a side portion of the embedding portion.

According to an embodiment of the present invention, the circuit board assembly comprises at least two circuit boards, wherein each of the photosensitive chips is conductively connected to each of the circuit boards respectively.

According to an embodiment of the present invention, the circuit board assembly comprises one circuit board, wherein each of the photosensitive chips is conductively connected to the circuit board respectively.

According to an embodiment of the present invention, each of the photosensitive chips is attached to a front face of the circuit board respectively.

According to an embodiment of the present invention, the circuit board assembly comprises one circuit board, the circuit board has at least one through hole shaped accommodation space, and a part of the embedding portion is exposed to the accommodation space of the circuit board; and wherein at least one of the photosensitive chips is attached to the front face of the circuit board, and at least one of the photosensitive chips is attached to the embedding portion via the accommodation space of the circuit board.

According to an embodiment of the present invention, the circuit board assembly further comprises a molding base which has at least one light window, wherein the molding base is integrally bonded to the front face of the circuit board and surrounds a photosensitive area of each of the photosensitive chips, so that the photosensitive area of each of the photosensitive chips corresponds to each of the light windows of the molding base respectively.

According to an embodiment of the present invention, the molding base embeds at least a part of a non-photosensitive area of at least one of the photosensitive chips.

According to an embodiment of the present invention, the molding base is molded on the front face of the circuit board at the same time when the embedding portion is molded on the back face of the circuit board.

According to an embodiment of the present invention, the molding base is molded on the front face of the circuit board after the embedding portion is molded on the back face of the circuit board.

According to another aspect of the present invention, the present invention further provides an integral circuit board assembly, comprising:
  a jointed board unit, wherein the jointed board unit comprises at least one circuit board;
  at least one electronic component, wherein each of the electronic components is conductively connected to the circuit board respectively, and at least one of the electronic components is located on a back face of the circuit board; and an integral embedding portion, wherein the integral embedding portion is integrally bonded to the back face of the circuit board.

According to an embodiment of the present invention, the integral circuit board assembly further comprises at least one integral molding base which has at least one light window, wherein the integral molding base is integrally bonded to a front face of the circuit board, and a circuit board connector on the front face of the circuit board is exposed to the light window of the integral molding base.

According to an embodiment of the present invention, the integral circuit board assembly further comprises at least one integral molding base and at least one photosensitive chip, wherein the integral molding base has at least one light window; and wherein after the photosensitive chip is conductively connected to the circuit board, the integral molding base is integrally bonded to the front face of the circuit board and surrounds a photosensitive area of the photosensitive chip, so that the photosensitive area of the photosensitive chip corresponds to the light window of the integral molding base.

According to an embodiment of the present invention, the integral molding base is bonded to at least a part of a non-photosensitive area of the photosensitive chips.

According to an embodiment of the present invention, the integral embedding portion embeds at least a part of at least one of the electronic components that protrudes from the back face of the circuit board.

According to an embodiment of the present invention, the integral molding base is integrally bonded to the front face of the circuit board at the same time when the integral embedding portion is integrally bonded to the back face of the circuit board.

According to an embodiment of the present invention, the integral molding base is integrally bonded to the front face of the circuit board after the integral embedding portion is integrally bonded to the back face of the circuit board.

According to another aspect of the present invention, the present invention further provides a method for manufacturing an array camera module, comprising the following steps:

(a) connecting at least one electronic component to a circuit board conductively with the electronic component located on a side where a back face of the circuit board is located;

(b) connecting each photosensitive chip to the circuit board conductively with a photosensitive area of each of the photosensitive chips oriented towards a side where a front face of the circuit board is located; and (c) holding each optical lens in a photosensitive path of each of the photosensitive chips respectively, thereby producing the array camera module.

According to an embodiment of the present invention, the manufacturing method further comprise the step of bonding at least one embedding portion to the back face of the circuit board integrally.

According to an embodiment of the present invention, the manufacturing method further comprises the step of forming at least a notch in the embedding portion.

According to an embodiment of the present invention, the manufacturing method further comprises the step of forming the notch at the same time when the embedding portion is integrally bonded to the back face of the circuit board.

According to an embodiment of the present invention, the manufacturing method further comprises the step of bonding a molding base to the front face of the circuit board integrally and at the same time forming at least one light window for the photosensitive area of each of the photosensitive chip to correspond to.

According to an embodiment of the present invention, the manufacturing method further comprises the step of bonding a molding base to the front face of the circuit board integrally and at the same time forming at least one light window for the photosensitive area of each of the photosensitive chip to correspond to.

According to an embodiment of the present invention, the manufacturing method further comprises the step of bonding the molding base to the front face of the circuit board integrally at the same time when the embedding portion is integrally boned to the back face of the circuit board According to an embodiment of the present invention, the manufacturing method further comprises the step of bonding the molding base to the front face of the circuit board integrally after the embedding portion is integrally bonded to the back face of the circuit board.

According to another aspect of the present invention, the present invention provides an array camera module, comprising at least two optical lenses and a circuit board assembly, wherein the circuit board assembly further comprises:

at least one circuit board;

at least two photosensitive chips, wherein each of the photosensitive chips is conductively connected to the circuit board respectively, each of the optical lenses is held in a photosensitive path of each of the photosensitive chips respectively, and there is a height difference between a photosensitive surface of at least one of the photosensitive chips and a photosensitive surface of other photosensitive chips; and at least one electronic component, wherein each of the electronic components is conductively connected to the circuit board respectively, and at least one of the electronic components is located on a back face of the circuit board.

According to an embodiment of the present invention, the circuit board assembly comprises at least two circuit boards, wherein each of the photosensitive chips is conductively connected to each of the circuit boards respectively.

According to an embodiment of the present invention, the circuit board assembly comprises one circuit board, wherein each of the photosensitive chips is conductively connected to the circuit board respectively.

According to an embodiment of the present invention, at least one of the circuit boards has at least one accommodation space, wherein the photosensitive chip that is conductively connected to the circuit board having the accommodation space is held in the accommodation space of the circuit board, and other photosensitive chips are attached to a front face of the circuit board, so that there is a height difference between a photosensitive surface of the at least one photosensitive chip and a photosensitive surface of other photosensitive chips.

According to an embodiment of the present invention, at least one of the circuit boards has at least one through hole shaped accommodation space, wherein the photosensitive chip that is conductively connected to the circuit board having the accommodation space is attached to the back face of the circuit board, and a photosensitive area of the photosensitive chip is exposed to the accommodation space of the circuit board, and other photosensitive chips are attached to the front face of the circuit board, so that there is a height difference between a photosensitive surface of at least one of the photosensitive chips and a photosensitive surface of other photosensitive chips.

According to an embodiment of the present invention, the circuit board has at least one accommodation space, wherein at least one of the photosensitive chips is held in the accommodation space of the circuit board, and other photosensitive chips are attached to the front face of the circuit board, so that there is a height difference between a photosensitive surface of the at least one photosensitive chip and a photosensitive surface of other photosensitive chips.

According to an embodiment of the present invention, the circuit board has at least one through hole shaped accommodation space, wherein at least one of the photosensitive chips is attached to the back face of the circuit board, a photosensitive area of the photosensitive chip is exposed to in the accommodation space of the circuit board, and other photosensitive chips are attached to the front face of the circuit board, so that there is a height difference between a photosensitive surface of the at least one photosensitive chips and a photosensitive surface of other photosensitive chips.

According to an embodiment of the present invention, the circuit board assembly further comprises a molding base which has at least one light window, wherein the molding base is integrally bonded to the front face of the circuit board and surrounds the photosensitive chip, so that a photosensitive area of the photosensitive chip corresponds to the light window of the molding base.

According to an embodiment of the present invention, the circuit board assembly further comprises a molding base which has at least one light window and a lens frame which has at least one light through hole, wherein the molding base is integrally bonded to the front face of the circuit board and surrounds at least one of the photosensitive chips, so that a photosensitive area of the photosensitive chip corresponds to the light window of the molding base, and wherein the lens frame is attached to the front face of the circuit board and surrounds other photosensitive chips, so that photosensitive areas of the other photosensitive chips correspond to the light through hole of the lens frame, and the molding base is adjacent to the lens frame.

According to an embodiment of the present invention, the molding base further embeds a non-photosensitive area of the photosensitive chip.

According to an embodiment of the present invention, the circuit board assembly further comprises an embedding portion, wherein the embedding portion is integrally bonded to the back face of the circuit board.

According to an embodiment of the present invention, at least one notch is disposed in a middle portion and/or a side portion of the embedding portion.

According to an embodiment of the present invention, the ratio of the area to which the embedding portion is bonded of the back face of the circuit board to the total area of the back face of the circuit board is greater than or equal to 1:2 and is less than or equal to 2:3.

According to an embodiment of the present invention, the molding base is integrally bonded to the front face of the circuit board at the same time when the embedding portion is integrally bonded to the back face of the circuit board.

According to an embodiment of the present invention, the molding base is integrally bonded to the front face of the circuit board after the embedding portion is integrally bonded to the back face of the circuit board.

According to an embodiment of the present invention, at least one of the circuit boards has at least one accommodation space of light through hole, and the circuit board assembly further comprises an embedding portion which is integrally bonded to the back face of each of the circuit board and a part of which is exposed to the accommodation space of the circuit board, wherein at least one of the photosensitive chips is attached to the front face of the circuit board, and other photosensitive chips are attached to the embedding portion via the accommodation space of the circuit board, so that there is a height difference between a photosensitive surface of at least one of the photosensitive chips and a photosensitive surface of other photosensitive chips.

According to an embodiment of the present invention, the circuit board has at least one accommodation space of light through hole, and the circuit board assembly further comprises an embedding portion which is integrally bonded to the back face of each of the circuit board and a part of which is exposed to the accommodation space of the circuit board, wherein at least one of the photosensitive chips is attached to the front face of the circuit board, and other photosensitive chips are attached to the embedding portion via the accommodation space of the circuit board, so that there is a height difference between a photosensitive surface of at least one of the photosensitive chips and a photosensitive surface of other photosensitive chips.

According to another aspect of the present invention, the present invention further provides an electronic device, comprising an electronic device body and at least one array camera module disposed in the electronic device body, wherein the array camera module further comprises at least two optical lenses and a circuit board assembly, wherein the circuit board assembly further comprises:
    at least one circuit board;
    at least two photosensitive chips, wherein each of the photosensitive chips is conductively connected to the circuit board respectively, each of the optical lenses is held in a photosensitive path of each of the photosensitive chips respectively, and there is a height difference between a photosensitive surface of at least one of the photosensitive chips and a photosensitive surface of other photosensitive chips; and
    at least one electronic component, wherein each of the electronic components is conductively connected to the circuit board respectively, and at least one of the electronic components is located on a back face of the circuit board.

According to an embodiment of the present invention, the electronic device is a smart phone.

According to an embodiment of the present invention, the array camera module is a front camera module of the smart phone, or the array camera module is a rear camera module of the smart phone.

According to another aspect of the present invention, the present invention further provides a circuit board assembly, comprising:
    at least one circuit board;
    at least two photosensitive chips, wherein each of the photosensitive chips is conductively connected to the circuit board respectively, and there is a height difference between a photosensitive surface of at least one of the photosensitive chips and a photosensitive surface of other photosensitive chips; and
    at least one electronic component, wherein each of the electronic components is conductively connected to the circuit board respectively, and a free side of at least one of the electronic components is oriented towards a back face of the circuit board.

According to an embodiment of the present invention, the circuit board assembly comprises at least two circuit boards, wherein each of the photosensitive chips is conductively connected to each of the circuit boards respectively.

According to an embodiment of the present invention, the circuit board assembly comprises one circuit board, wherein each of the photosensitive chips is conductively connected to the circuit board respectively.

According to an embodiment of the present invention, at least one of the circuit boards has at least one accommodation space, wherein the photosensitive chip that is conductively connected to the circuit board having the accommodation space is held in the accommodation space of the circuit board, and other photosensitive chips are attached to a front face of the circuit board, so that there is a height difference between a photosensitive surface of at least one of the photosensitive chips and a photosensitive surface of other photosensitive chips.

According to an embodiment of the present invention, at least one of the circuit boards has at least one through hole shaped accommodation space, wherein the photosensitive chip that is conductively connected to the circuit board having the accommodation space is attached to the back face of the circuit board, a photosensitive area of the photosensitive chip is exposed to the accommodation space of the circuit board, and other photosensitive chips are attached to the front face of the circuit board, so that there is a height difference between a photosensitive surface of at least one of the photosensitive chips and a photosensitive surface of other photosensitive chips.

According to an embodiment of the present invention, the circuit board has at least one accommodation space, wherein at least one of the photosensitive chips is held in the accommodation space of the circuit board, and other photosensitive chips are attached to the front face of the circuit board, so that there is a height difference between a photosensitive surface of at least one of the photosensitive chips and a photosensitive surface of other photosensitive chips.

According to an embodiment of the present invention, the circuit board has at least one through hole shaped accommodation space, wherein at least one of the photosensitive chips is attached to the back face of the circuit board, a photosensitive area of the photosensitive chip is exposed to in the accommodation space of the circuit board, and other photosensitive chips are attached to the front face of the circuit board, so that there is a height difference between a photosensitive surface of at least one of the photosensitive chips and a photosensitive surface of other photosensitive chips.

According to an embodiment of the present invention, the circuit board assembly further comprises a molding base which has at least one light window, wherein the molding base is integrally bonded to the front face of the circuit board and surrounds the photosensitive chip, so that a photosensitive area of the photosensitive chip corresponds to the light window of the molding base.

According to an embodiment of the present invention, the circuit board assembly further comprises a molding base which has at least one light window and a lens frame which has at least one light through hole, wherein the molding base is integrally bonded to the front face of the circuit board and surrounds at least one of the photosensitive chips, so that a photosensitive area of the photosensitive chip corresponds to the light window of the molding base, and wherein the lens frame is attached to the front face of the circuit board and surrounds other photosensitive chips, so that photosensitive areas of the other photosensitive chips correspond to the light through hole of the lens frame, and the molding base is adjacent to the lens frame.

According to an embodiment of the present invention, the molding base further embeds a non-photosensitive area of the photosensitive chip.

According to an embodiment of the present invention, the circuit board assembly further comprises an embedding portion, wherein the embedding portion is integrally bonded to the back face of the circuit board.

According to an embodiment of the present invention, the embedding portion embeds at least a part of at least one of the electronic components that protrudes from the back face of the circuit board.

According to an embodiment of the present invention, at least one notch is disposed in a middle portion and/or a side portion of the embedding portion.

According to an embodiment of the present invention, the ratio of the area to which the embedding portion is bonded of the back face of the circuit board to the total area of the back face of the circuit board is greater than or equal to 1:2 and is less than or equal to 2:3.

According to an embodiment of the present invention, at least one of the circuit boards has at least one accommodation space of light through hole, and the circuit board assembly further comprises an embedding portion which is integrally bonded to the back face of each of the circuit board and a part of which is exposed to the accommodation space of the circuit board, wherein at least one of the photosensitive chips is attached to the front face of the circuit board, and other photosensitive chips are attached to the embedding portion via the accommodation space of the circuit board, so that there is a height difference between a photosensitive surface of at least one of the photosensitive chips and a photosensitive surface of other photosensitive chips.

According to an embodiment of the present invention, the circuit board has at least one accommodation space of light through hole, and the circuit board assembly further comprises an embedding portion which is integrally bonded to the back face of each of the circuit board and a part of which is exposed to the accommodation space of the circuit board, wherein at least one of the photosensitive chips is attached to the front face of the circuit board, and other photosensitive chips are attached to the embedding portion via the accommodation space of the circuit board, so that there is a height difference between a photosensitive surface of at least one of the photosensitive chips and a photosensitive surface of other photosensitive chips.

BRIEF DESCRIPTION OF THE DRAWINGS

FIG. 16A and FIG. 16B are schematic diagrams of another manufacturing step of the array camera module according to the above preferred embodiment of the present invention.

FIG. 79 is a schematic diagram of another manufacturing process of the array camera module according to the above preferred embodiment of the present invention.

FIG. 80 is a schematic diagram of another manufacturing process of the array camera module according to the above preferred embodiment of the present invention.

DESCRIPTION OF EMBODIMENT

Figure 1:
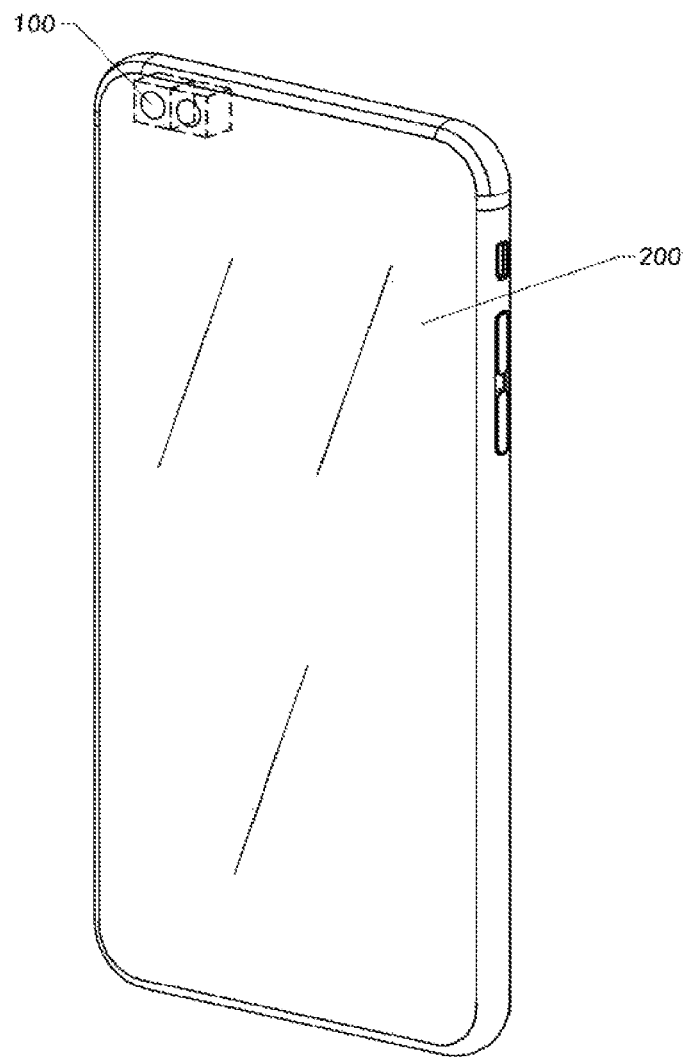
FIG. 1 is a schematic diagram of a usage state of an array camera module according to a preferred embodiment of the present invention.

The following description is used to disclose the present invention to enable those skilled in the art to implement the present invention. The preferred embodiments in the following description are by way of example only, and other obvious variations will occur to those skilled in the art. The basic principles of the present invention as defined in the following description can be applied to other embodiments, modifications, improvements, equivalents, and other technical solutions without departing from the spirit and scope of the present invention.

It should be understood by those skilled in the art that in the disclosure of the present invention, the orientation or positional relationship indicated by terms "longitudinal", "transverse", "upper", "lower", "front", "back", "left", "right", "vertical", "horizontal", "top", "bottom", "inside", "outside", etc. is based on the orientation or positional relationship shown in the drawings, which is merely for the convenience of describing the present invention and for the simplification of the description, and not to indicate or imply that the device or element referred to must have a specific orientation, or be constructed and operated in a specific orientation. Therefore, the above terms shall not be construed as a limitation of the present invention.

It can be understood that the term "a" is understood to mean "at least one" or "one or more", that is, in one embodiment, the number of an element can be one, and in another embodiment, the number of elements can be plural, and the term "a" cannot be construed as limiting the quantity.

With reference to FIG. 1 to FIG. 6 of the accompanying drawings of the present invention, an array camera module 100 according to a preferred embodiment of the present invention is set forth in the following description, wherein one usage state of the array camera module 100 is shown in FIG. 1, for example, in the example shown in FIG. 1, one of the array camera modules 100 can be applied to an electronic device body 200 that is embodied as a smart phone, so that the array camera module 100 can be combined with the electronic device body 200 to form an electronic device.

It is worth mentioning that although in the example shown in FIG. 1, the number of the array camera modules 100 is one, and the array camera module 100 is disposed at the rear of the electronic device body 200, in other examples, the number of the array camera module 100 is not limited to one, and the position of the array camera module 100 is not limited to being disposed at the rear of the electronic device body 200, for example, the array camera module 100 can be disposed at the front of the electronic device body 200, and of course, it is also possible that the array camera module 100 is disposed at other positions of the electronic device body 200.

In addition, although the electronic device body 200 is implemented as a smart phone in FIG. 1, in other examples of the present invention, the electronic device body 200 can also be implemented as a tablet, a notebook computer, a camera, a personal digital assistant, an electronic book, an MP3/4/5, and any electronic devices that can be configured with the array camera module 100. Of course, it can be understood by those skilled in the art that it is also possible to configure the array camera module 100 on conventional appliances such as a refrigerator, a washing machine, and a television, or it is possible to configure the array camera module 100 on buildings such as a security door or a wall. Therefore, the application environment and usage mode of the array camera module 100 should not be regarded as limiting of the content and scope of the array camera module of the present invention.

It is worth mentioning that in this specific example of the array camera module 100 shown in FIG. 1, the electronic device body 200 is implemented as a smart phone, and the array camera module 100 is disposed at the rear of the electronic device body 200 to form a rear camera module of the smart phone. It can be understood by those skilled in the art that in other possible examples, the array camera module 100 can also be disposed at the front of the electronic device body 200 to form a front camera module of the smart phone.

With reference to FIG. 2 to FIG. 6, the array camera module 100 comprises at least two optical lenses 10 and a circuit board assembly 20, wherein the circuit board assembly 20 comprises at least one circuit board 21, at least two photosensitive chips 22, and at least one electronic component 23, wherein the photosensitive chip 22 and the circuit board 21 are conductively connected, each of the electronic components 23 is attached to the circuit board 21, and the optical lens 10 is held in a photosensitive path of the photosensitive chip 22. Light reflected by an object can enter the interior of the array camera module 100 from the optical lens 10 so as to be received and imaged by the photosensitive chip 22 subsequently, thereby obtaining an image associated with the object.

Figure 4:
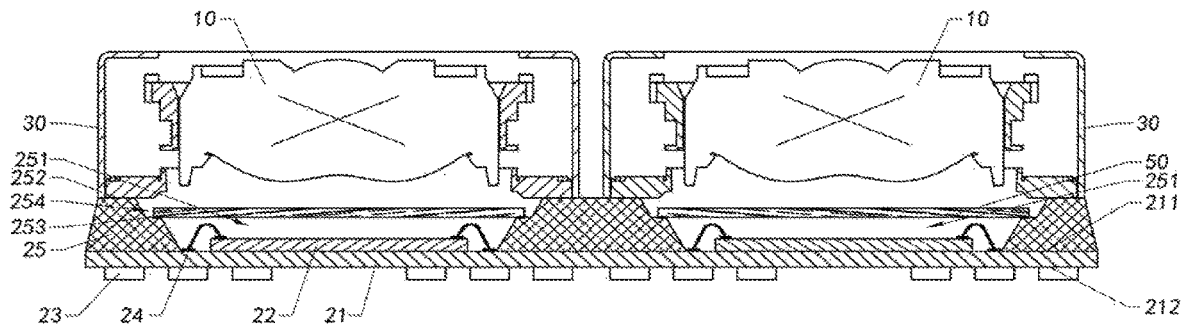
FIG. 4 is a sectional view of the array camera module according to the above preferred embodiment of the present invention.
Figure 5:
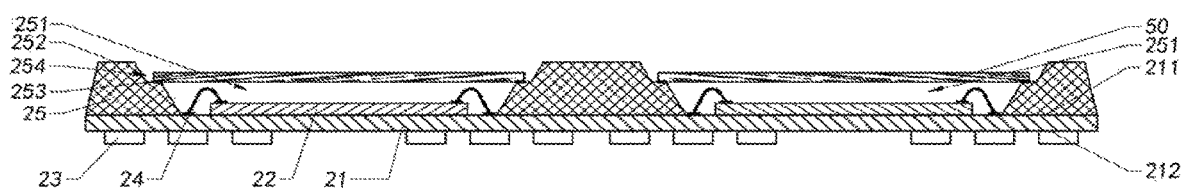
FIG. 5 is a sectional view of a circuit board assembly of the array camera module according to the above preferred embodiment of the present invention.

For example, in this specific example of the array camera module 100 shown in FIG. 4 and FIG. 5, the array camera module 100 comprises two optical lenses 10 and one circuit board assembly 20, so that the array camera module 100 forms a double-lens camera module, wherein the circuit board assembly 20 comprises one circuit board 21, two photosensitive chips 22, and a plurality of the electronic components 23, wherein the two photosensitive chips 22 are attached on one side of the circuit board 21 in a mutually spaced manner, each of the electronic components 23 is attached on the other side of the circuit board 21 respectively in a mutually spaced manner, and each of the optical lenses 10 is held in a photosensitive path of each of the photosensitive chips 22. Light reflected by an object can enter the interior of the array camera module 100 from each of the optical lenses 10, and then received and imaged by each of the photosensitive chips 22 at a corresponding position respectively, thereby obtaining an image associated with the object.

It is worth mentioning that although the contents and features of the array camera module 100 of the present invention are illustrated in the following description and accompanying drawings by taking the array camera module 100 being implemented as a double-lens camera module as an example, it can be understood by those skilled in the art that the array camera module 100 of the present invention may also comprises more than three of the photosensitive chips 22 and more than three of the optical lenses 10. Therefore, illustrating the contents and features of the array camera module 100 of the present invention by taking the array camera module 100 being implemented as a double-lens camera module as an example is only exemplary, and it should not be regarded as limiting of the content and scope of the array camera module 100 of the present invention.

With further reference to FIG. 4 and FIG. 5, the circuit board 21 has a front face 211 and a back face 212 corresponding to the front face 211, and each of the photosensitive chips 22 can be bonded to the circuit board 21 in a manner of being attached to the front face 211 of the circuit board 21. Correspondingly, each of the electronic components 23 can be bonded to the circuit board 21 in a manner of being attached to the back face 212 of the circuit board 21. In other words, each of the electronic components 23 is connected to the circuit board 21 on the back face 212 of the circuit board 21.

It is worth mentioning that in other possible examples of the array camera module 100 of the present invention, at least one of the electronic components 23 can also be conductively connected to the circuit board 21 on the front face 211 of the circuit board 21. That is, in this specific example of the array camera module 100, at least one of the electronic components 23 can be conductively connected to the circuit board 21 on the front face 211 of the circuit board 21, and other electronic components 23 can be conductively connected to the circuit board 21 on the back face 212 of the circuit board 21.

It is also worth mentioning that although the electronic component 23 is shown in FIG. 4 and FIG. 5 to be conductively connected to the circuit board 21 in a manner in which the electronic component 23 is attached to the back face 212 of the circuit board 21, in other possible examples of the array camera module 100 of the present invention, the electronic component 23 can also be conductively connected to the circuit board 21 in a manner in which at least a part of the electronic component 23 is embedded in the circuit board 21.

It is worth mentioning that in one example of the array camera module 100 of the present invention, the electronic component 23 can be implemented as passive electronic components such as a resistor, a capacitor, a relay, and a processor. In other words, the type of the electronic component 23 is not limited in the array camera module 100 of the present invention.

Further, the circuit board assembly 20 comprises at least a set of leads 24, wherein two end portions of each of the leads 24 are connected to the circuit board 21 and the photosensitive chip 22 respectively, so that the photosensitive chip 22 and the circuit board 21 are connected by each of the leads 24.

For example, in one example, the photosensitive chip 22 may be attached to the front face 211 of the circuit board 21 first, and each of the leads 24 is then disposed between the photosensitive chip 22 and the circuit board 21 through a process such as wiring, so that the circuit board 21 and the photosensitive chip 22 are connected by each of the leads 24. It can be understood that the flatness of the photosensitive chip 22 is limited by the flatness of the circuit board 21. Of course, in some other examples, it is also not necessary to directly attach the photosensitive chip 22 to the circuit board 21 together, so that the flatness of the photosensitive chip 22 can be prevented from being affected by the flatness of the circuit board 21, or even if the photosensitive chip 22 is attached to the circuit board 21, the flatness of the photosensitive chip 22 can not be affected by the flatness of the circuit board 21. In this way, the circuit board 21 can be made by employing a plate with thinner thickness.

The wiring direction of the lead 24 is not limited in the array camera module 100 of the present invention. For example, the wiring direction of the lead 24 may be from the photosensitive chip 22 to the circuit board 21, or may also be from the circuit board 21 to the photosensitive chip 22. Of course, the lead 24 may also be configured to connect the photosensitive chip 22 and the circuit board 21 in other manners, and the array camera module 100 of the present invention is not limited in this respect. It can be understood that the material of the lead 24 is not limited in the array camera module 100 of the present invention, for example, the lead 24 can be, but not limited to, a gold wire, a silver wire, a copper wire, etc.

Of course, it can be understood that in some examples, the photosensitive chip 22 can be provided with a chip connector in advance, the circuit board 21 can be provided with a circuit board connector in advance, and the two end portions of the lead 24 can be in contact with the chip connector of the photosensitive chip 22 and the circuit board connector of the circuit board 21 respectively so as to connect the photosensitive chip 22 and the circuit board 21, for example, the two end portions of the lead 24 may be welded to the chip connector of the photosensitive chip 22 and the circuit board connector of the circuit board 21 respectively, so that the photosensitive chip 22 and the circuit board 21 are connected by the lead 24. It is worth mentioning that the shape and size of the chip connector of the photosensitive chip 22 and the circuit board connector of the circuit board 21 can be not limited, for example, the chip connector of the photosensitive chip 22 and the circuit board connector of the circuit board 21 can be implemented as, but not limited to, a disk shape, a sphere shape, and the like, respectively.

Figure 6:
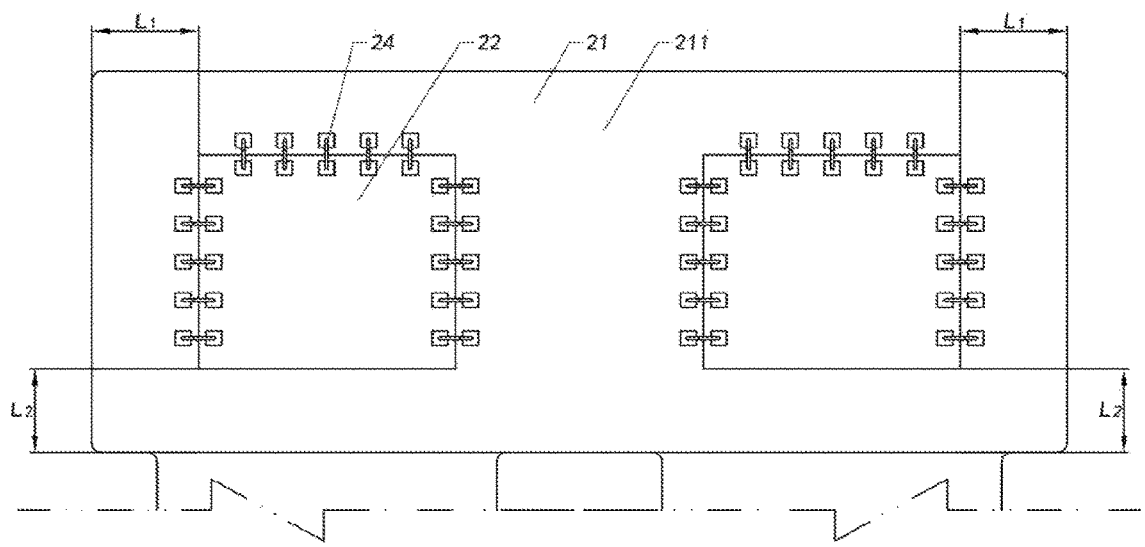
FIG. 6 is a top view of the circuit board assembly of the array camera module according to the above preferred embodiment of the present invention.

With reference to FIG. 6, on a side where the lead 24 is provided, a distance from an outer edge of the photosensitive chip 22 to an outer edge of the circuit board 21 is L1, and on a side without the lead 24, a distance from the outer edge of the photosensitive chip 22 to the outer edge of the circuit board 21 is L2, wherein the minimum distance of L1 is 0.1 mm to 3 mm, preferably 0.3 mm to 0.8 mm, and wherein the minimum distance of L2 is 0.05 mm to 3 mm, preferably 0.1 mm to 0.5 mm.

With reference to FIG. 4 and FIG. 5, in the embodiment of the array camera module 100 of the present invention, each of the electronic components 23 is attached to the back face 212 of the circuit board 21 respectively in a mutually spaced manner, that is, each of the electronic components 23 may not need to be disposed in a circumferential direction of the photosensitive chip 22, which is advantageous for reducing the length and width of the circuit board assembly 20, thereby reducing the length and width of the array camera module 100, so that the array camera module 100 can be applied to an electronic device that is intended to be lighter and thinner.

The circuit board assembly 20 further comprises a molding base 25, wherein the molding base 25 can be integrally formed on the front face 211 of the circuit board 21 and the molding base 25 has at least one light window 251, wherein a photosensitive area of the photosensitive chip 22 corresponds to the light window 251, so that a light path is formed between the optical lens 10 and the photosensitive chip 22 via the light window 251 of the molding base 25.

For example, in this specific example of the array camera module 100 shown in FIG. 4 and FIG. 5, the molding base 25 has two mutually independent light windows 251, wherein the photosensitive area of each of the photosensitive chips 22 corresponds to each of the light windows 251 of the molding base 25 respectively, so that a light path is formed between each of the optical lenses 10 and each of the photosensitive chips 22 respectively via each of the light windows 251 of the molding base 25. That is, the light reflected by the object can be received by the photosensitive area of each of the photosensitive chip 22 via each of the light windows 251 of the molding base 25 after entering the interior of the array camera module 100 from each of the optical lenses 10, and is subsequently imaged via each of the photosensitive chip 22 after photoelectric conversion.

The molding base 25 can be integrally molded on the front face 211 of the circuit board 21 by a molding process, and in this aspect, there is no need to provide substances such as glue for connecting the molding base 25 and the circuit board 21 between the molding base 25 and the circuit board 21. In this way, not only can the height of the array camera module 100 be reduced, but also the flatness of the circuit board 21 can be effectively ensured so as to improve the imaging quality of the array camera module 100. In addition, since there is no need to provide substances such as glue for connecting the molding base 25 and the circuit board 21 between the molding base 25 and the front face 211 of the circuit board 21, the height of the array camera module 100 can be reduced so as to facilitate the array camera module 100 being applied to the lighter and thinner electronic device. It is more important that the molding base 25 is integrally bonded to the circuit board 21 in a process of molding, thus, on one hand, there is no need to prefabricate the molding base 25, and on the other hand, there is no need to worry that an undesirable phenomenon of deformation may occur to the molding base 25 before being bonded to the circuit board 21. Moreover, the molding base 25 can reinforce the strength of the circuit board 21 so as to ensure the flatness of the circuit board 21, so that even if a thinner circuit board such as a PCB board, an FPC board, and a soft and hard plate is employed for the circuit board 21, the molding base 25 can also ensure the flatness of the circuit board 21. In this way, the coaxiality of a plurality of the photosensitive chips 22 can also be ensured.

The array camera module 100 further comprises at least one driver 30, wherein the optical lens 10 is drivably disposed in the driver 30, and the driver 30 is disposed on the molding base 25, so that the optical lens 10 is held in the photosensitive path of the photosensitive chip 22 via the cooperation of the driver 30 and the molding base 25. The driver 30 can drive the optical lens 10 to move along the photosensitive path of the photosensitive chip 22 so as to adjust the focal length of the array camera module 100, so that the array camera module 100 has the capacities of automatic focusing and automatic zooming. Preferably, the driver 30 can be implemented as, but not limited to, a voice coil motor.

Figure 2:
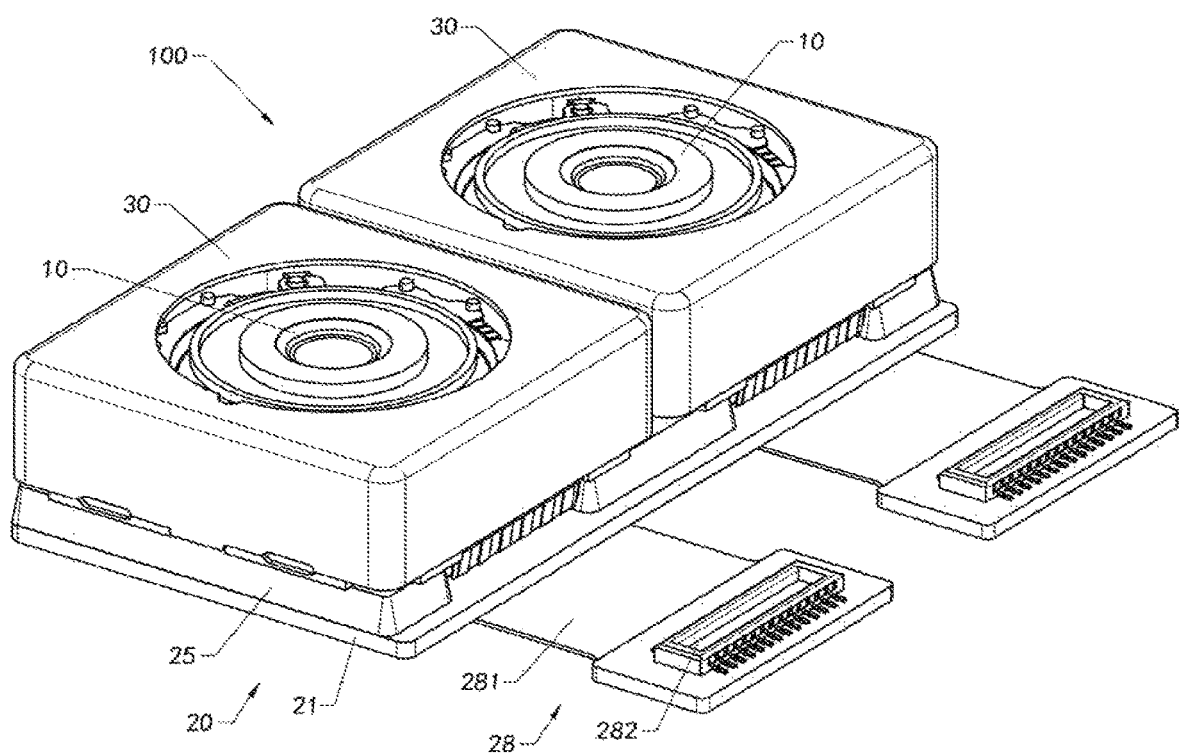
FIG. 2 is a stereoscopic of the array camera module according to the above preferred embodiment of the present invention.
Figure 3:
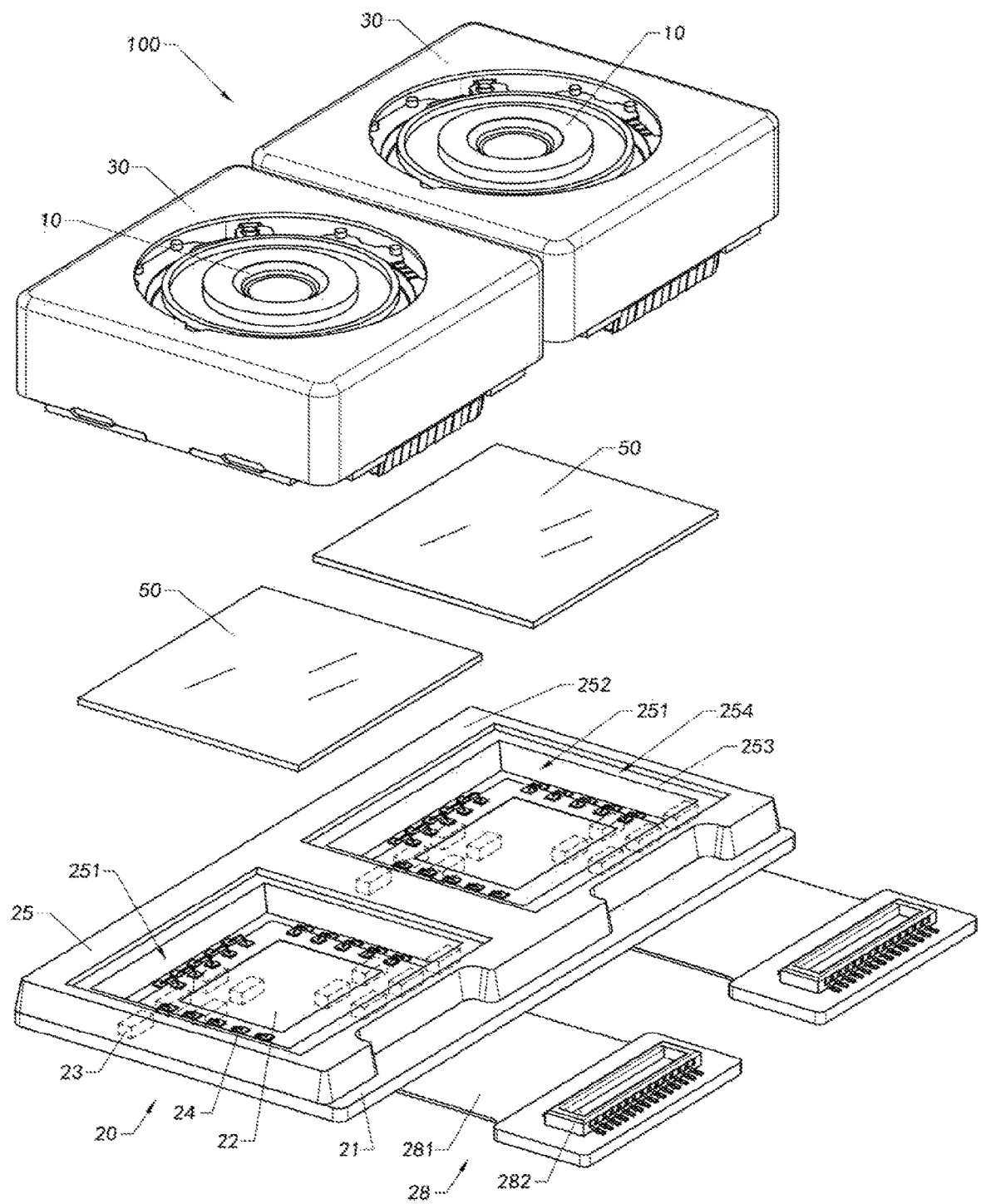
FIG. 3 is an exploded view of the array camera module according to the above preferred embodiment of the present invention.

For example, in this specific example of the array camera module 100 shown in FIG. 2 to FIG. 4, the number of the drivers 30 is implemented as two, wherein each of the optical lenses 10 is drivably disposed in each of the drivers 30 respectively, and each of the drivers 30 is attached to the molding base 25 respectively in a manner in which each of the optical lenses 10 corresponds to each of the light windows 251 of the molding base 25, so that each of the optical lenses 10 is held in the photosensitive path of each of the photosensitive chips 22 via each of the drivers 30.

It is worth mentioning that in some specific examples of the array camera module 100 of the present invention, each of the drivers 30 drives each of the optical lenses 10 to move along the photosensitive path of each of the photosensitive chips 22, at the same time and in the same amplitude respectively. In some other specific examples of the array camera module 100 of the present invention, each of the drivers 30 drives each of the optical lenses 10 to move along the photosensitive path of each of the photosensitive chips 22, independently and respectively. For example, in this specific example of the array camera module 100 shown in FIG. 4, the driver 30 on the left side of the figure can drive the optical lens 10 to move along photosensitive path of the photosensitive chip 22, while the driver 30 on the right side of the figure may not move.

With further reference to FIG. 4, the array camera module 100 may comprise at least one filtering element 50, wherein each of the filtering elements 50 is held between each of the photosensitive chips 22 and each of the optical lenses 10 respectively for filtering stray light in the light entering the interior of the array camera module 100 from each of the optical lenses 10, thereby improving the imaging quality of the array camera module 100. The type of the filtering element 50 is not limited, for example, the filtering element 50 can be implemented as, but not limited to, an infrared cut-off filter.

For example, in this specific example of the array camera module 100 shown in FIG. 4, the array camera module 100 comprises two filtering elements 50, wherein each of the filtering elements 50 is attached to the molding base 25 respectively, and each of the filtering elements 50 is held between each of the photosensitive chips 22 and each of the optical lenses 10 respectively so as to filter, by each of the filtering elements 50, stray light in the light entering the interior of the array camera module 100 from each of the optical lenses 10. Nonetheless, it can be understood by those skilled in the art that in some other specific examples of the array camera module 100 of the present invention, the array camera module 100 may also comprise one filtering element 50, and at this point, more than two of the photosensitive chips 22 may be corresponding to different positions of the same filtering element 50 so as to filter, by the filtering element 50, stray light in the light entering the interior of the array camera module 100 from each of the optical lenses 10.

It is worth mentioning that in the example in which the array camera module 100 comprises more than two of the filtering elements 50, the type of each of the filtering elements 50 may be the same or may also be different, which is selected as needed. It can be understood by those skilled in the art that if the type of each of the filtering elements 50 of the array camera module 100 is different, each optical system of the array camera module 100 may have different imaging characteristics. It is worth mentioning that each optical system of the array camera module 100 is formed by one of the photosensitive chips 22 and one of the optical lenses 10 that is held in the photosensitive path of the photosensitive chip 22. For example, in this specific example of the array camera module 100 shown in FIG. 4, the type of the filtering element 50 on the left side of the figure and the type of the filtering element 50 on the right side of the figure may be different.

Further, the molding base 25 has an outer attaching face 252 and at least one inner attaching face 253, wherein each of the inner attaching faces 253 surrounds each of the light windows 251 of the molding base 25 respectively, and the outer attaching face 252 surrounds each of the inner attaching faces 253, and wherein each of the drivers 30 can be attached to different positions of the outer attaching face 252 of the molding base 25, and each of the filtering elements 50 can be attached to each of the inner attaching faces 253 of the molding base 25 respectively. In this way, each of the optical lenses 10 can be held in the photosensitive path of each of the photosensitive chips 22 respectively, and each of the filtering elements 50 can be held between each of the photosensitive chips 22 and each of the optical lenses 10.

In one example, the outer attaching face 252 and the inner attaching face 253 of the molding base 25 can be in a same plane. In another example, there may be a height difference between the outer attaching face 252 and the inner attaching face 253 of the molding base 25 so as to form at least one attaching groove 254 of the molding base 25. Specifically, the plane where the inner attaching face 253 of the molding base 25 is located is lower than the plane where the outer attaching face 252 is located, so that the molding base 25 forms the attaching groove 254 at a position corresponding to the inner attaching face 253, and therefore, the filtering element 50 attached to the inner attaching face 253 is held in the attaching groove 254. In this way, the height of the array camera module 100 can be further reduced, with reference to the array camera module 100 shown in FIG. 4.

Figure 7:
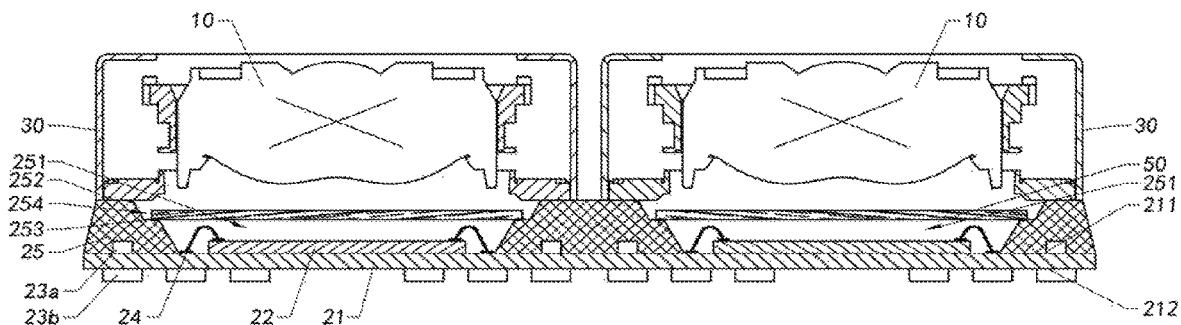
FIG. 7 is a schematic sectional view of a variant implementation of the array camera module according to the above preferred embodiment of the present invention.

It is worth mentioning that in this specific example of the array camera module 100 shown in FIG. 4, all of the electronic components 23 can be attached to the back face 212 of the circuit board 21 in a mutually spaced manner, while in a variant implementation of the array camera module 100 shown in FIG. 7, at least one of the electronic components 23 can be attached to the back face 212 of the circuit board 21, and other electronic components 23 can be attached to the front face 211 of the circuit board 21. For the convenience of the following description, the electronic component 23 attached to the front face 211 of the circuit board 21 is defined as a first electronic component 23a, and the electronic component 23 attached to the back face 212 of the circuit board 21 is defined as a second electronic component 23b.

That is, the circuit board assembly 20 can comprise at least one first electronic components 23a and at least one second electronic components 23b, wherein each of the first electronic components 23a is attached to the front face 211 of the circuit board 21 respectively in a mutually spaced manner, and each of the second electronic components 23b is attached to the back face 212 of the circuit board 21 respectively in a mutually spaced manner.

It is worth mentioning that the electronic components 23 are divided into the first electronic components 23a and the second electronic components 23b according to the position where the electronic components 23 are attached to, which is only for the convenience of description and easy understanding of the array camera module 100 of the present invention, and does not constitute limiting of the content and scope of the array camera module 100 of the present invention, wherein the type of the first electronic component 23a and the second electronic component 23b may be identical.

In addition, the electronic components 23 that achieve the same function or the same type of function can be attached on one side of the circuit board 21, and the electronic components 23 that achieve another function or another type of function can be attached on the other side of the circuit board 21, and the array camera module 100 of the present invention is not limited in these respects.

After each of the first electronic components 23a is attached to the front face 211 of the circuit board 21 in a mutually spaced manner, each of the first electronic components 23a can be disposed in the circumferential direction of the photosensitive chip 22. For example, each of the first electronic components 23a can be disposed in one side portion, or two opposite side portions, or two adjacent side portions, or a plurality of side portions of the photosensitive chip 22. After each of the second electronic components 23b is attached to the back face 212 of the circuit board 21 in a mutually spaced manner, in the height direction of the array camera module 100, the second electronic component 23b and the photosensitive chip 22 can overlap each other, or the second electronic component 23b and the first electronic component 23a can overlap each other, so as to facilitate the reduction in the length and width of the array camera module 100, thereby facilitating the application of the array camera module 100 to the electronic device that is intended to be lighter and thinner.

In the example of the array camera module 100 shown in FIG. 7, at least a part of the at least one first electronic components 23a can be embedded by the molding base 25. Preferably, the molding base 25 can embed all of the first electronic components 23a. In this way, in one aspect, the first electronic component 23a can prevent the molding base 25 from falling off from the front face 211 of the circuit board 21; in a second aspect, the molding base 25 can prevent the first electronic component 23a from coming into contact with the external environment, thereby avoiding the oxidation and other undesirable phenomena of the surface of the first electronic component 23a; in a third aspect, the molding base 25 can isolate adjacent first electronic components 23a, thereby avoiding mutual interference and other undesirable phenomena of the adjacent first electronic components 23a so as to improve imaging quality of the array camera module 100; in a fourth aspect, the molding base 25 can isolate adjacent first electronic components 23a, so that the distance between the adjacent first electronic components 23a is shorter so as to facilitate the attaching of more and larger first electronic components 23a onto the circuit board 21 over a limited area, thereby improving the performance of the array camera module 100; in a fifth aspect, there is no need to reserve a safe distance between the molding base 25 and the first electronic component 23a, so that all of the length, the width, and the height of the array camera module 100 can be reduced, thereby facilitating the miniaturization of the array camera module 100; and in a sixth aspect, the molding base 25 can isolate the first electronic component 23a from the photosensitive area of the photosensitive chip 22 so as to prevent the photosensitive area of the photosensitive chip 22 from being contaminated by contaminants such as impurities falling from the surface of the first electronic component 23a or solder powder falling off from a connection position between the first electronic component 23a and the circuit board 21, thereby facilitating ensuring the imaging quality of the array camera module 100.

In these examples of the array camera module 100 shown in FIG. 4 and FIG. 7, the second electronic component 23b is exposed. However, in the example of the array camera module 100 shown in FIG. 8, the second electronic component 23b can also be embedded. Specifically, the circuit board assembly 20 further comprises at least one embedding portion 27, wherein the embedding portion 27 is integrally formed on the back face 212 of the circuit board 21 so as to embed at least a part of the at least one second electronic components 23b.

Figure 9:
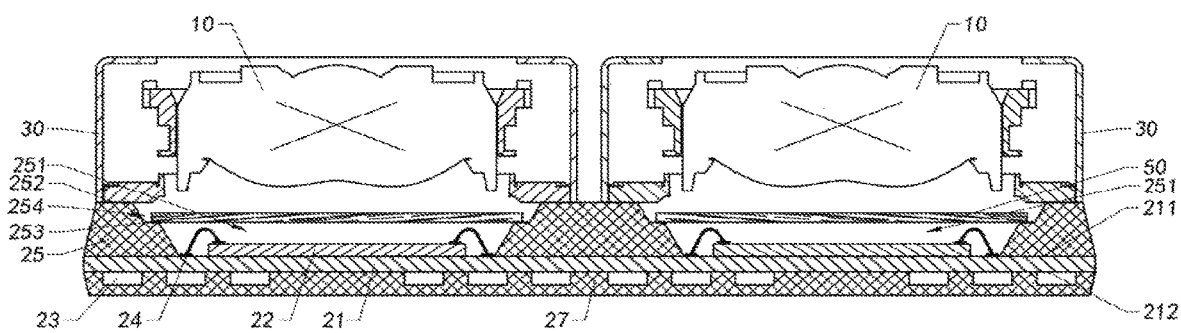
FIG. 9 is a schematic sectional view of another variant implementation of the array camera module according to the above preferred embodiment of the present invention.

FIG. 9 shown another variant implementation of the array camera module 100, which differs from the array camera module 100 shown in FIG. 4 in that in this specific example of the array camera module 100 shown in FIG. 9, the circuit board assembly 20 comprises at least one embedding portions 27, wherein the embedding portion 27 is integrally bonded to the back face 212 of the circuit board 21, and the embedding portion 27 can embed at least a part of the at least one electronic components 23 that protrudes from the back face 212 of the circuit board 21.

Preferably, the embedding portion 27 can embed all of the electronic components 23 protruding from the back face 212 of the circuit board 21. In this way, in one aspect, the electronic component 23 can prevent the embedding portion 27 from falling off from the back face 212 of the circuit board 21; in a second aspect, the embedding portion 27 can prevent the electronic component 23 from coming into contact with the external environment, thereby avoiding the oxidation and other undesirable phenomena of the surface of the electronic component 23; in a third aspect, the embedding portion 27 can isolate adjacent electronic components 23 so as to avoid mutual interference and other undesirable phenomena of the adjacent electronic components 23, thereby improving the imaging quality of the array camera module 100; in a fourth aspect, the embedding portion 27 can isolate adjacent electronic components 23, so that the distance between the adjacent electronic components 23 is shorter, so as to facilitate the attaching of more and larger electronic components 23 onto the circuit board 21 over a limited area, thereby improving the performance of the array camera module 100; and in a fifth aspect, the embedding portion 27 can also ensure the flatness of the circuit board 21, so that a plate with thinner thickness can be employed for the circuit board 21, for example, an FPC circuit board or a soft and hard plate, thereby facilitating the reduction in the height of the array camera module 100.

Figure 10:
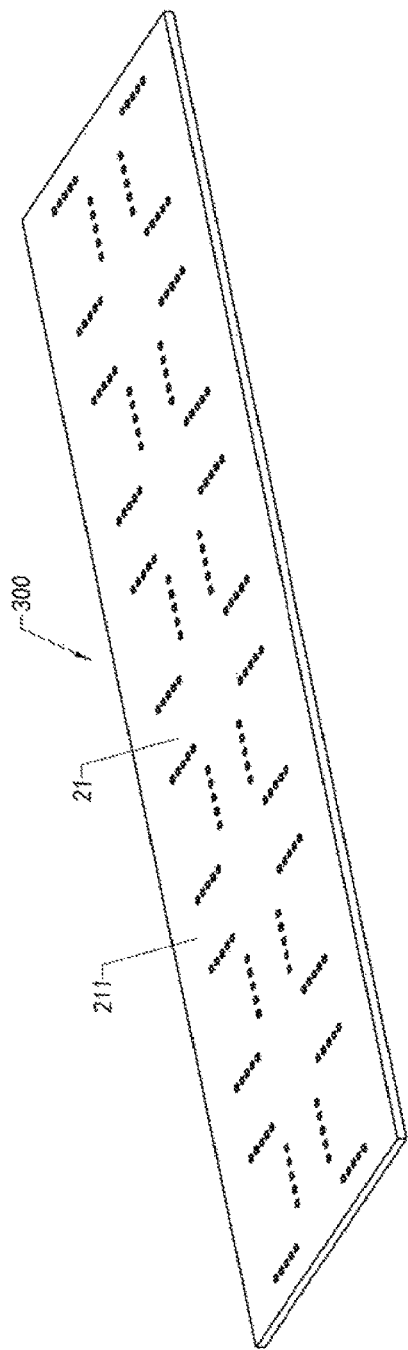
FIG. 10 is a schematic diagram of a manufacturing step of the array camera module according to the above preferred embodiment of the present invention.

FIG. 10 to FIG. 22 of the accompanying drawings of the present invention show a manufacturing process of the array camera module 100, wherein at the stage shown in FIG. 10, more than two circuit boards 21 can be arranged together to form a jointed board unit 300, thereby performing a subsequent molding process. For example, a plurality of the circuit boards 21 can be arranged into, but not limited to, two rows to form the jointed board unit 300. Of course, it can be understood by those skilled in the art that in other examples of the array camera module 100 of the present invention, the jointed board unit 300 can comprises more rows of the circuit boards 21.

It is worth mentioning that the circuit boards 21 can be arranged after formed so as to form the jointed board unit 300, for example, the circuit boards 21 formed independently can be arranged on one substrate to form the jointed board unit 300, or a plurality of circuit boards 21 can be of an integral structure, which is separated by cutting after subjected to the molding process. In the following description of the present invention, taking a plurality of circuit boards 21 being of an integral structure as an example, the manufacturing process of the array camera module 100 is disclosed and illustrated continuously.

Figure 11:
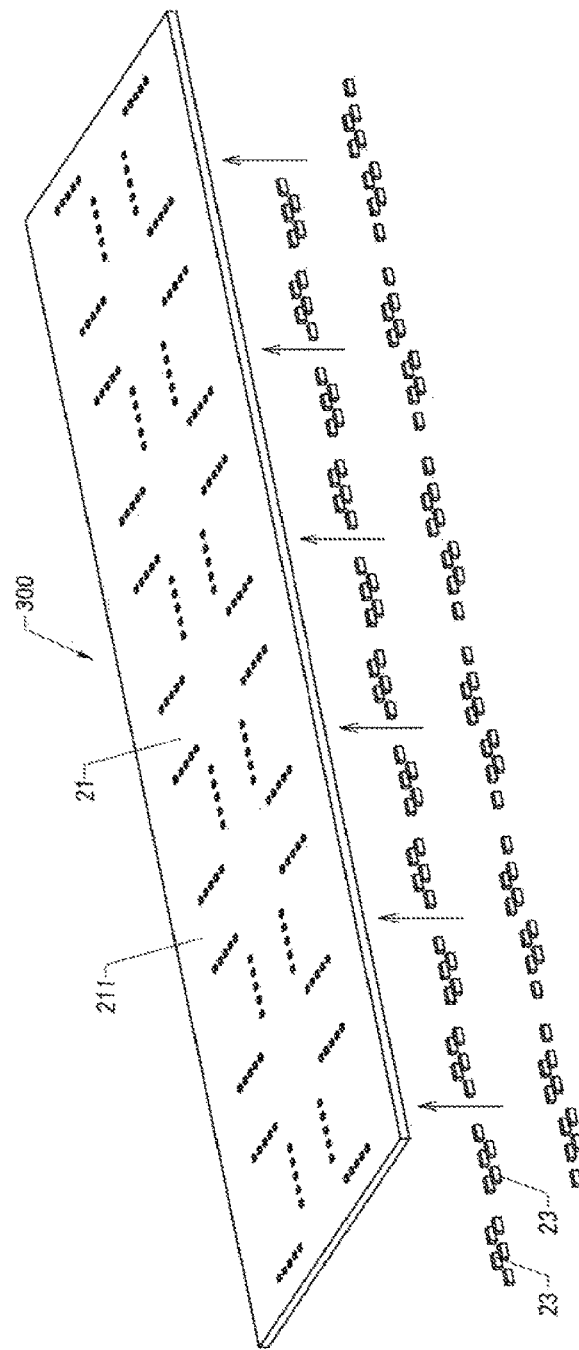
FIG. 11 is a schematic diagram of another manufacturing step of the array camera module according to the above preferred embodiment of the present invention.

At the stage shown in FIG. 11, each of the electronic components 23 can be attached to the circuit board 21 on the back face 212 of the circuit board 21, respectively. Nonetheless, it can be understood by those skilled in the art that some of the electronic components 23 can be attached to the back face 212 of the circuit board 21, and some other electronic components 23 also can be attached to the front face 211 of the circuit board 21. The array camera module 100 of the present invention is not limited in this respect.

It is worth mentioning that although in the specific example of the array camera module 100 shown in FIG. 11, the electronic component 23 is attached to the back face 212 of the circuit board 21, in some other specific examples, at least a part of the electronic component 23 also can be embedded in the back face 212 of the circuit board 21, for example, a portion of the electronic component 23 can be embedded in the circuit board 21, and the other portion of the electronic component 23 is exposed to or protrudes from the back face 212 of the circuit board 21. Alternatively, the electronic component 23 can also be entirely embedded in the circuit board 21.

It is also worth mentioning that in the example of manufacturing each of the circuit boards 21 independently and arranging each of the circuit boards 21 into the jointed board unit 300, each of the electronic components 23 can also be attached to the back face 212 of the circuit board 21 firstly, and each of the circuit boards 21 are then arranged to form the jointed board unit 300.

In addition, the circuit boards 21 can be arranged into patterns that are different from those shown in FIG. 10 and FIG. 11, or the circuit board 21 also cannot be arranged, so that in a subsequent molding process, the molding process can be performed on the circuit board 21 independently so as to form the molding base 25 that is integrally bonded to the circuit board 21.

Preferably, the distance between adjacent circuit boards 21 of the jointed board unit 300 ranges from 0.01 mm to 500 mm (including 0.01 mm and 500 mm) so as to facilitate the cutting of the circuit board 21 after the molding process is completed. Preferably, the distance between adjacent substrate 311 ranges from 0.05 mm to 200 mm (including 0.05 mm and 200 mm). In addition, in order to improve the stability of partial molding, the minimum size of the jointed board unit 300 ranges from 1 mm to 100000 mm (including 1 mm and 100000 mm), preferably 10 mm to 1000 mm (including 10 mm and 1000 mm).

With reference to FIG. 12A to FIG. 15, the jointed board unit 300 is placed in a molding die 400 to perform a molding process, wherein the molding die 400 comprises an upper die 401 and a lower die 402, wherein at least one of the upper die 401 and the lower die 402 can be operated to enable the upper die 401 and the lower die 402 of the molding die 400 to be clamped and demolded. Preferably, the upper die 401 comprises a first upper die 401*a* and a second upper die 401*b*, wherein at least one of the first upper die 401*a* and the lower die 402 can be operated to enable the first upper die 401*a* and the lower die 402 to be clamped and demolded, and at least one of the first upper die 401*b* and the lower die 402 can be operated to enable the second upper die 401*b* and the lower die 402 to be clamped and demolded.

Figure 12A:
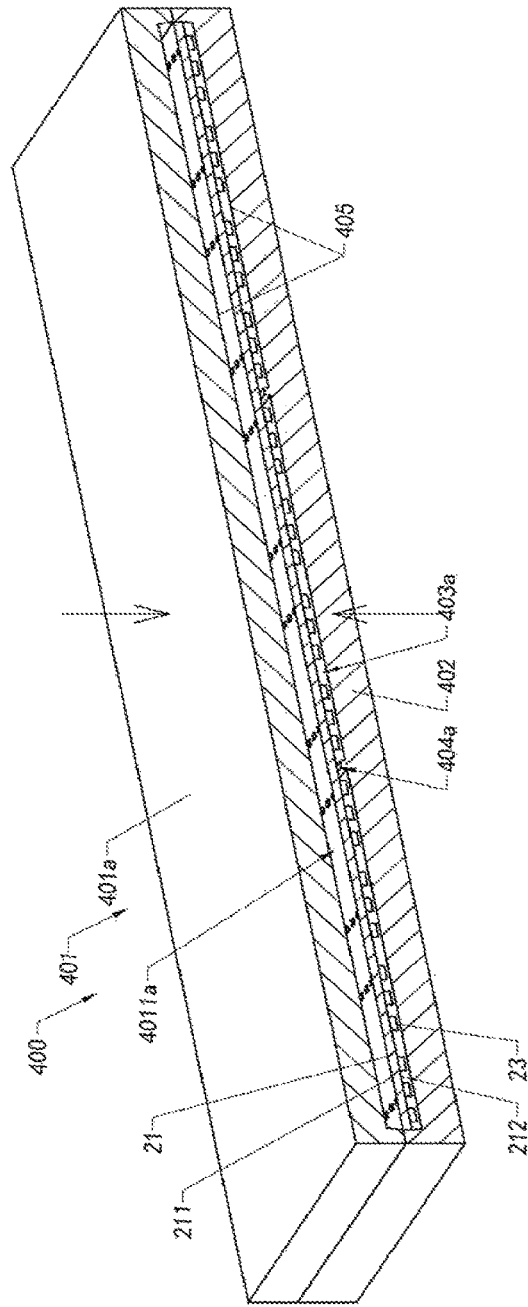
FIG. 12A and FIG. 12B are schematic diagrams of another manufacturing step of the array camera module according to the above preferred embodiment of the present invention.
Figure 12B:
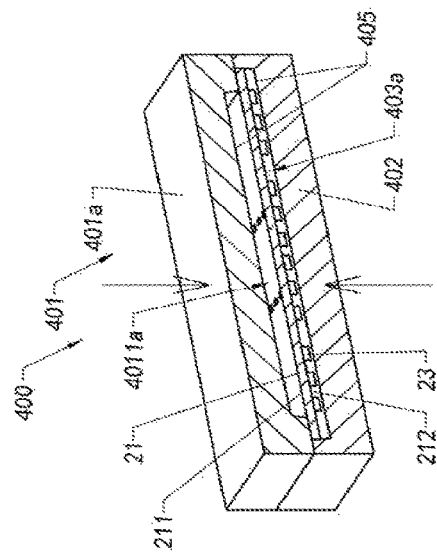

With reference to FIG. 12A and FIG. 12B, the jointed board unit 300 is placed between the first upper die 401*a* and the lower die 402 of the molding die 400, and at least one lower molding space 403*a* is formed between the jointed board unit 300 and the lower die 402. The back face 212 of the circuit board 21 of the jointed board unit 300 faces towards the lower die 402, the electronic component 23 protruding from the back face 212 of the circuit board 21 is held in the lower molding space 403*a*, and the inner wall of the lower die 402 is prevented from coming into contact with the electronic component 23. In this way, the electronic component 23 can be prevented from damage due to being pressed or contacting with the inner wall of the lower die 402. Preferably, at least one lower communication channel 404*a* is also be formed between the jointed board unit 300 and the lower die 402 for connecting adjacent lower molding spaces 403*a*. Preferably, the first upper die 401*a* has at least one first yielding space 4011*a*, wherein after the first upper die 401*a* and the lower die 402 are clamped and the jointed board unit 300 is held between the first upper die 401*a* and the lower die 402, a circuit board connector that protrudes from the front face 211 of the circuit board 21 is held in the first yielding space 4011*a* of the first upper die 301*a* so as to prevent the circuit board connector that protrudes from the front face 211 of the circuit board 21 from being damaged due to being pressed.

The molding die 400 can also comprise a covering film 405, wherein the covering film 405 is disposed on the inner surface of the first upper die 401*a* and the inner surface of the lower die 402 in an overlapping manner, so that after the first upper die 401*a* and the lower die 402 are subjected to a clamping operation, the covering film 405 can be held between the first upper die 401*a* and the front face 211 of the circuit board 21 and between the lower die 402 and the back face 212 of the circuit board 21, thereby preventing the first upper die 401*a* and the lower die 402 from damaging the front face 211 and the back face 212 of the circuit board 21 due to contacting with the surface of the circuit board 21. Preferably, the covering film 405 is elastic, so that when the first upper die 401*a* and the lower die 402 are clamped, the covering film 405 can absorb the impact force generated by the first upper die 401*a* and the lower die 402 due to clamping so as to prevent the impact force from acting on the circuit board 21, thereby protecting the circuit board 21.

Figure 13:
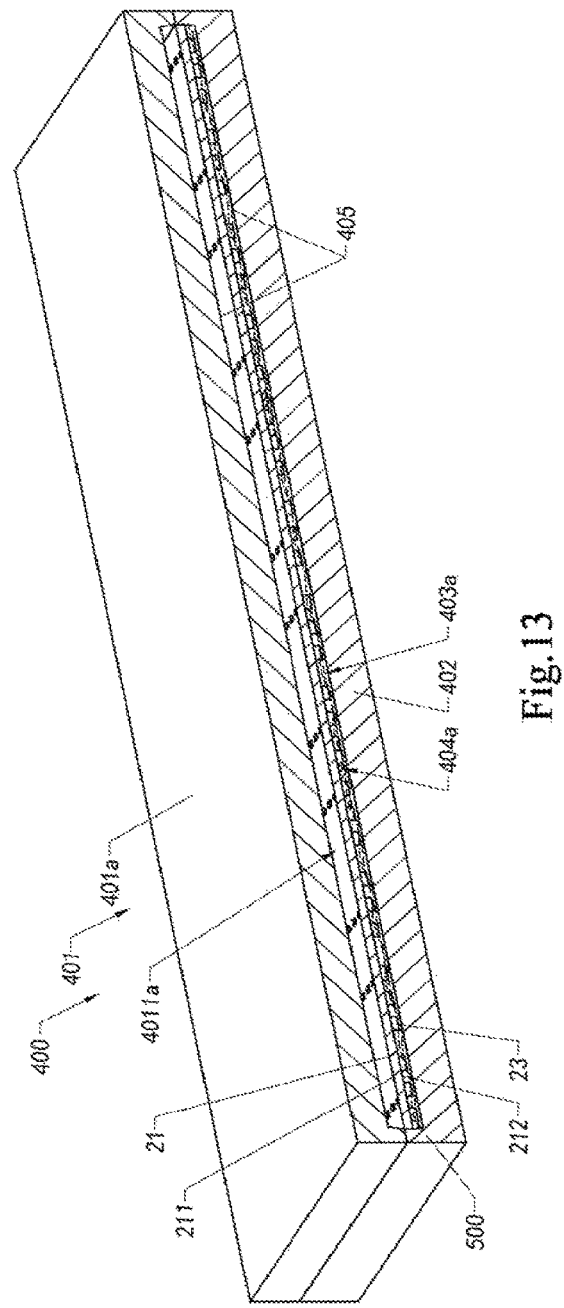
FIG. 13 is a schematic diagram of another manufacturing step of the array camera module according to the above preferred embodiment of the present invention.
Figure 14:
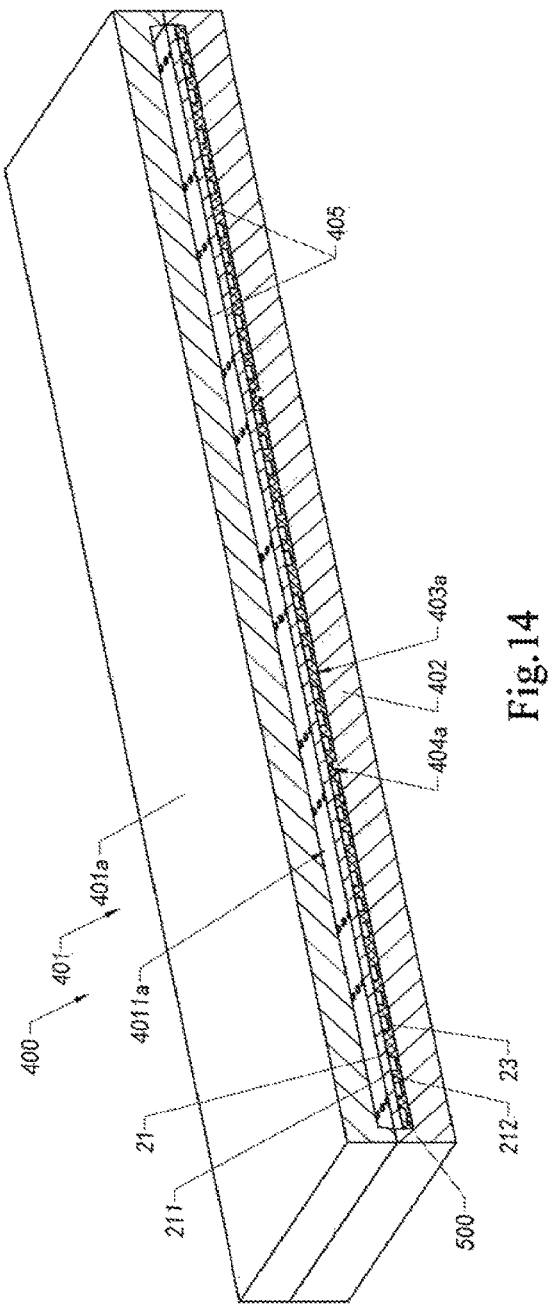
FIG. 14 is a schematic diagram of another manufacturing step of the array camera module according to the above preferred embodiment of the present invention.
Figure 15:
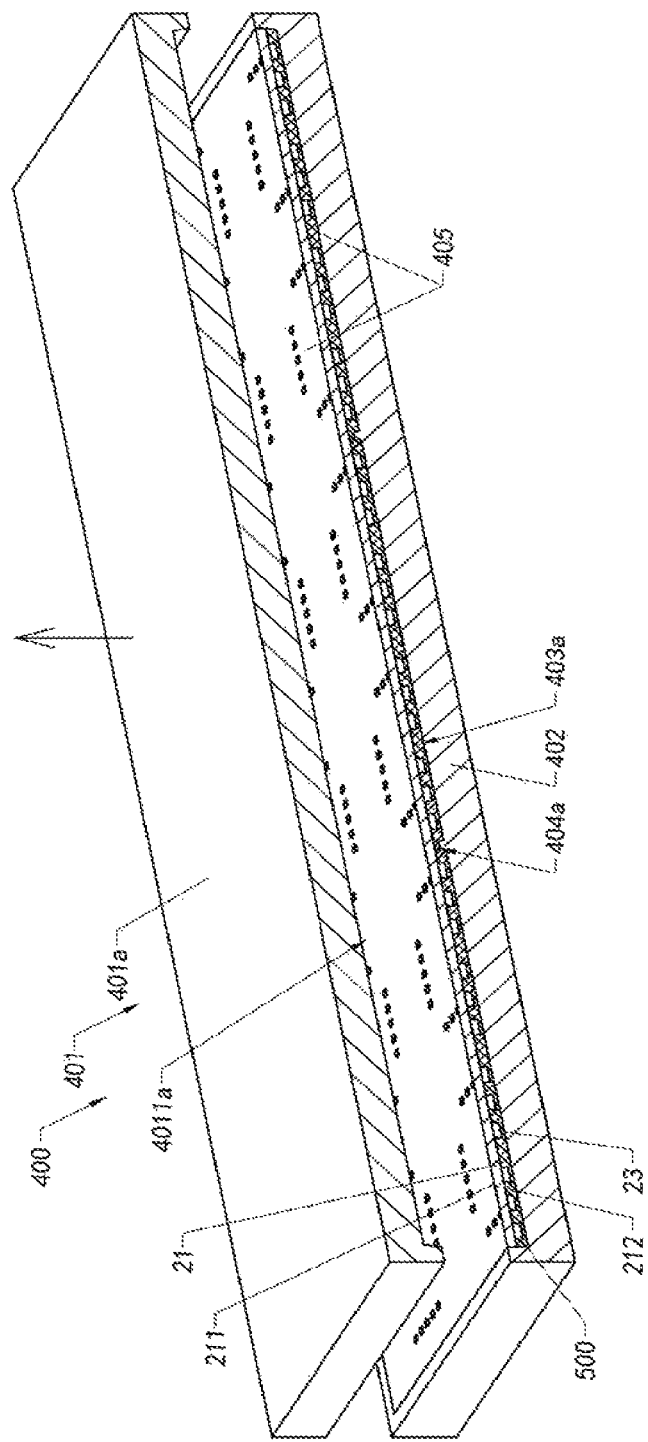
FIG. 15 is a schematic diagram of another manufacturing step of the array camera module according to the above preferred embodiment of the present invention.

With reference to FIG. 13 to FIG. 15, a fluid-state molding material 500 is added into at least one of the lower molding spaces 403*a*, wherein the molding material 500 can fill up all of the lower molding spaces 403*a* of the molding die 400 through the lower communication channel 404*a*, and after the molding material 500 is solidified in the lower molding space 403*a* and the molding die 400 is subjected to a demolding operation, an integral embedding portion 270 that is integrally bonded to the back face 212 of the circuit board 21 is formed, wherein the integral embedding portion 270 embeds the electronic component 23 that protrudes from the back face 212 of the circuit board 21.

With reference to FIG. 16A and FIG. 16B, the second upper die 401*b* and the lower die 402 are operated to enable the second upper die 401*bb* and the lower die 402 to be clamped, thereby forming an upper molding space 403*b* between the second upper die 401*b* and the jointed board unit 400. The front face 211 of the circuit board 21 of the jointed board unit 300 faces towards the upper molding space 403*b*. Preferably, at least one upper communication channel 404*b* can also be formed between the jointed board unit 400 and the second upper die 401*b* for connecting adjacent upper molding spaces 403*b*. Preferably, the second upper die 401*bb* has at least one second yielding space 4011*b*, wherein after the second upper die 401*b* and the lower die 402 are clamped and the jointed board unit 3400 is held between the second upper die 401*b* and the lower die 402, the circuit board connector that protrudes from the front face 211 of the circuit board 21 is held in the second yielding space 4011*b* of the second upper die 401*b* so as to prevent the circuit board connector that protrudes from the front face 211 of the circuit board 21 from being damaged due to being pressed.

The covering film 405 is disposed on the inner surface of the second upper die 401*b* in an overlapping manner, so that after the second upper die 401*b* and the lower die 402 are subjected to a clamping operation, the covering film 405 can be held between the second upper die 401*b* and the front face 211 of the circuit board 21, thereby preventing the second upper die 401*b* from damaging the front face 211 of the circuit board 21 due to contacting with the surface of the circuit board 21. Since the covering film 405 is elastic, when the second upper die 401*b* and the lower die 402 are clamped, the covering film 405 can absorb the impact force generated by the second upper die 401*b* and the lower die 402 due to clamping so as to prevent the impact force from acting on the circuit board 21, thereby protecting the circuit board 21.

Figure 17:
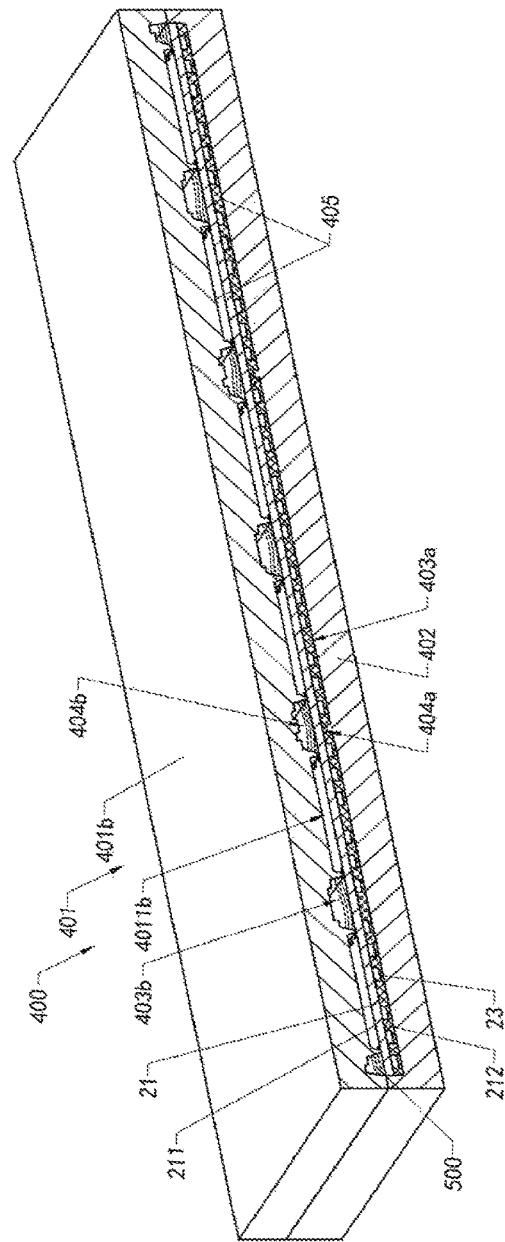
FIG. 17 is a schematic diagram of another manufacturing step of the array camera module according to the above preferred embodiment of the present invention.
Figure 18:
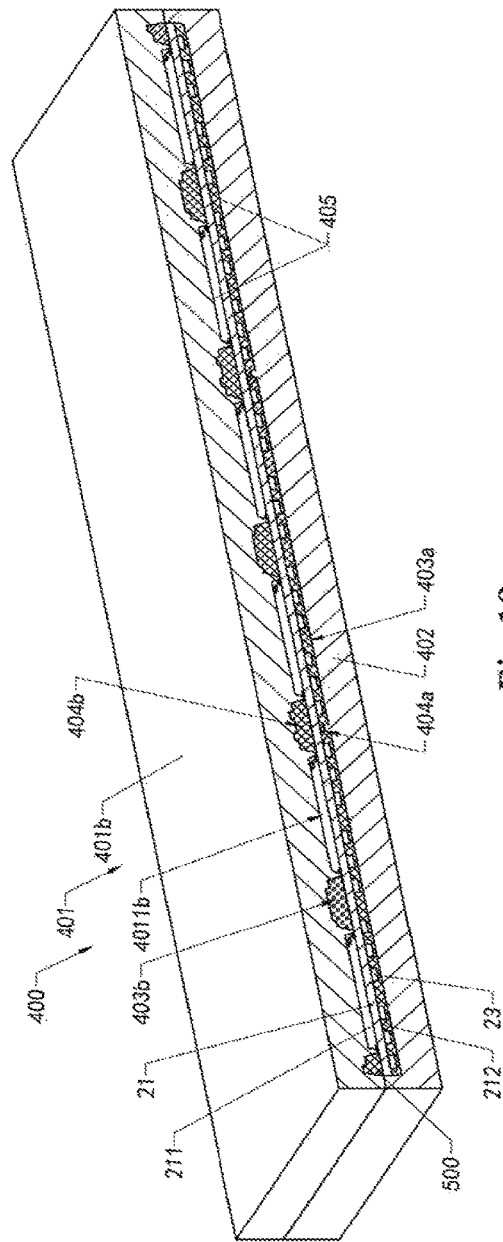
FIG. 18 is a schematic diagram of another manufacturing step of the array camera module according to the above preferred embodiment of the present invention.
Figure 19:
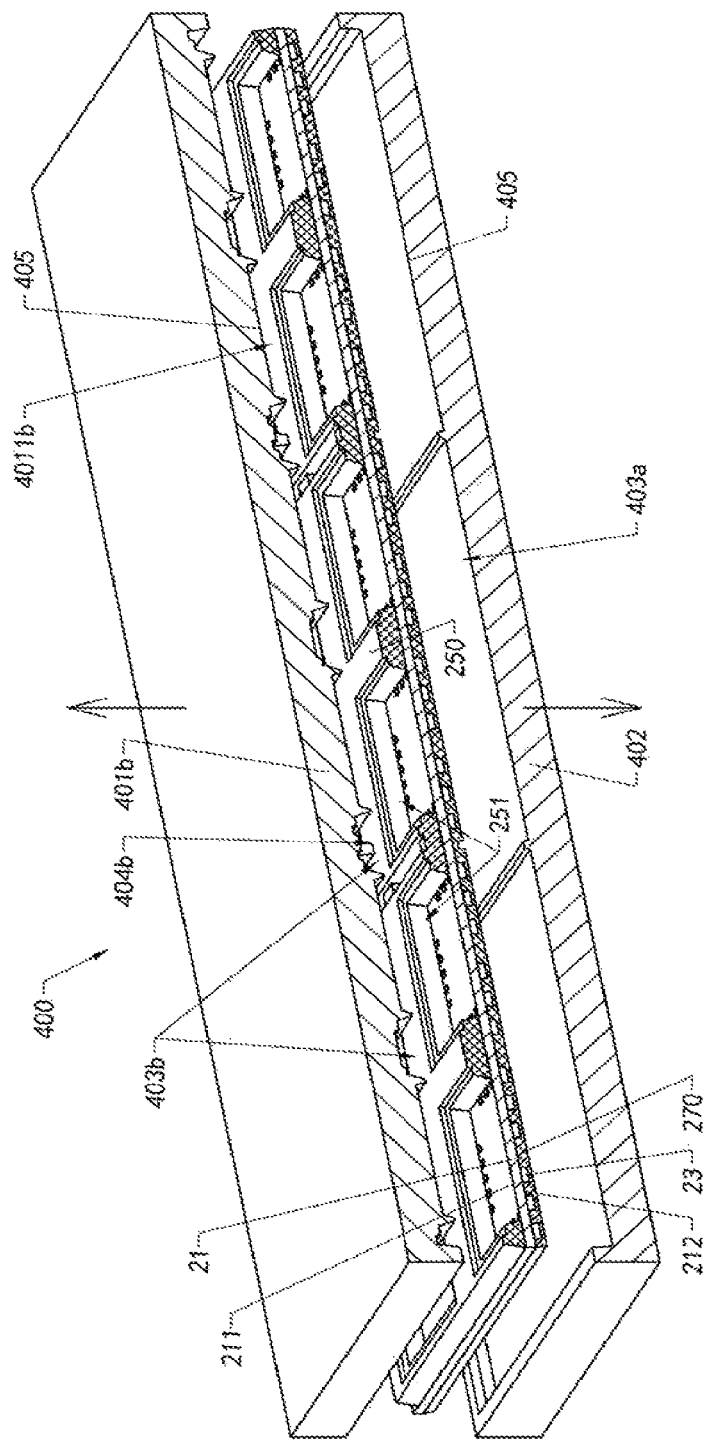
FIG. 19 is a schematic diagram of another manufacturing step of the array camera module according to the above preferred embodiment of the present invention.

With reference to FIG. 17 to FIG. 19, the fluid-state molding material 500 is added into at least one of the upper molding spaces 403*b*, wherein the molding material 500 can fill up all of the upper molding spaces 404 of the molding die 400 through the upper communication channel 404*b*, and after the molding material 500 is solidified in the upper molding space 403*b* and the molding die 400 is subjected to a demolding operation, an integral molding base 250 that is integrally bonded to the front face 211 of the circuit board 21 is formed, and each of the light windows 251 is formed at the same time, wherein the circuit board connector that protrudes from the front face 211 of the circuit board 21 is located in the light window 251.

It is worth mentioning that the covering film 405 can prevent, by means of deformation, a gap from being formed between the second upper die 401*b* and the front face 211 of the circuit board 21, so that at the stage shown in FIG. 17 and FIG. 18, not only can the fluid-state molding material 500 be prevented from entering the second yielding space 4011*b* from the upper molding space 403*b* or the upper communication channel 404*b*, but also the fluid-state molding material 500 can be prevented from entering between the second upper die 401*b* and the front face 211 of the circuit board 21 so as to avoid an undesirable phenomenon of "flash". In addition, provision of the covering film 405 can be advantageous for the demolding of the second upper die 401*b* and the lower die 402. It can be understood that an integral circuit board assembly 200 is obtained after the molding die 400 is subjected to a demolding process. The integral circuit board assembly 200 comprises the circuit board 21, the electronic component 23 that is attached to the circuit board 21 and the integral embedding portion 270 and/or the integral molding base 250 that is integrally bonded to the circuit board 21. That is, the integral circuit board assembly 200 can only comprise one of the integral embedding portion 270 and the integral molding base 250.

It is worth mentioning that the molding material 500 can be, but not limited to, solid particles, liquid, and mixtures of solid particles and liquid.

Figure 20:
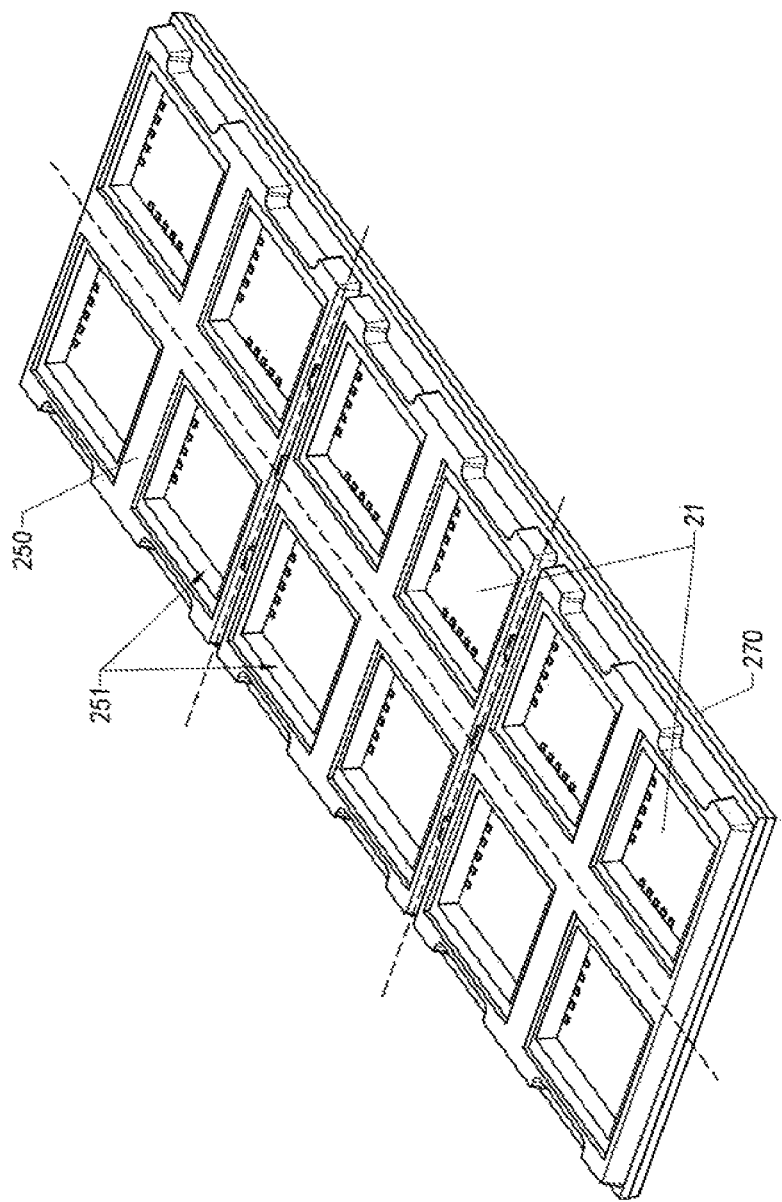
FIG. 20 is a schematic diagram of another manufacturing step of the array camera module according to the above preferred embodiment of the present invention.

With further reference to the stage shown in FIG. 20, after the integral circuit board assembly 200 is obtained in a manner in which the integral embedding portion 270 and the integral molding base 250 are molded on the jointed board unit 300 by the molding die 400 by a molding process, the circuit board 21, the integral molding base 250, and the integral embedding portion 270 that constitute the jointed board unit 300 can be divided to obtain a semi-finished product of the circuit board assembly 20, for example, excessive portions of the circuit board 21, the integral molding base 250, and the integral embedding portion 270 can be removed by a process such as cutting or etching to obtain the semi-finished product of the circuit board assembly 20, wherein the integral molding base 250 forms the molding base 25 after being divided, and the integral embedding portion 270 forms the embedding portion 27 after being divided.

Figure 21:
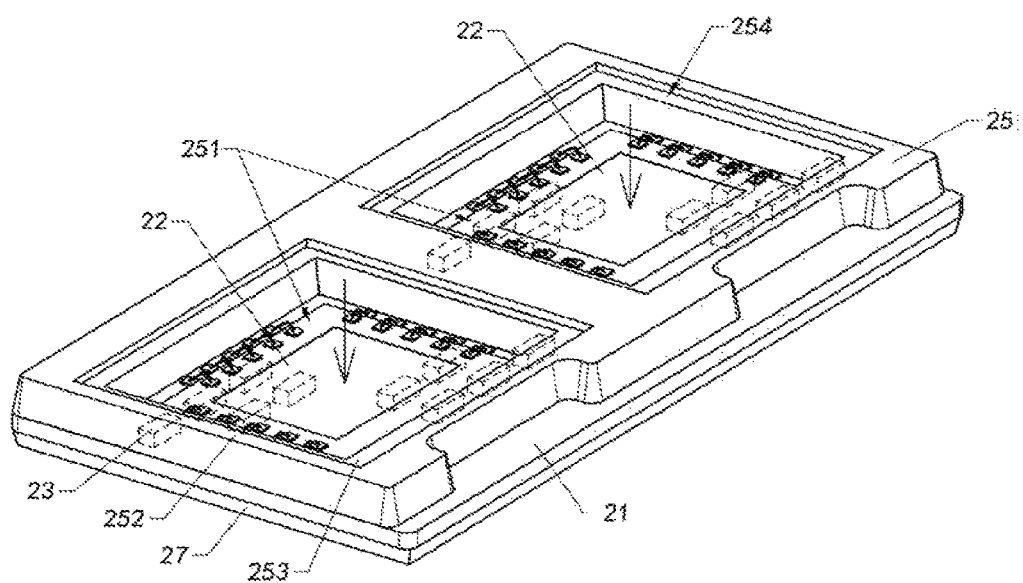
FIG. 21 is a schematic diagram of another manufacturing step of the array camera module according to the above preferred embodiment of the present invention.

At the stage shown in FIG. 21, the photosensitive chip 22 is attached to the front face of the circuit board 21 via the light window 251 of the molding base 25, and the lead 24 is formed between the chip connector of the photosensitive chip 22 and the circuit board connector of the circuit board 21 by a wiring process so as to obtain the circuit board assembly 20, wherein the photosensitive area of the photosensitive chip 22 corresponds to the light window 251 of the molding base 25.

Figure 22:
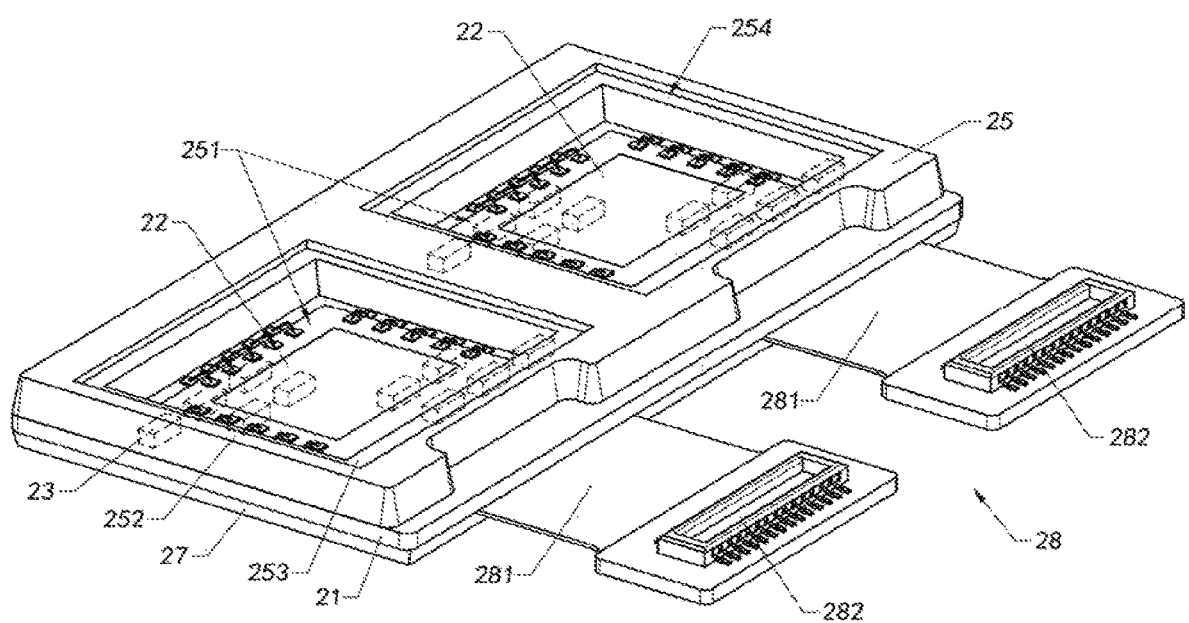
FIG. 22 is a schematic diagram of another manufacturing step of the array camera module according to the above preferred embodiment of the present invention.

Further, the circuit board assembly 20 comprises a connection plate unit 28, wherein the connection plate unit 28 further comprises at least one connection plate 281 and at least one mounting member 282 that is disposed at a free end of the connection plate 281, and wherein at the stage shown in FIG. 22, the connection plate 281 of the connection plate unit 28 can be attached to the circuit board 21, and the circuit board 21 and the connection plate 281 can be connected. Preferably, the connection plate 281 of the connection plate unit 28 can be deformed, thereby facilitating the subsequent assembling of the array camera module 100 into the electronic device.

It is worth mentioning that although at the stage shown in FIG. 22, the connection plate 281 of the connection plate unit 28 is attached to the back face 212 of the circuit board 21, in other possible examples of the array camera module 100 of the present invention, the connection plate 281 of the connection plate unit 28 can also be attached to the front face 211 of the circuit board 21. Alternatively, the connection plate 281 of the connection plate unit 28 and the circuit board 21 can also be of an integral structure.

It is also worth mentioning that although in this specific example of the array camera module 100 shown in FIG. 2 and FIG. 22, a connecting end of the connection plate 281 of the connection plate unit 28 is attached in the width direction of the circuit board 21, so that the connection plate 281 is held in a side portion of the array camera module 100, in some other examples of the array camera module 100 of the present invention, the connecting end of the connection plate 281 of the connection plate unit 28 can also be attached in the length direction of the circuit board 21, so that the connection plate 281 is held in an end portion of the array camera module 100. The array camera module 100 of the present invention is not limited in this respect.

Figure 23:
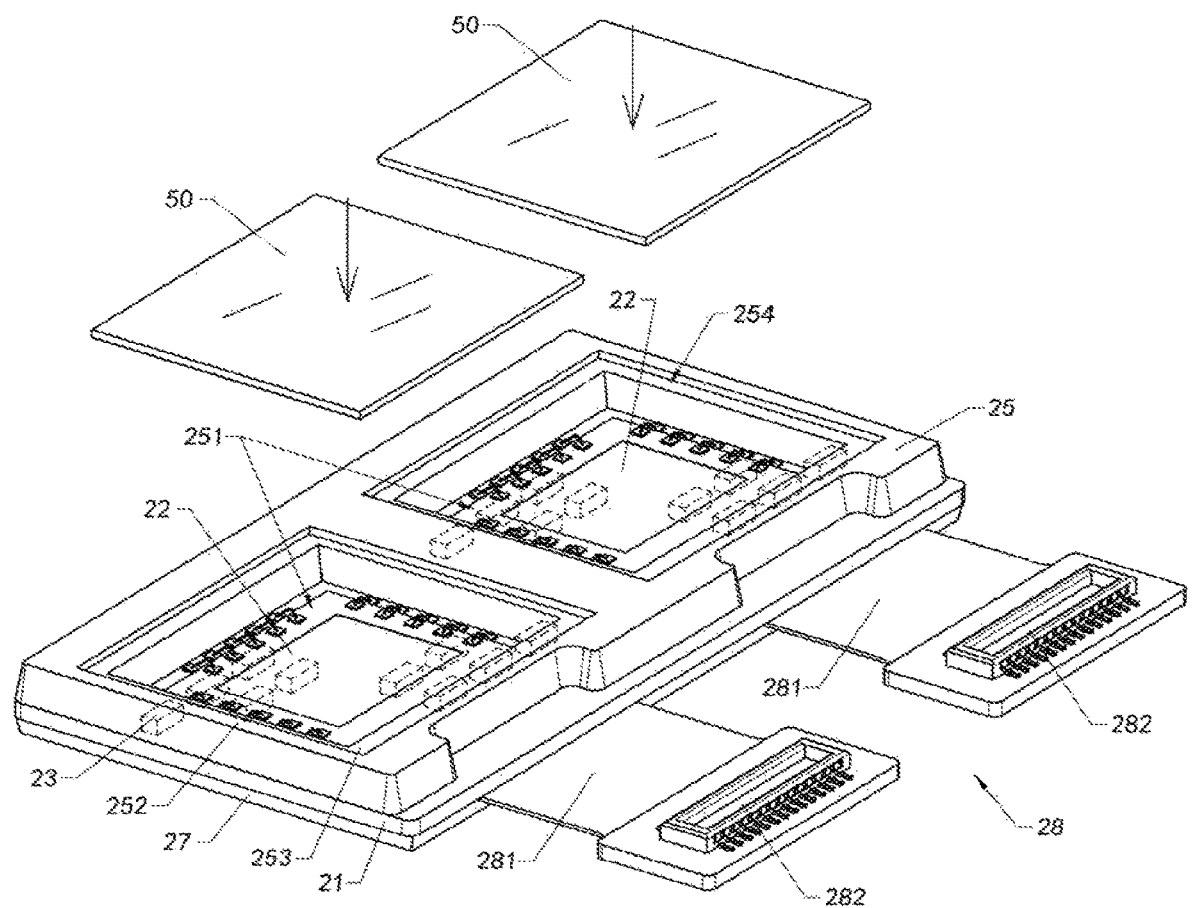
FIG. 23 is a schematic diagram of another manufacturing step of the array camera module according to the above preferred embodiment of the present invention.
Figure 24:
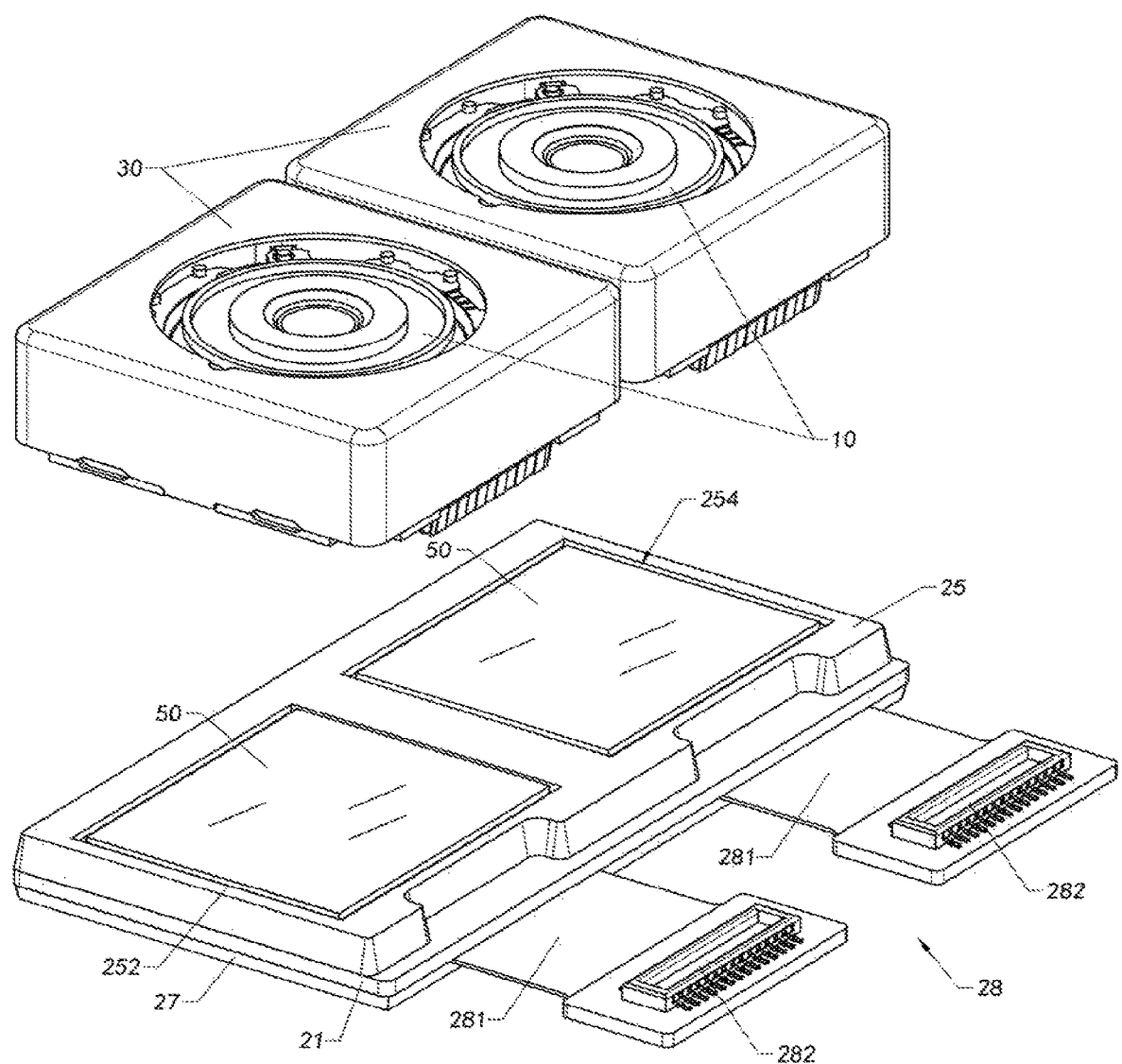
FIG. 24 is a schematic diagram of another manufacturing step of the array camera module according to the above preferred embodiment of the present invention.

With reference to the stage shown in FIG. 23, the filtering element 50 is attached to the inner attaching face 253 of the molding base 25, so that the filtering element 50 is held in the photosensitive path of the photosensitive chip 22. Moreover, at the stage shown in FIG. 24, the driver 30 assembled with the optical lens 10 is attached to the outer attaching face 252 of the molding base 25, so that the optical lens 10 is held in the photosensitive path of the photosensitive chip 22, and the filtering element 50 is held between the optical lens 10 and the photosensitive chip 22, thereby producing the array camera module 100 shown in FIG. 9.

Figure 8:
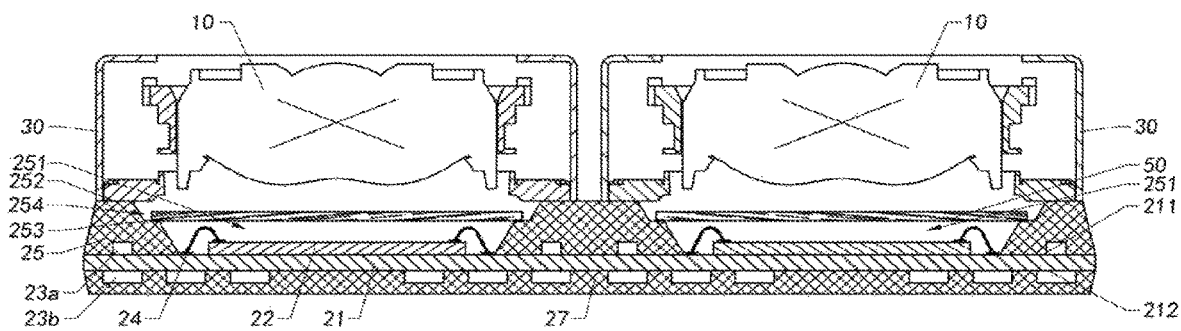
FIG. 8 is a schematic sectional view of another variant implementation of the array camera module according to the above preferred embodiment of the present invention.
Figure 25:
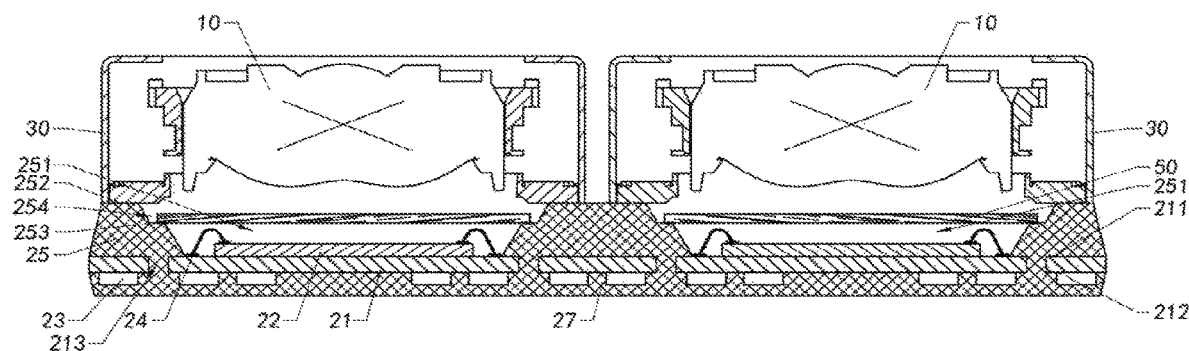
FIG. 25 is a schematic sectional view of another variant implementation of the array camera module according to the above preferred embodiment of the present invention.

FIG. 25 shown a variant implementation of the array camera module 100, which differs from the array camera module 100 shown in FIG. 8 in that in the specific example of the array camera module 100 shown in FIG. 25, the circuit board 21 can have at least one molding channel 213, wherein the molding channel 213 extends from the front face 211 of the circuit board 21 to the back face 214, so that the molding base 25 and the embedding portion 27 can be formed simultaneously in a molding process.

Figure 26:
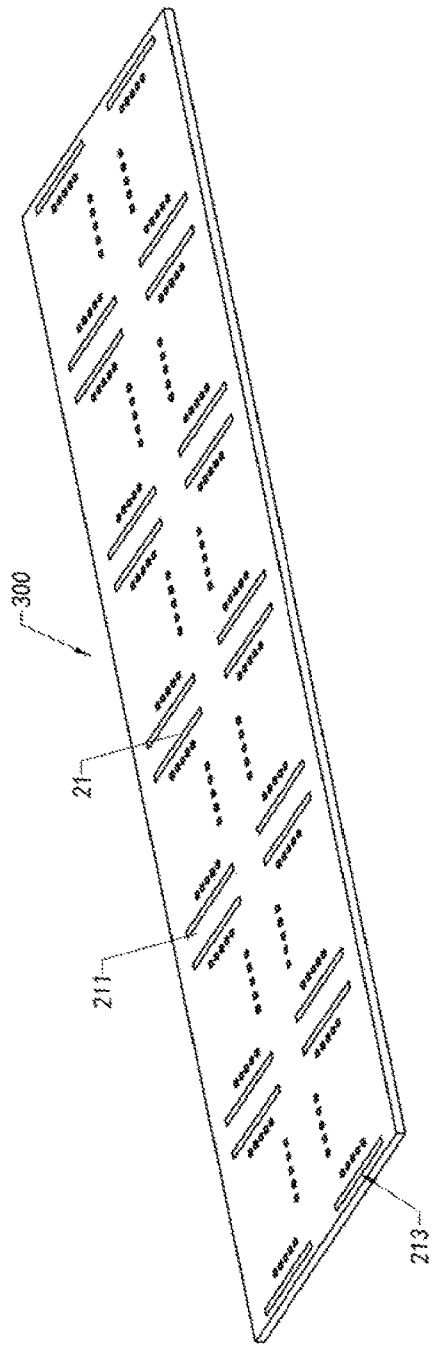
FIG. 26 is a schematic diagram of a manufacturing step of the array camera module according to the above preferred embodiment of the present invention.
Figure 27:
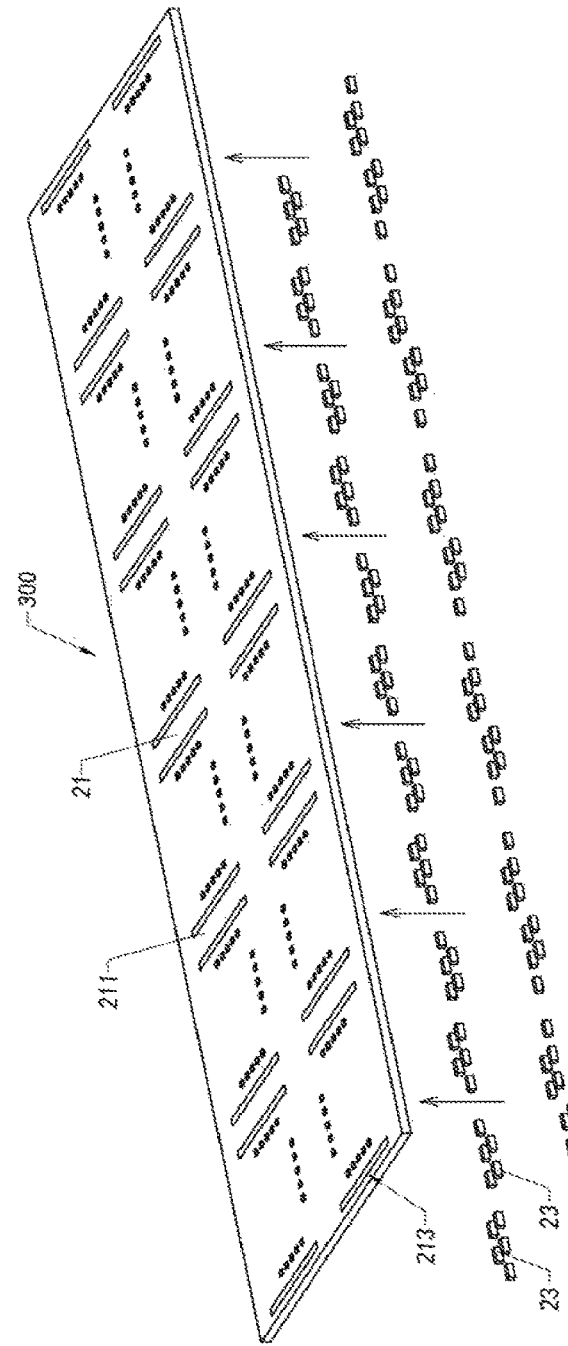
FIG. 27 is a schematic diagram of another manufacturing step of the array camera module according to the above preferred embodiment of the present invention.
Figure 28A:
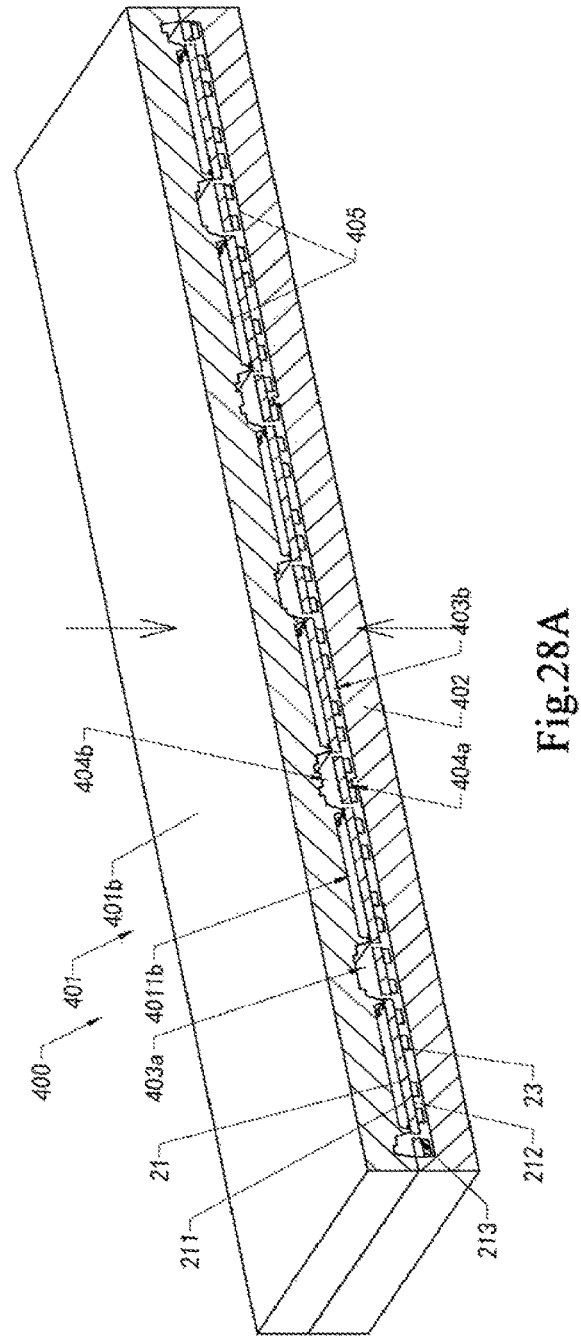
FIG. 28A and FIG. 28B are schematic diagrams of another manufacturing step of the array camera module according to the above preferred embodiment of the present invention.
Figure 28B:
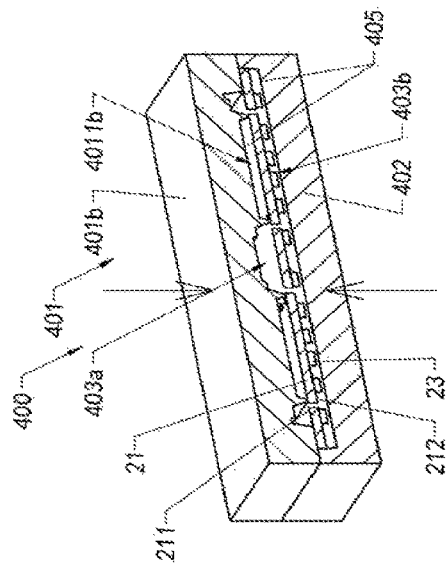
Figure 29:
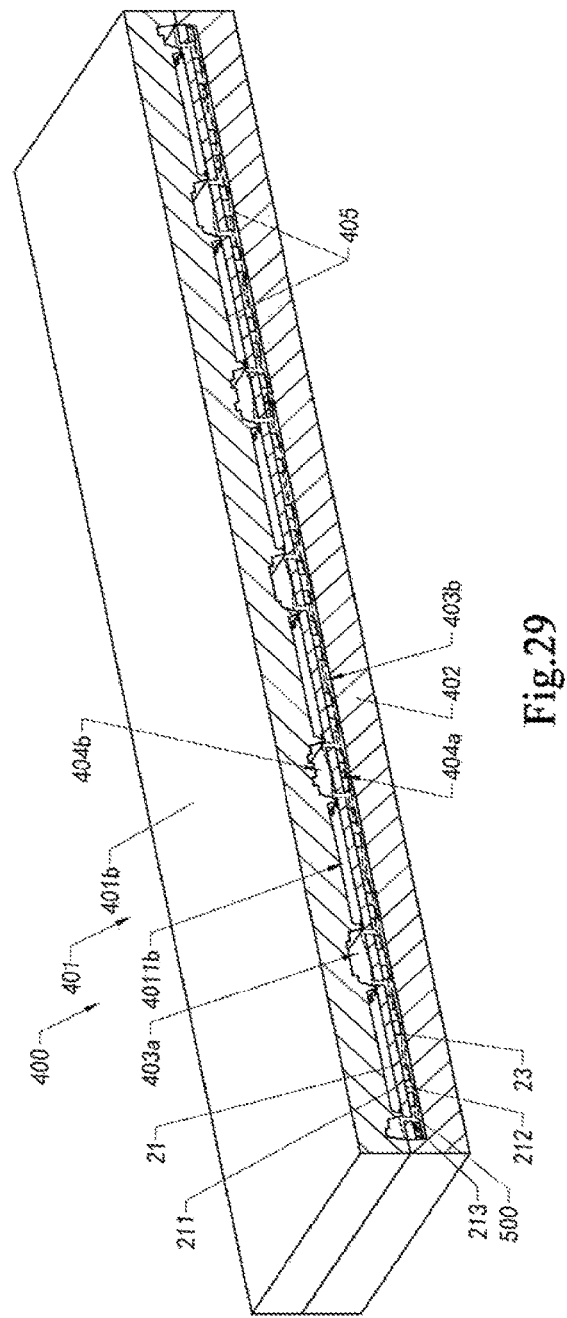
FIG. 29 is a schematic diagram of another manufacturing step of the array camera module according to the above preferred embodiment of the present invention.
Figure 30:
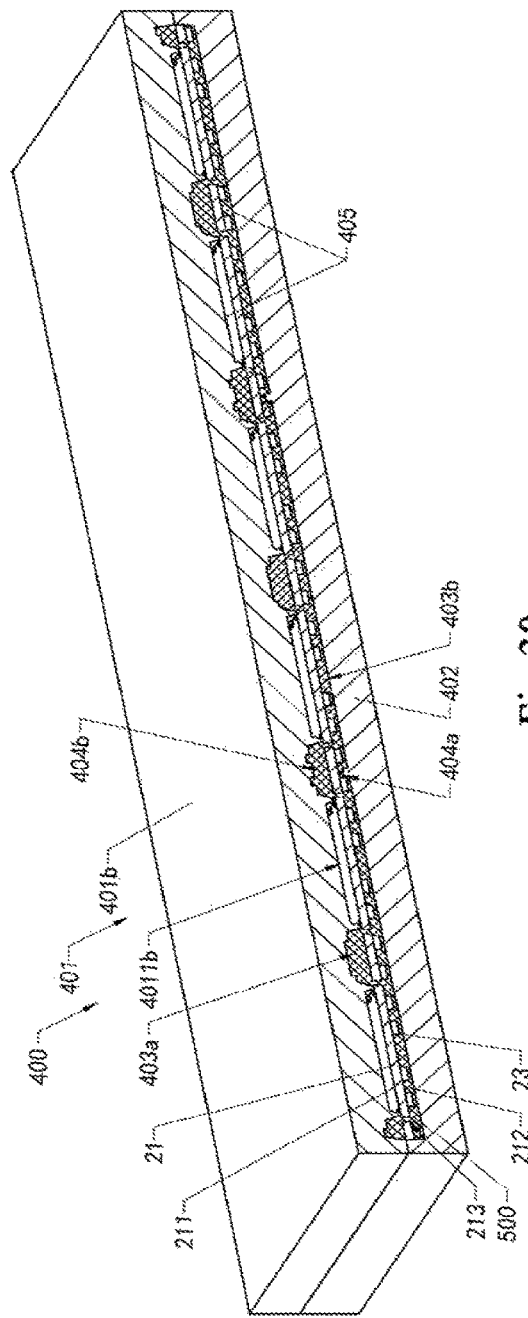
FIG. 30 is a schematic diagram of another manufacturing step of the array camera module according to the above preferred embodiment of the present invention.
Figure 31:
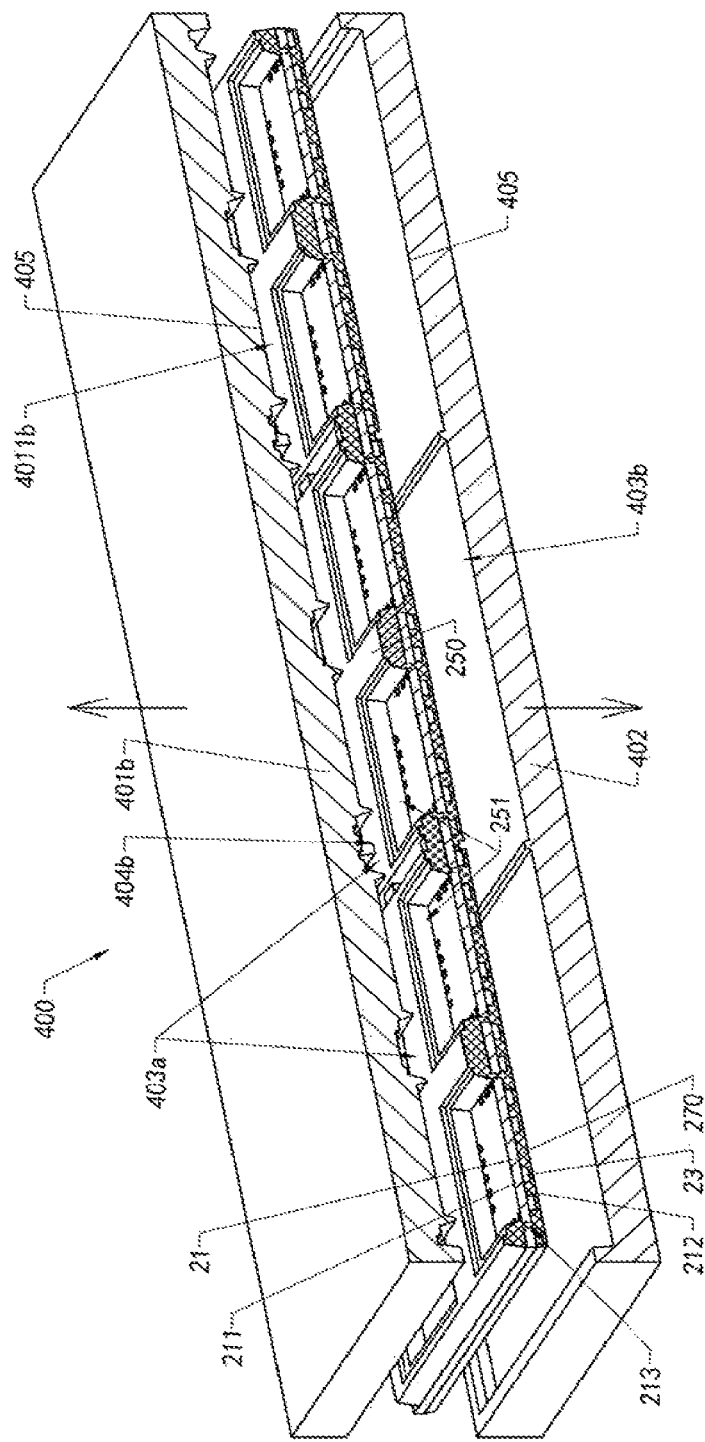
FIG. 31 is a schematic diagram of another manufacturing step of the array camera module according to the above preferred embodiment of the present invention.
Figure 32:
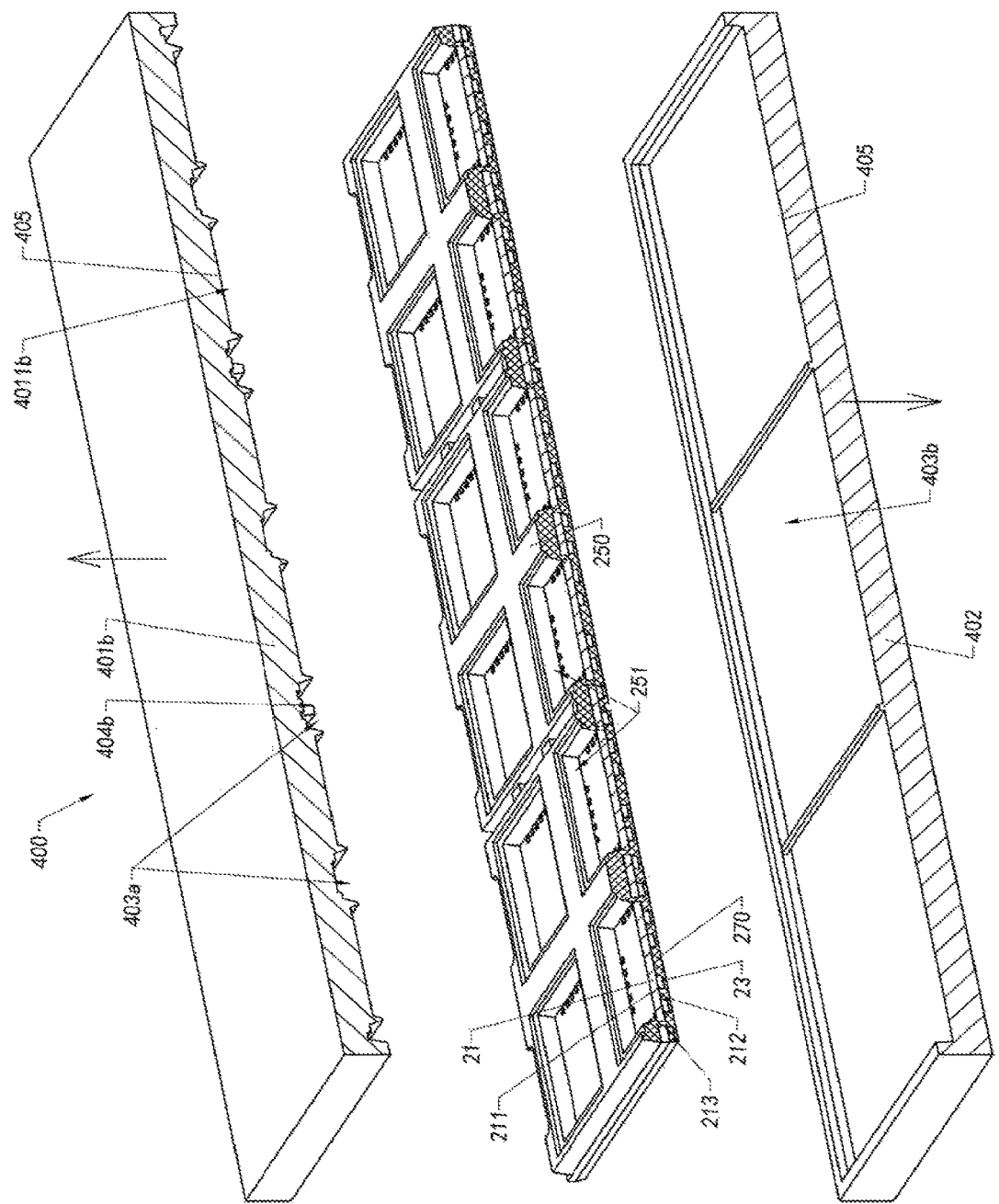
FIG. 32 is a schematic diagram of another manufacturing step of the array camera module according to the above preferred embodiment of the present invention.

Specifically, at the stage shown in FIG. 26, the jointed board unit 300 is provided, and at the stage shown in FIG. 27, the electronic component 23 is attached to the back face 212 of the circuit board 21. At the stage shown in FIG. 28A and FIG. 28B, the jointed board unit 300 is placed between the second upper die 401b and the lower die 402 of the molding die 400 so as to form the upper molding space 403b and the upper communication channel 404b between the second upper die 401b and the imposition unit 300 and to form the lower molding space 403a and the lower communication channel 404a between the lower die 402 and the jointed board unit 300, wherein the front face 211 of the circuit board 21 faces towards the second upper die 401b, and the circuit board connector that protrudes from the front face 211 of the circuit board 21 is held in the second yielding space 4011b of the second upper die 401b, and wherein the back face 212 of the circuit board 21 faces towards the lower die 402, and the electronic component 23 that protrudes from the back face 212 of the circuit board 21 is held in the lower molding space 403a. The covering film 405 is held between the second upper die 401b and the front face 211 of the circuit board 21 and is held between the lower die 402 and the back face 212 of the circuit board 21.

With reference to FIG. 29 to FIG. 32, after the fluid-state molding material 500 is added into the upper molding spaces 403a or the lower molding space 403b, the molding material 500 can fill up all of the upper molding spaces 403b and the lower molding spaces 403a through the upper communication channel 404b, the lower communication channel 404a, and the molding channel 213 of the circuit board 21, and after the molding material 500 is solidified in the upper molding space 403b, the lower molding space 403a, and the molding channel 213 of the circuit board 21 and the molding die 400 is subjected to a demolding operation, the integral embedding portion 270 that is integrally bonded to the back face 212 of the circuit board 21 is formed, and the integral molding base 250 that is integrally bonded to the front face 211 of the circuit board 21 is formed, wherein the integral embedding portion 270 embeds the electronic component 23 that protrudes from the back face 212 of the circuit board 21, and the integral molding base 250 forms the light window 251.

Figure 33:
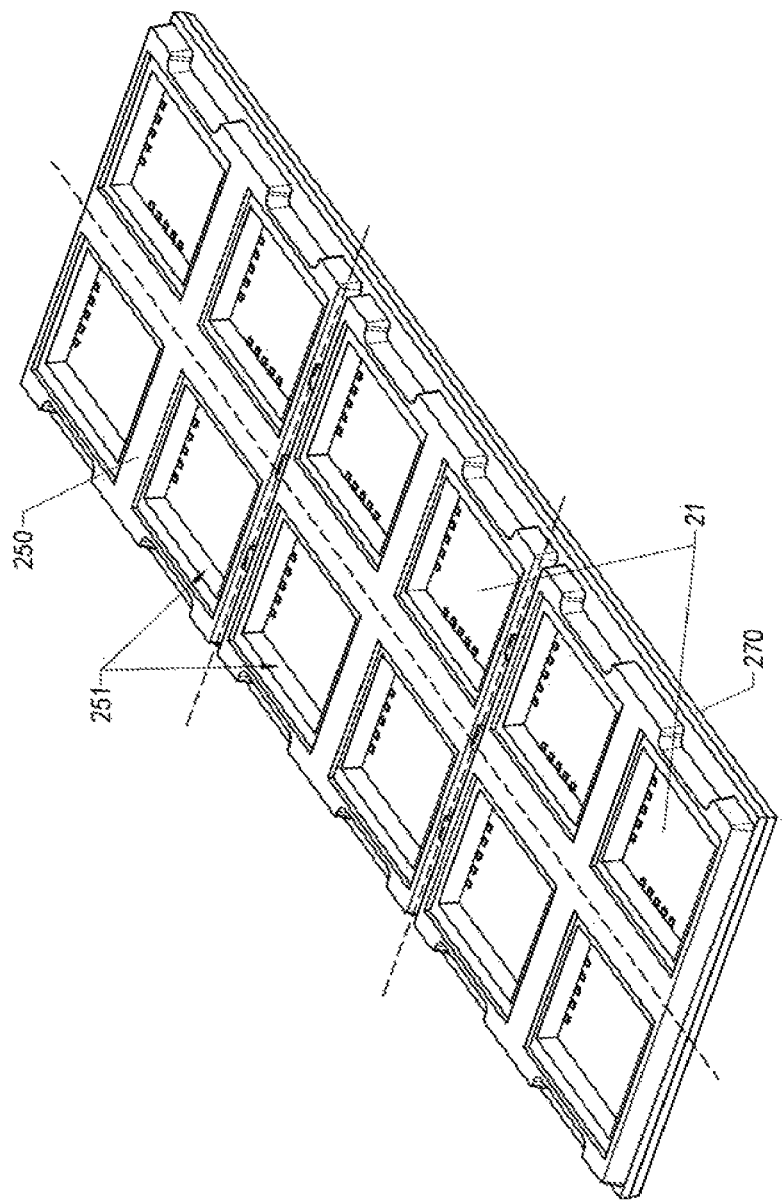
FIG. 33 is a schematic diagram of another manufacturing step of the array camera module according to the above preferred embodiment of the present invention.

At the stage shown in FIG. 33, after the integral circuit board assembly 200 is obtained in a manner in which the integral embedding portion 270 and the integral molding base 250 are molded on the jointed board unit 300 by the molding die 400 by a molding process, the circuit board 21, the integral molding base 250, and the integral embedding portion 270 that constitute the jointed board unit 300 can be divided to obtain a semi-finished product of the circuit board assembly 20, for example, excessive portions of the circuit board 21, the integral molding base 250, and the integral embedding portion 270 can be removed by a process such as cutting or etching to obtain the semi-finished product of the circuit board assembly 20, wherein the integral molding base 250 forms the molding base 25 after being divided, and the integral embedding portion 270 forms the embedding portion 27 after being divided.

Figure 34:
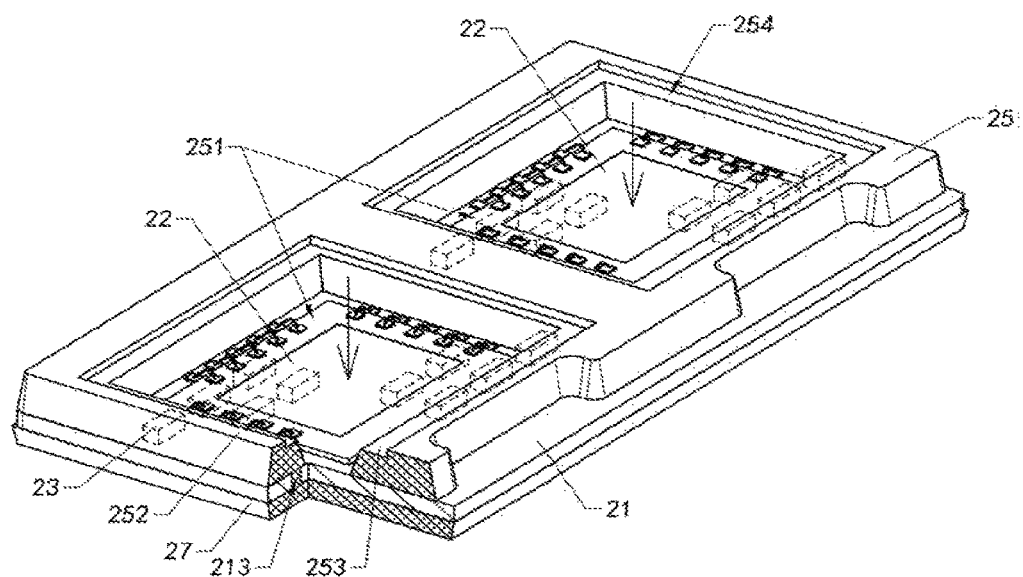
FIG. 34 is a schematic diagram of another manufacturing step of the array camera module according to the above preferred embodiment of the present invention.

At the stage shown in FIG. 34, the photosensitive chip 22 is attached to the front face of the circuit board 21 via the light window 251 of the molding base 25, and the lead 24 is formed between the chip connector of the photosensitive chip 22 and the circuit board connector of the circuit board 21 by a wiring process so as to obtain the circuit board assembly 20, wherein the photosensitive area of the photosensitive chip 22 corresponds to the light window 251 of the molding base 25.

Figure 35:
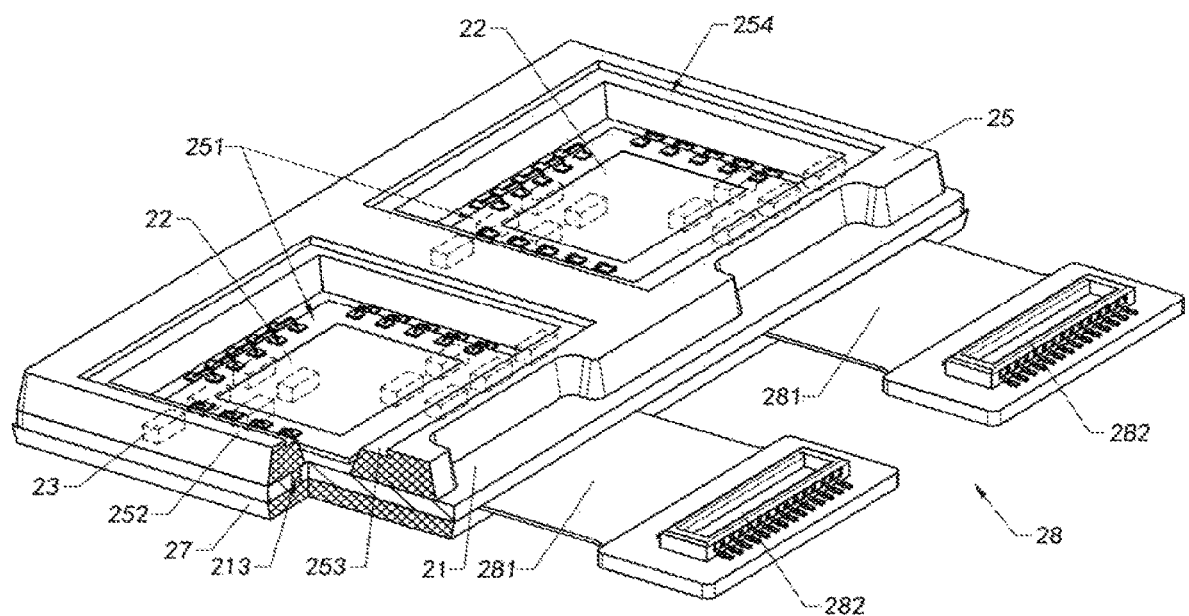
FIG. 35 is a schematic diagram of another manufacturing step of the array camera module according to the above preferred embodiment of the present invention.

At the stage shown in FIG. 35, the connection plate 281 of the connection plate unit 28 can be attached to the circuit board 21, and the circuit board 21 and the connection plate 281 can be connected.

Figure 36:
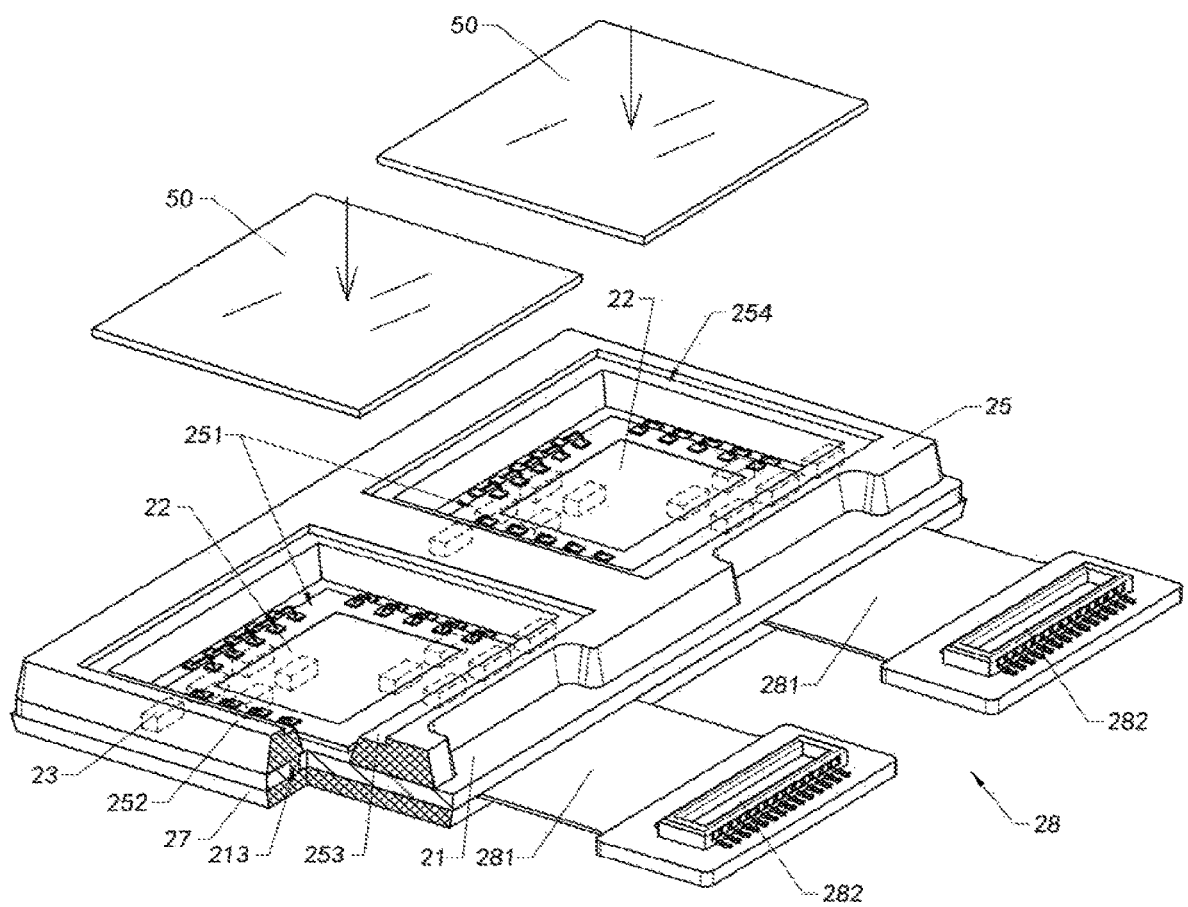
FIG. 36 is a schematic diagram of another manufacturing step of the array camera module according to the above preferred embodiment of the present invention.
Figure 37:
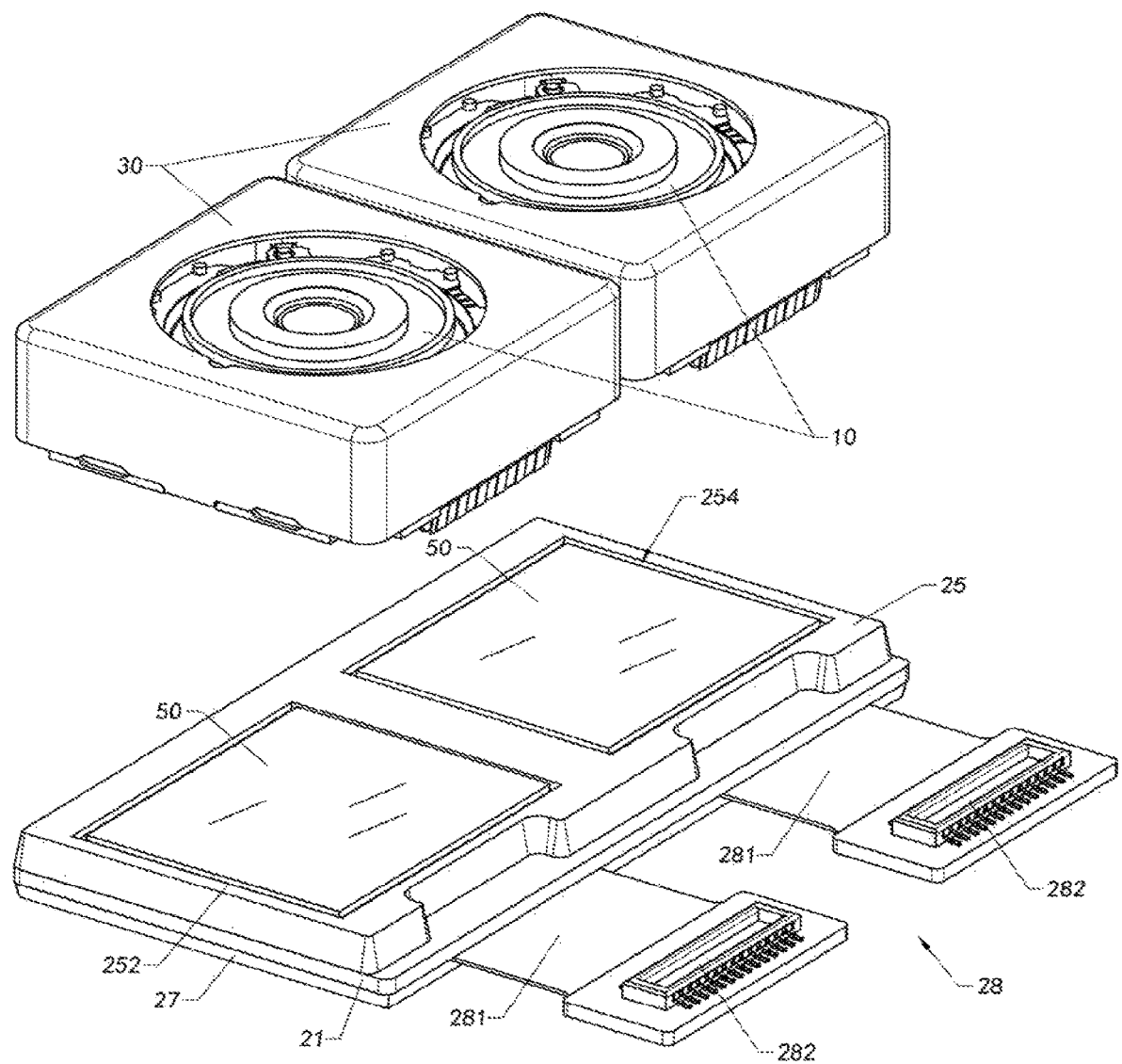
FIG. 37 is a schematic diagram of another manufacturing step of the array camera module according to the above preferred embodiment of the present invention.

With reference to the stage shown in FIG. 36, the filtering element 50 is attached to the inner attaching face 253 of the molding base 25, so that the filtering element 50 is held in the photosensitive path of the photosensitive chip 22. Moreover, at the stage shown in FIG. 37, the driver 30 assembled with the optical lens 10 is attached to the outer attaching face 252 of the molding base 25, so that the optical lens 10 is held in the photosensitive path of the photosensitive chip 22, and the filtering element 50 is held between the optical lens 10 and the photosensitive chip 22, thereby producing the array camera module 100 shown in FIG. 25.

Figure 38:
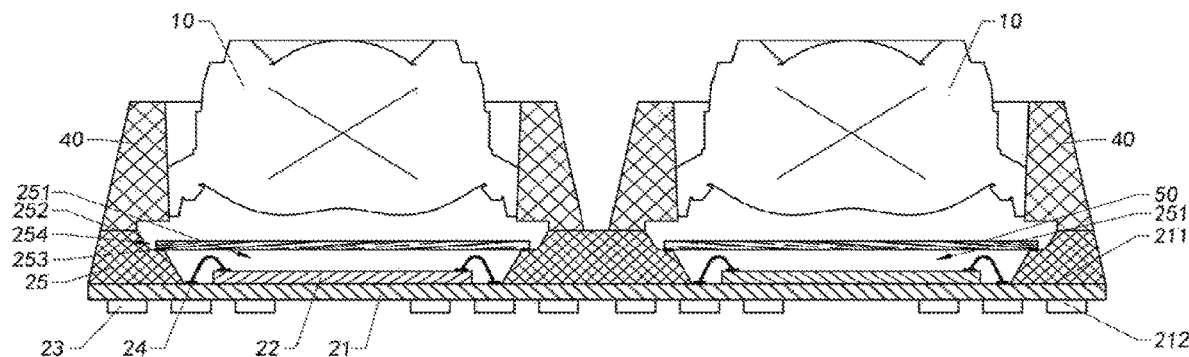
FIG. 38 is a schematic sectional view of another variant implementation of the array camera module according to the above preferred embodiment of the present invention.

The difference from the array camera module 100 shown in FIG. 4 is in that in this specific example of the array camera module 100 shown in FIG. 38, the array camera module 100 is implemented as a fixed focus camera module. Specifically, the array camera module 100 comprises at least two lens tubes 40, wherein each of the optical lenses 10 is assembled in each of the lens tubes 40 respectively, each of the lens tubes 40 is attached to different positions of the outer attaching face 252 of the molding base 25 respectively, and each of the optical lenses 10 is held in the photosensitive path of each of the photosensitive chips 22 respectively via each of the lens tubes 40.

Figure 39:
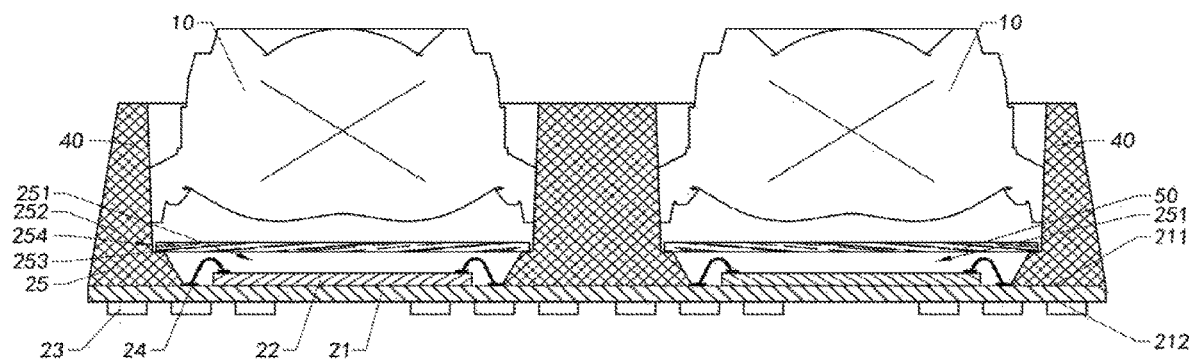
FIG. 39 is a schematic sectional view of another variant implementation of the array camera module according to the above preferred embodiment of the present invention.

In the example shown in FIG. 39, each of the lens tubes 40 of the array camera module 100 also can extend over the molding base 25 integrally. That is, each of the lens tubes 40 and the molding base 25 can be integrally bonded to the front face 211 of the circuit board 21 in a same molding process.

Figure 40:
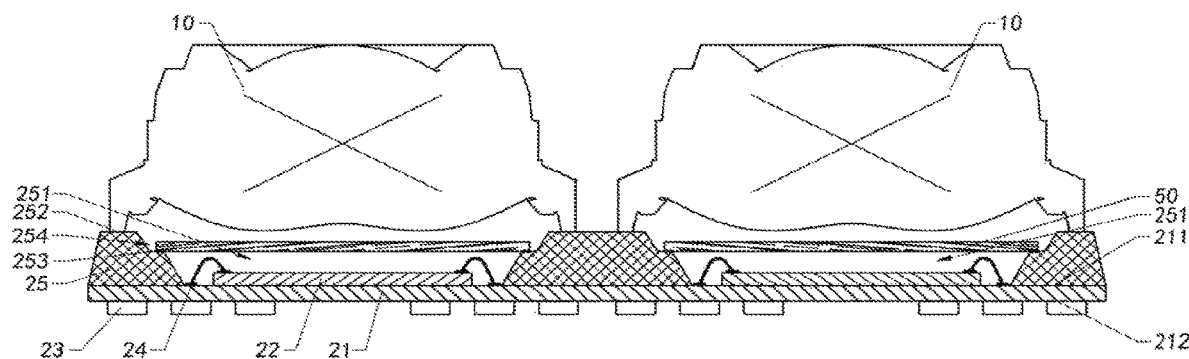
FIG. 40 is a schematic sectional view of another variant implementation of the array camera module according to the above preferred embodiment of the present invention.

In the example shown in FIG. 40, each of the optical lenses 10 of the array camera module 100 also can be attached to the molding base 25 directly, so that each of the optical lenses 10 is made to correspond to each of the photosensitive chips 22, respectively. In other words, in this specific example of the array camera module 100 shown in FIG. 40, each of the optical lenses 10 can be held in the photosensitive path of each of the photosensitive chips 22 by means of being attached to different positions of the outer attaching face 252 of the molding base 25 respectively.

Figure 41:
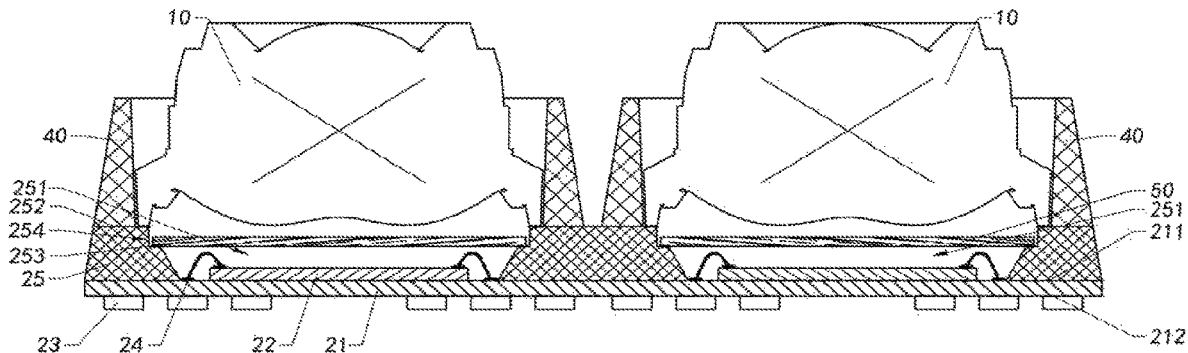
FIG. 41 is a schematic sectional view of another variant implementation of the array camera module according to the above preferred embodiment of the present invention.

In the example shown in FIG. 41, each of the optical lenses 10 of the array camera module 100 can be attached to the molding base 25 directly, and then, the lens tube 40 is disposed at outside of each of the optical lenses 10 so as to protect the optical lens by the lens tube 40. For example, each of the optical lenses 10 can be disposed at outside of each of the optical lenses 10 respectively by means of being attached to different positions of the outer attaching face 252 of the molding base 25, so that each of the lens tubes 40 protects each of the optical lenses 10 by means of surrounding each of the optical lenses 10. Preferably, the lens tube 40 may or may not be in contact with the optical lens 10.

Figure 42:
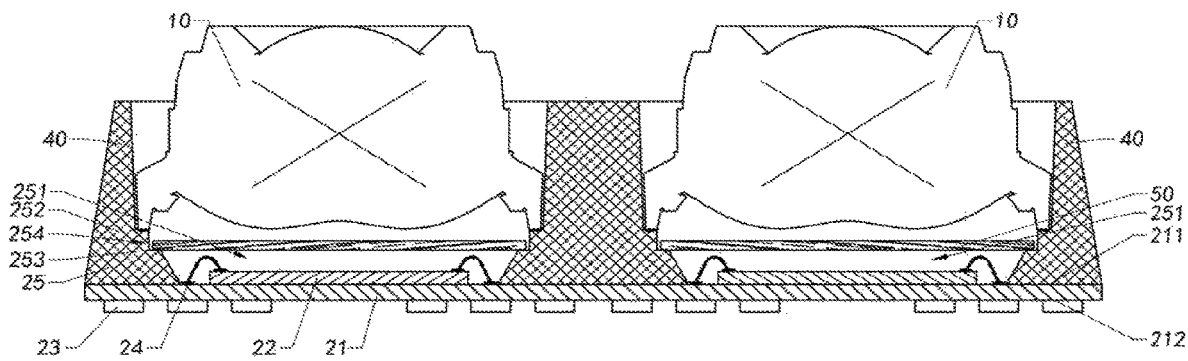
FIG. 42 is a schematic sectional view of another variant implementation of the array camera module according to the above preferred embodiment of the present invention.

In the example shown in FIG. 42, the lens tube 40 of the array camera module 100 can extend over the molding base 25 integrally, while each of the optical lenses 10 can be attached to different positions of the outer attaching face 252 of the molding base 25 directly so as to protect the optical lens 10 by surrounding outside the optical lens 10 by the lens tube 40.

Figure 43:
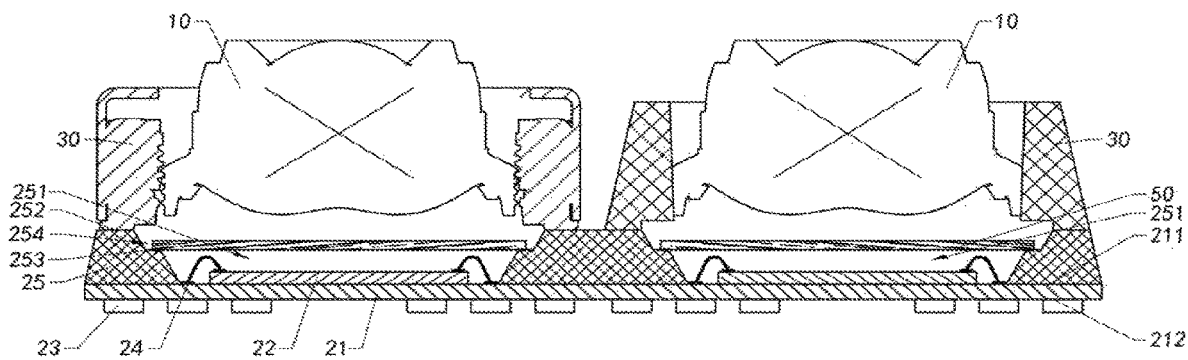
FIG. 43 is a schematic sectional view of another variant implementation of the array camera module according to the above preferred embodiment of the present invention.

In the example shown in FIG. 43, the array camera module 100 can provide the driver 30 and the lens tube 40 simultaneously, for example, the driver 30 and the lens tube 40 are attached to different positions of the outer attaching face 252 of the molding base 25 in a mutually adjacent manner, wherein one of the optical lenses 10 is drivably disposed in the driver 30, and the other optical lens 10 is disposed in the lens tube 40, so that each of the optical lenses 10 is held in the photosensitive path of each of the photosensitive chips 22 respectively via the driver 30 and the lens tube 40.

Figure 44:
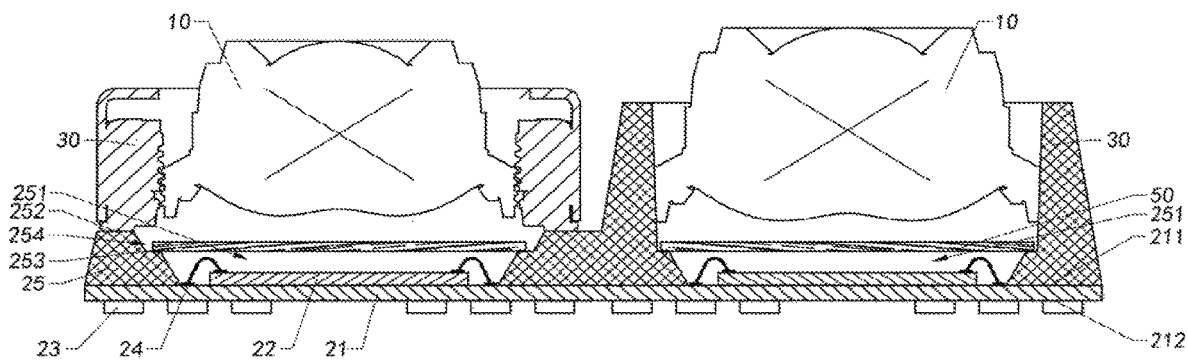
FIG. 44 is a schematic sectional view of another variant implementation of the array camera module according to the above preferred embodiment of the present invention.

In the example shown in FIG. 44, the difference from the array camera module 100 shown in FIG. 43 is in that the lens tube 40 of the array camera module 100 also can extend over the molding base 25 integrally. In other words, in this specific example of the array camera module 100, the lens tube 40 can extend over the molding base 25 integrally, and the driver 30 can be attached to the molding base 25, so that each of the optical lenses 10 is held in the photosensitive path of each of the photosensitive chips 22 respectively via the driver 30 and the lens tube 40.

Figure 45:
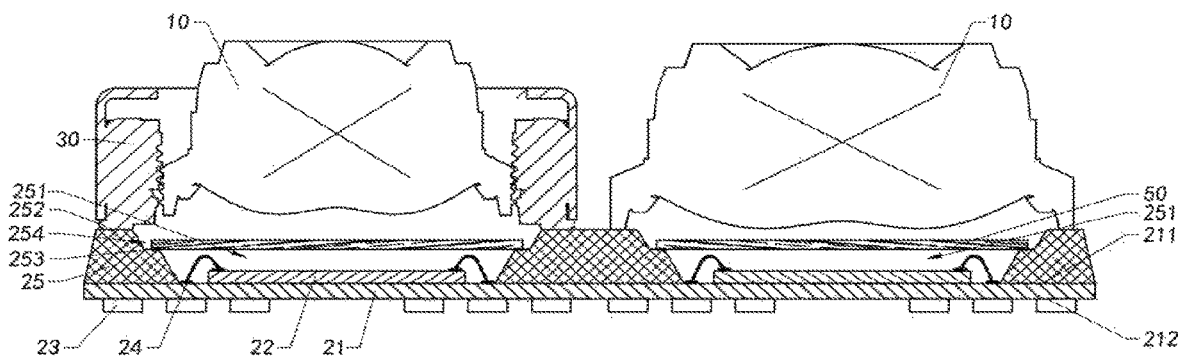
FIG. 45 is a schematic sectional view of another variant implementation of the array camera module according to the above preferred embodiment of the present invention.

In the example shown in FIG. 45, the array camera module 100 also may not have the lens tube 40, so that one of the optical lenses 10 can be drivably disposed in the driver 30, the driver 30 is held in the photosensitive path of the photosensitive chip 22 by means of being attached to the molding base 45, and the other optical lens 10 is held in the photosensitive path of the photosensitive chip 22 by means of being attached to the molding base 25 directly.

Figure 46:
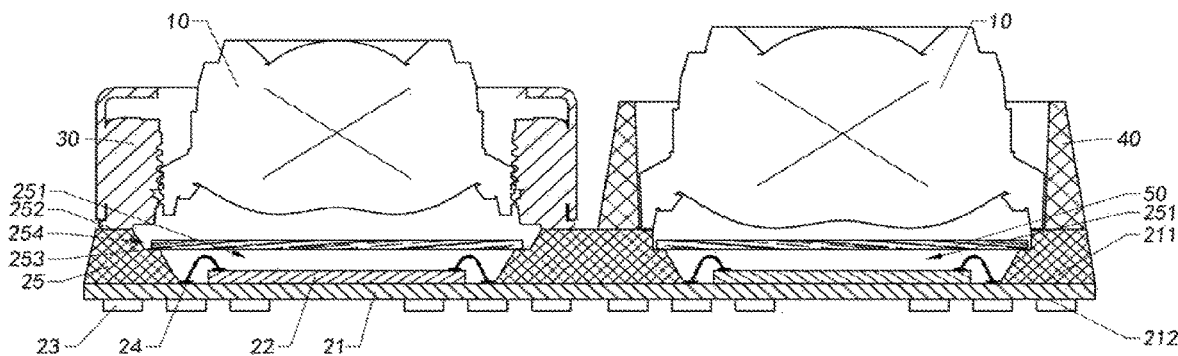
FIG. 46 is a schematic sectional view of another variant implementation of the array camera module according to the above preferred embodiment of the present invention.

In the example shown in FIG. 46, the optical lens 10 is attached to the molding base 25 directly, the lens tube 40 is attached to the molding base 25, and the lens tube 40 is located outside the optical lens 10 for protecting the optical lens 10.

Figure 47:
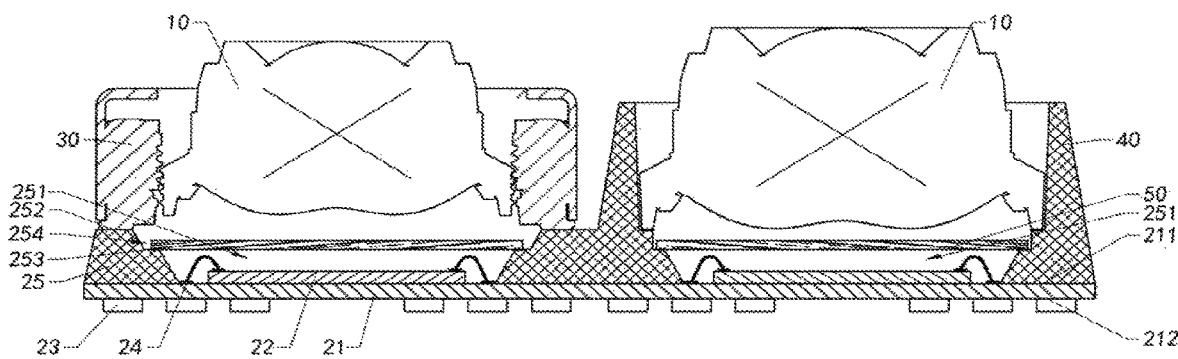
FIG. 47 is a schematic sectional view of another variant implementation of the array camera module according to the above preferred embodiment of the present invention.

In the example shown in FIG. 47, the optical lens 10 is attached to the molding base 25 directly, the lens tube 40 extends over the molding base 25 integrally, and the lens tube 40 is located outside the optical lens 10 for protecting the optical lens 10.

Figure 48:
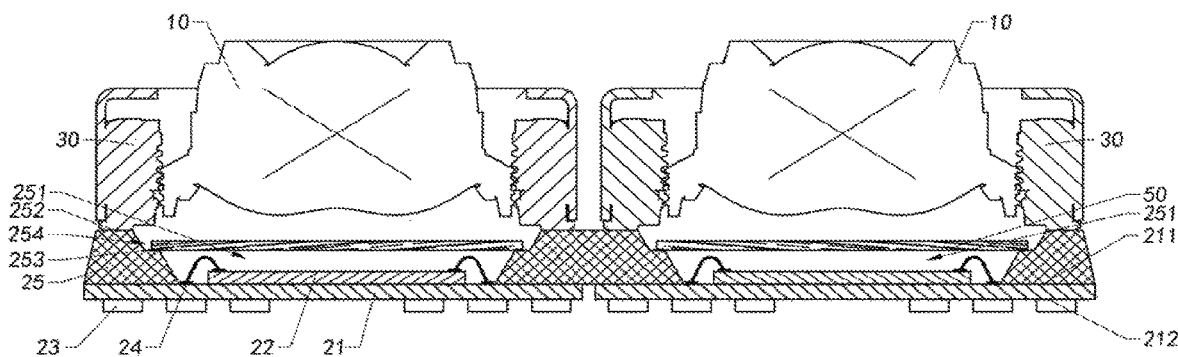
FIG. 48 is a schematic sectional view of another variant implementation of the array camera module according to the above preferred embodiment of the present invention.

In the example shown in FIG. 48, the number of the circuit boards 21 can be more than one, for example, the number of the circuit boards 21 can be consistent with the number of the photosensitive chips 22. For example, in this example, the number of the circuit boards 21 can be implemented as two, and the molding base 25 can be bonded to the two circuit boards 21 simultaneously. It is worth mentioning that the molding base 25 can be integrally bonded to the two circuit boards 21, and in this way, the molding base 25 can ensure the flatness of the two circuit boards 21, thus ensuring the coaxiality of the two photosensitive chips 22 respectively attached to each of the circuit boards 21.

Figure 49:
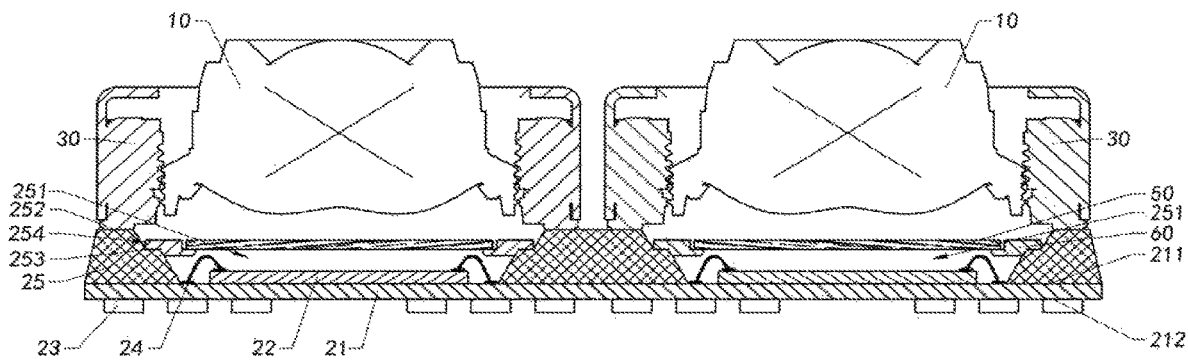
FIG. 49 is a schematic sectional view of another variant implementation of the array camera module according to the above preferred embodiment of the present invention.

In the example shown in FIG. 49, the array camera module 100 can also comprise at least one frame-type bracket 60, for example, the number of the brackets 60 may be consistent with the number of the filtering elements 50, wherein each of the filtering elements 50 is attached to each of the brackets 60 respectively, and each of the brackets 60 is attached to the molding base 25 respectively, so that each of the filtering elements 50 is held in the photosensitive path of each of the photosensitive chips 22 respectively by each of the brackets 60.

It is worth mentioning that the size of the filtering element 50 can be reduced with the filtering element 50 held in the photosensitive path of the photosensitive chip 22 by the bracket 60 so as to reduce the cost of the array camera module 100.

Figure 50:
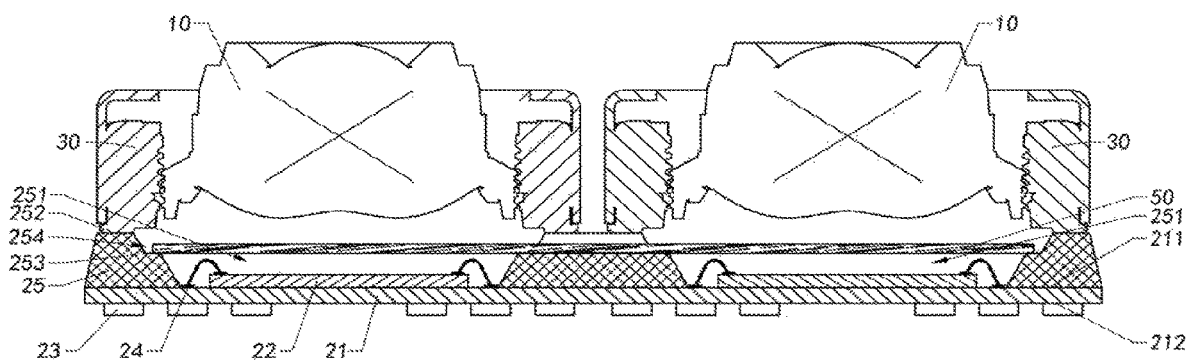
FIG. 50 is a schematic sectional view of another variant implementation of the array camera module according to the above preferred embodiment of the present invention.

In the example shown in FIG. 50, the number of the filtering elements 50 can be implemented as one, wherein the filtering element 50 is attached to the molding base 25, so that each of the optical lenses 10 corresponds to different positions of the filtering element 50 respectively.

Figure 51:
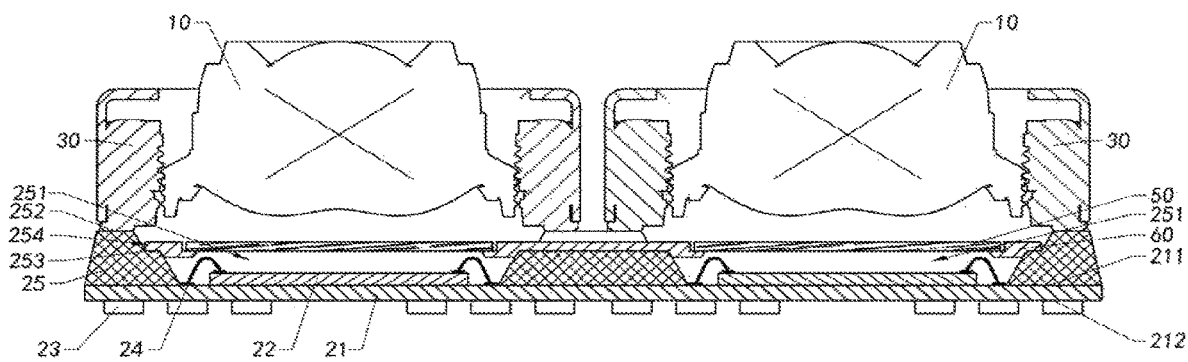
FIG. 51 is a schematic sectional view of another variant implementation of the array camera module according to the above preferred embodiment of the present invention.

In the example shown in FIG. 51, the number of the brackets 60 can also be implemented as one, wherein all of a plurality of the filtering elements 50 can be attached to the bracket 60, and the bracket 60 is attached to the molding base 25, so that each of the optical lenses 10 and each of the photosensitive chips 22 correspond to different positions of the filtering element 50 respectively.

Figure 52:
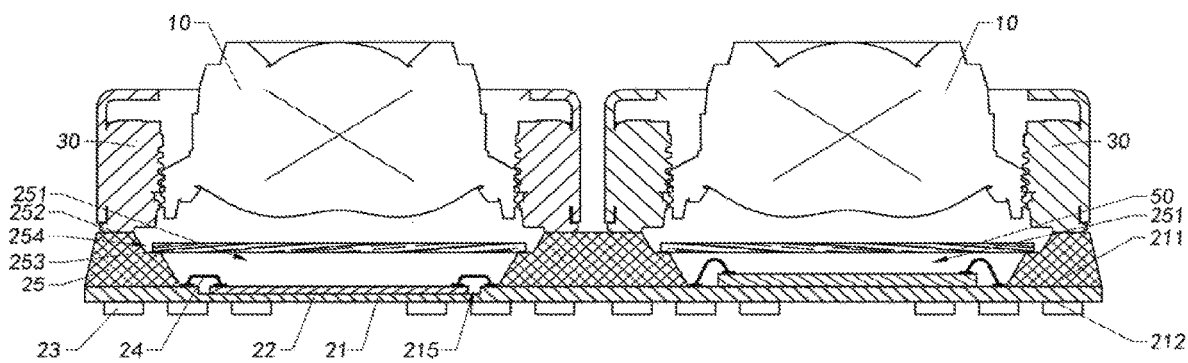
FIG. 52 is a schematic sectional view of another variant implementation of the array camera module according to the above preferred embodiment of the present invention.

In the example shown in FIG. 52, the circuit board 21 has one accommodation spaces 215, wherein one of the photosensitive chips 22 is accommodated in the accommodation space 215, and the other photosensitive chip 22 can be attached to the surface of the circuit board 21, so that there is a height difference between the two photosensitive chips 22. In other words, photosensitive surfaces of the two photosensitive chips 22 are not in the same horizontal plane. In this way, it is advantageous for improving the imaging quality of the array camera module 100 and expanding the function of the array camera module 100.

Figure 53:
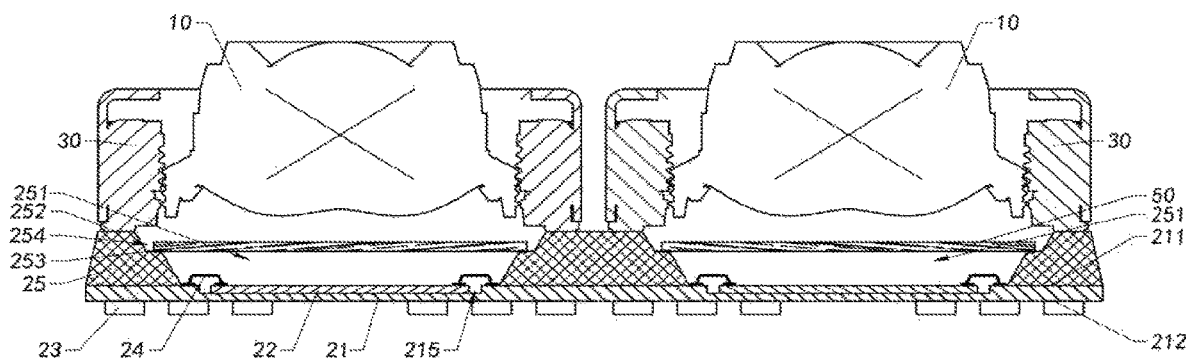
FIG. 53 is a schematic sectional view of another variant implementation of the array camera module according to the above preferred embodiment of the present invention.

In the example shown in FIG. 53, the circuit board 21 has two accommodation spaces 215, wherein each of the accommodation spaces 215 is implemented as a groove, so that the two photosensitive chips 22 both can be accommodated in the accommodation space 215 so as to reduce the height of the array camera module 100, thereby facilitating the application of the array camera module 100 to the electronic device that is intended to be lighter and thinner. In FIG. 53, the molding base 25 can be molded only on a part of the front face 211 of the circuit board 21, while in the example of FIG. 54, the molding base 25 can further embed at least a part of the non-photosensitive area of the photosensitive chip 22, so as to make the circuit board 21, the photosensitive chip 22, the lead 24, and the molding base 25 be bonded integrally.

Figure 54:
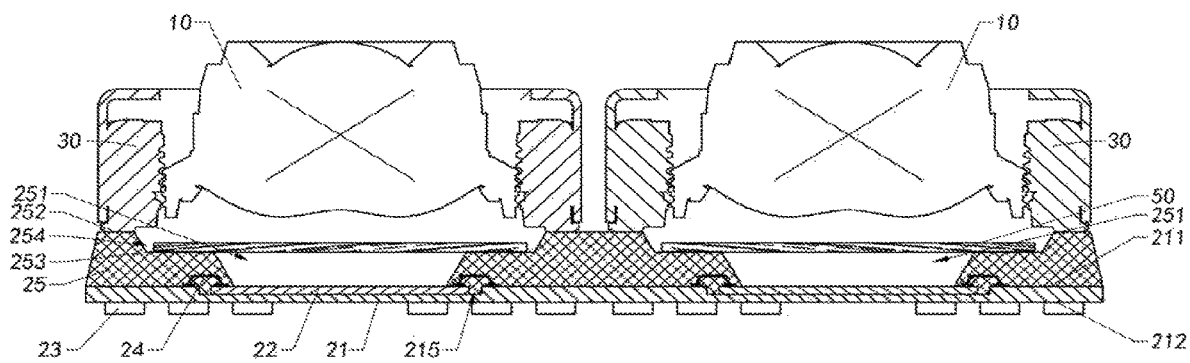
FIG. 54 is a schematic sectional view of another variant implementation of the array camera module according to the above preferred embodiment of the present invention.

It is worth mentioning that in the example of manufacturing the array camera module 100 shown in FIG. 54, the electronic component 23 is attached to the back face 212 of the circuit board 21 of the jointed board unit 300, the photosensitive chip 22 is attached to the front face 211 of the circuit board 21, and the photosensitive chip 22 and the circuit board 21 are connected by a wiring process with the lead 24 formed between the chip connector of the photosensitive chip 22 and the circuit board connector of the circuit board 21. It is worth mentioning that the order of attaching the photosensitive chip 22 and the electronic component 23 is not limited in the array camera module 100 of the present invention. Next, the molding base 25 is integrally bonded to the circuit board 21 and the non-photosensitive area of the photosensitive chip 22 by a molding process, and at this point, the molding base 25 can embed the lead 24. It is worth mentioning that in a process of forming the molding base 25 in the circuit board 21 and the non-photosensitive area of the photosensitive chip 22 by the molding process, with the covering film 405 of the molding die 400, an undesirable phenomenon of "flash" can be avoided and the upper die 401 can be prevented from scratching the photosensitive chip 22 so as to improve the product yield of the array camera module 100.

Figure 55:
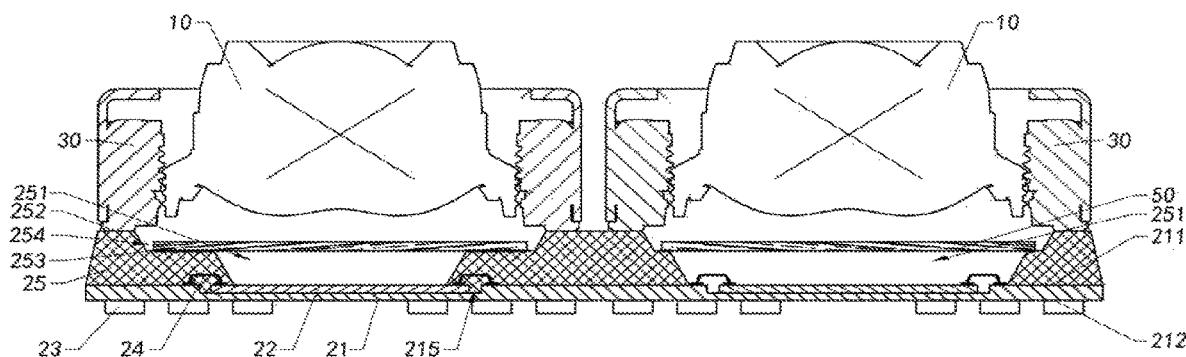
FIG. 55 is a schematic sectional view of another variant implementation of the array camera module according to the above preferred embodiment of the present invention.

In the example shown in FIG. 55, the molding base 25 of the array camera module 100 can only embed a part of the non-photosensitive area of the photosensitive chip 22. With reference to FIG. 55, the molding base 25 can only embed the non-photosensitive area of the photosensitive chip 22 on the left side of the figure but not embed the non-photosensitive area of the photosensitive chip 22 on the right side of the figure.

Figure 56:
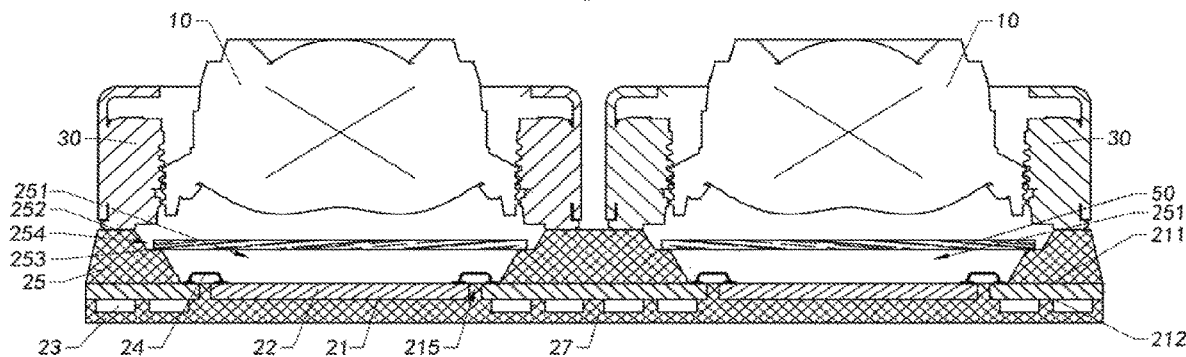
FIG. 56 is a schematic sectional view of another variant implementation of the array camera module according to the above preferred embodiment of the present invention.
Figure 57:
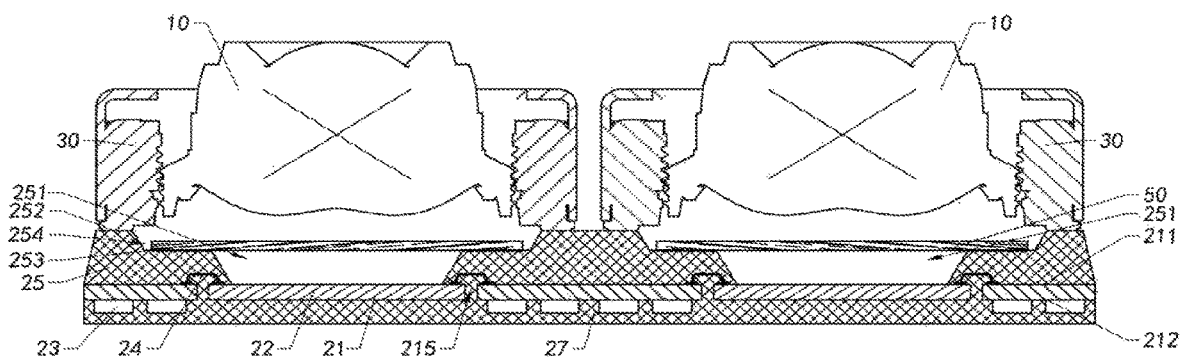
FIG. 57 is a schematic sectional view of another variant implementation of the array camera module according to the above preferred embodiment of the present invention.

In the example shown in FIG. 56, the circuit board 21 can have two accommodation spaces 215 that are implemented as through holes, wherein after at least one of the electronic components 23 is attached to the back face 212 of the circuit board 21, the embedding portion 27 integrally bonded to the back face 212 of the circuit board 21 is formed, and the embedding portion 27 can embed at least a part of the at least one of the electronic components 23. The photosensitive chip 22 can be attached on the embedding portion 27 through the accommodation space 215 of the circuit board 21, and the circuit board 21 and the photosensitive chip 22 are connected by means of the lead 24. The molding base 25 can be molded only on a part of the front face 211 of the circuit board 21, while in the example of FIG. 57, the molding base 25 can further embed at least a part of the non-photosensitive area of the photosensitive chip 22, so as to make the circuit board 21, the photosensitive chip 22, the lead 24, and the molding base 25 be bonded integrally.

Figure 58:
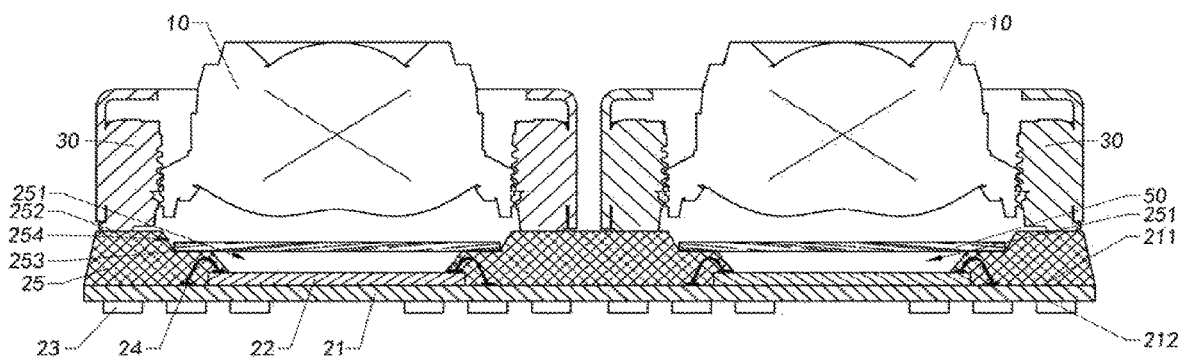
FIG. 58 is a schematic sectional view of another variant implementation of the array camera module according to the above preferred embodiment of the present invention.

In the example shown in FIG. 58, the molding base 25 can further embed at least a part of the non-photosensitive area of the photosensitive chip 22, so that the molding base 25, the circuit board 21, and the photosensitive chip 22 are bonded integrally. In this way, it is advantageous for further reducing the length and width of the array camera module 100.

Figure 59:
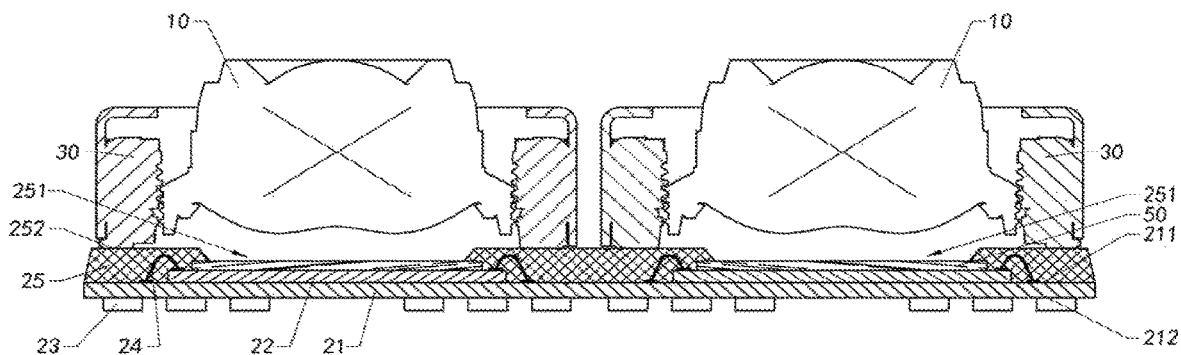
FIG. 59 is a schematic sectional view of another variant implementation of the array camera module according to the above preferred embodiment of the present invention.

In the example shown in FIG. 59, the filtering element 50 is disposed over the photosensitive chip 22 in an overlapping manner, and the molding base 25 embeds an outer edge of the filtering element 50, so that the molding base 25, the circuit board 21, the photosensitive chip 22, and the filtering element 50 are bonded integrally.

Figure 60:
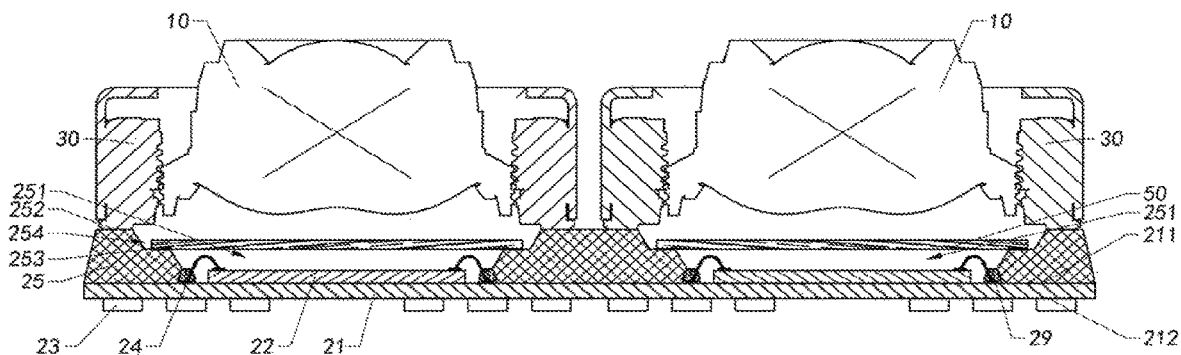
FIG. 60 is a schematic sectional view of another variant implementation of the array camera module according to the above preferred embodiment of the present invention.

In the example shown in FIG. 60, the front face 211 of the circuit board 21 is provided with a frame-shaped supporting element 29 or the supporting element 29 is formed thereon, and the molding base 25 embeds at least a part of the supporting element 29.

Figure 61:
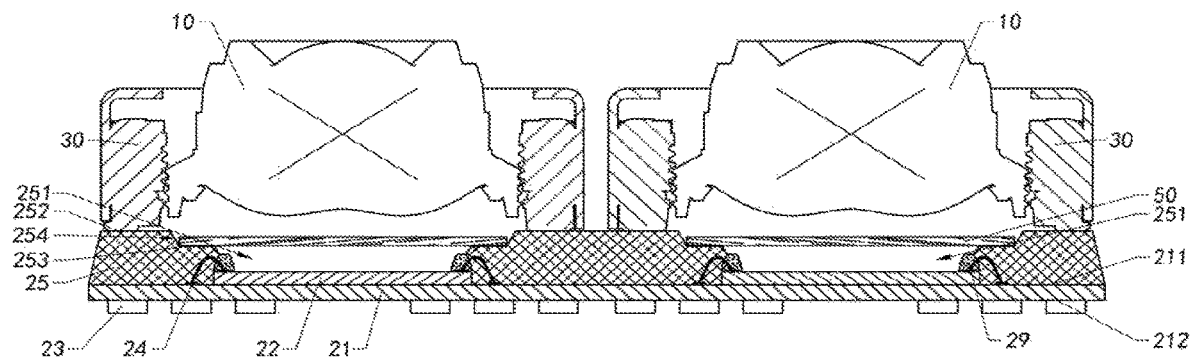
FIG. 61 is a schematic sectional view of another variant implementation of the array camera module according to the above preferred embodiment of the present invention.

In the example shown in FIG. 61, at least a part of the non-photosensitive area of the photosensitive chip 22 is provided with the supporting element 29 or the supporting element 29 is formed therein, and the molding base 25 embeds at least a part of the supporting element 29.

Figure 62:
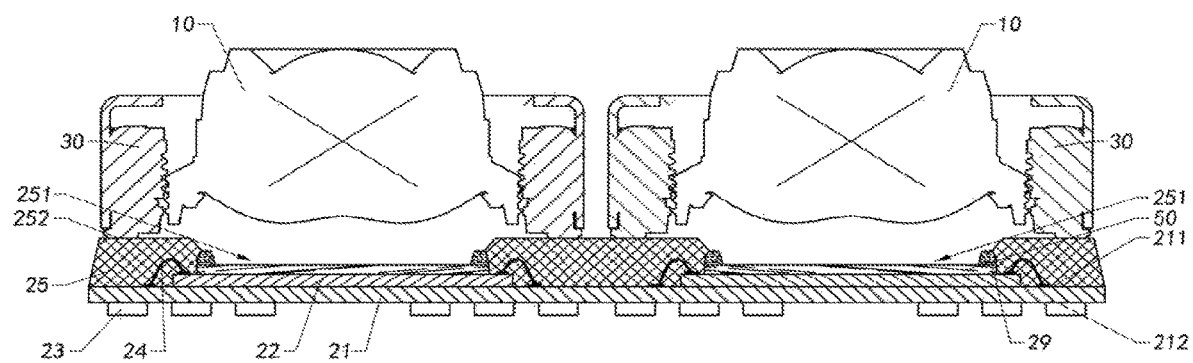
FIG. 62 is a schematic sectional view of another variant implementation of the array camera module according to the above preferred embodiment of the present invention.

In the example shown in FIG. 62, an outer edge of the filtering element 50 is provided with the supporting element 29 or the supporting 29 is formed thereon, and the molding base 25 embeds at least a part of the supporting element 29.

Figure 63:
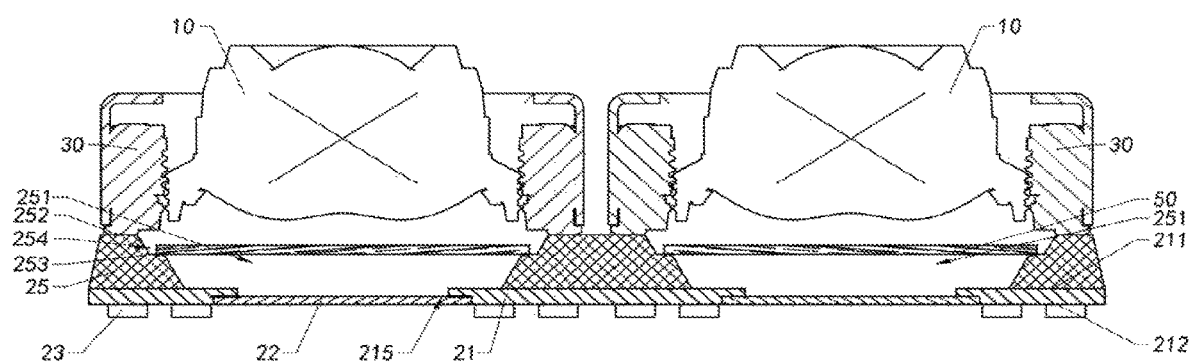
FIG. 63 is a schematic sectional view of another variant implementation of the array camera module according to the above preferred embodiment of the present invention.

In the example shown in FIG. 63, all of the photosensitive chips 22 can be connected to the circuit board 21 by a flip-chip process.

Figure 64A:
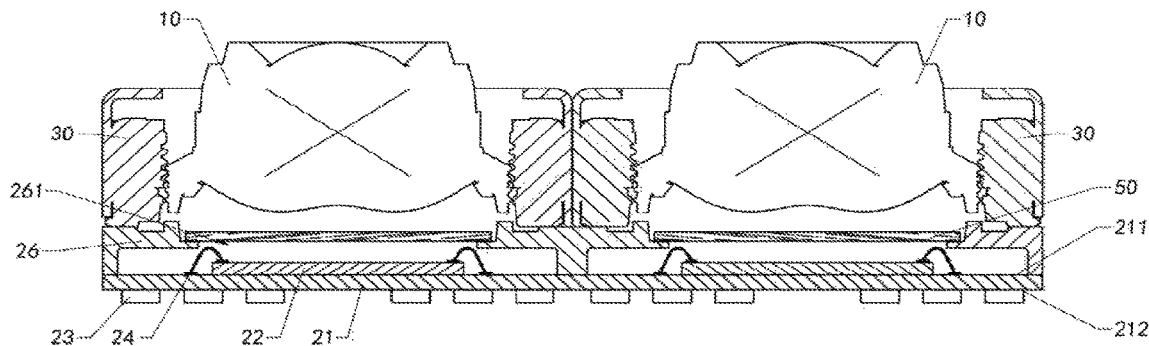
FIG. 64A is a schematic sectional view of another variant implementation of the array camera module according to the above preferred embodiment of the present invention.

In the example shown in FIG. 64A, the array camera module 100 may not have the molding base 25 formed by means of molding but may be provided with at least one lens frames 26. Specifically, the lens frame 26 has at least two light through holes 261, wherein each of the filtering elements 50 is attached to the lens frame 26 respectively, and each of the light through holes 261 of the lens frame 26 corresponds to each of the filtering elements 50 respectively. The lens frame 26 is attached to the front face 211 of the circuit board 21, and the photosensitive area of each of the photosensitive chips 22 corresponds to each of the light through holes 261 of the lens frame 26 respectively, so that each of the filtering elements 50 is held in the photosensitive path of each of the photosensitive chips 22 respectively. Each of the drivers 30 is attached to the lens frame 26 respectively, each of the optical lenses 10 that is assembled in each of the drivers 30 is held in the photosensitive path of each of the photosensitive chips 22 respectively by each of the drivers 30, and at this point, each of the filtering elements 50 is held between each of the optical lenses 10 and each of the photosensitive chips 22 respectively.

Figure 64B:
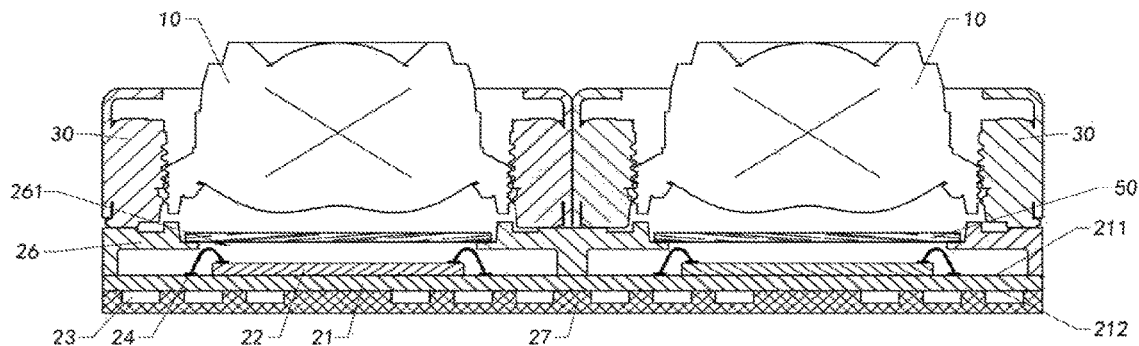
FIG. 64B is a schematic sectional view of another variant implementation of the array camera module according to the above preferred embodiment of the present invention.

The difference from the array camera module 100 shown in FIG. 64A is in that in the variant implementation of the array camera module 100 shown in FIG. 64B, the circuit board assembly 20 of the array camera module 100 further comprises at least one embedding portions 27, wherein the embedding portion 27 is integrally bonded to at least a part of the back face 212 of the circuit board 21. Preferably, the embedding portion 27 embeds at least a part of at least one electronic components 23 that protrudes from the back face 212 of the circuit board 21. More preferably, the embedding portion 7 embeds all of the electronic components 23 which protrude from the back face 212 of the circuit board 21.

Figure 65:
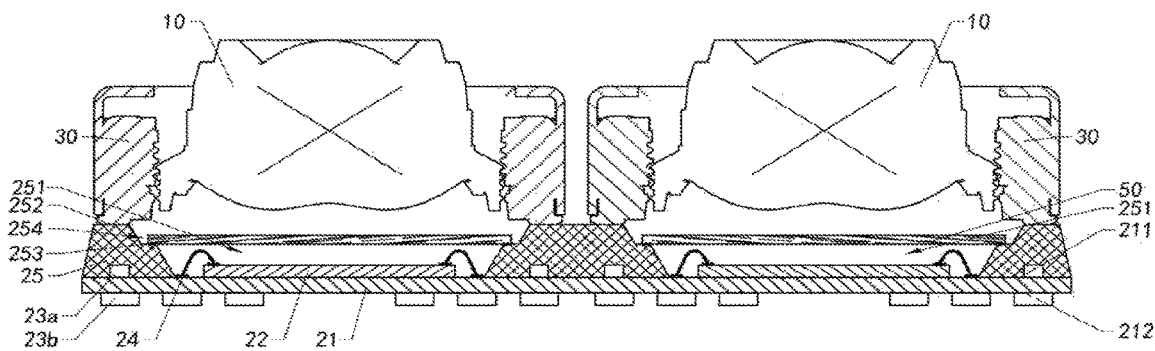
FIG. 65 is a schematic sectional view of another variant implementation of the array camera module according to the above preferred embodiment of the present invention.

In the example shown in FIG. 65, some of the electronic components 23 can be attached to the back face 212 of the circuit board 21, and the electronic components 23 attached to the back face 212 of the circuit board 21 are exposed, and some other electronic components 23 can be attached to the front face 211 of the circuit board 21.

Figure 66:
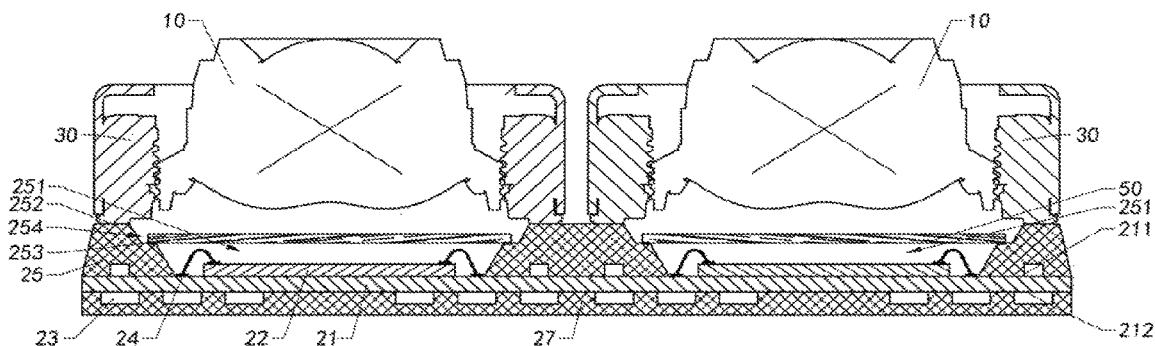
FIG. 66 is a schematic sectional view of another variant implementation of the array camera module according to the above preferred embodiment of the present invention.

In the example shown in FIG. 66, the circuit board assembly 20 may be formed with the embedding portion 27 that is integrally bonded to the back face 212 of the circuit board 21, wherein the embedding portion 27 embed at least one of the electronic components 23. Preferably, the embedding portion 27 embeds all of the electronic components 23b.

Figure 67:
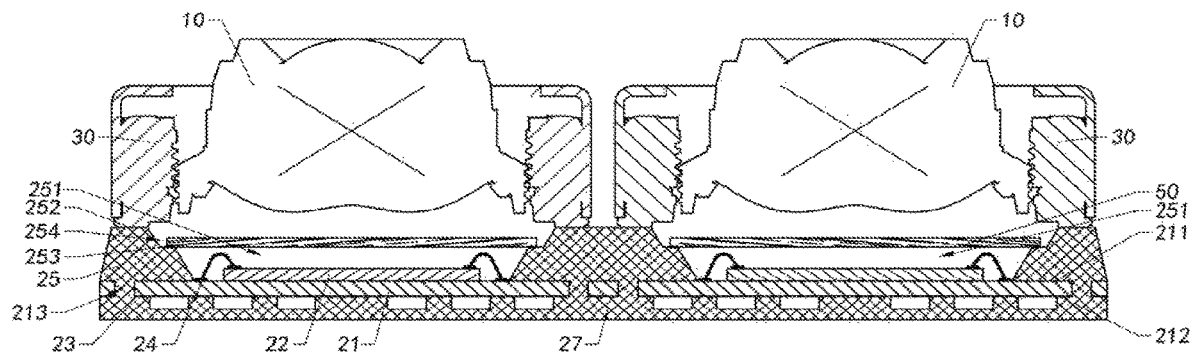
FIG. 67 is a schematic sectional view of another variant implementation of the array camera module according to the above preferred embodiment of the present invention.

In the example shown in FIG. 67, the circuit board 21 has at least one molding space 213 that is implemented as a through hole so as to make the front face 211 and the back face 212 of the circuit board 21 in communication, wherein after a molding material passes through the molding space 213 and is solidified, the molding base 25 is formed on the front face 211 of the circuit board 21, and the embedding portion 27 is formed on the back face 212 of the circuit board 21, wherein the molding base 25 and the embedding portion 27 can be bonded integrally. It can be understood by those skilled in the art that the embodiments of the present invention shown in the above description and the accompanying drawings are by way of example only and do not limit the present invention.

Figure 68:
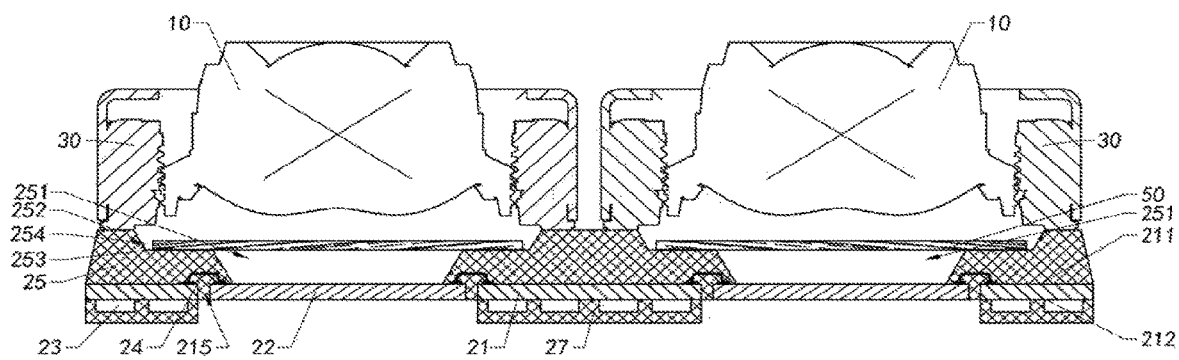
FIG. 68 is a schematic sectional view of another variant implementation of the array camera module according to the above preferred embodiment of the present invention.

In the example shown in FIG. 68, the circuit board 21 can have at least one accommodation spaces 215 that are implemented as through holes. For the convenience of description, in this specific example shown in FIG. 68, the circuit board 21 has two accommodation spaces 215 that are implemented as through holes. Therefore, in a molding process, the photosensitive chip 22 can be held in the accommodation space 215 of the circuit board 21, the lower die of the molding die 300 abuts against the photosensitive chip 22 on the lower surface of the photosensitive chip 22, the upper die of the molding die 300 abuts against the photosensitive chip 22 on the upper surface of the photosensitive chip 22, so that the photosensitive chip 22 is clamped by the upper die and the lower die of the molding die 300, and then, at least one of the embedding portion 27 and the molding base 25 is formed by means of adding a molding material into the molding die 300.

Figure 69:
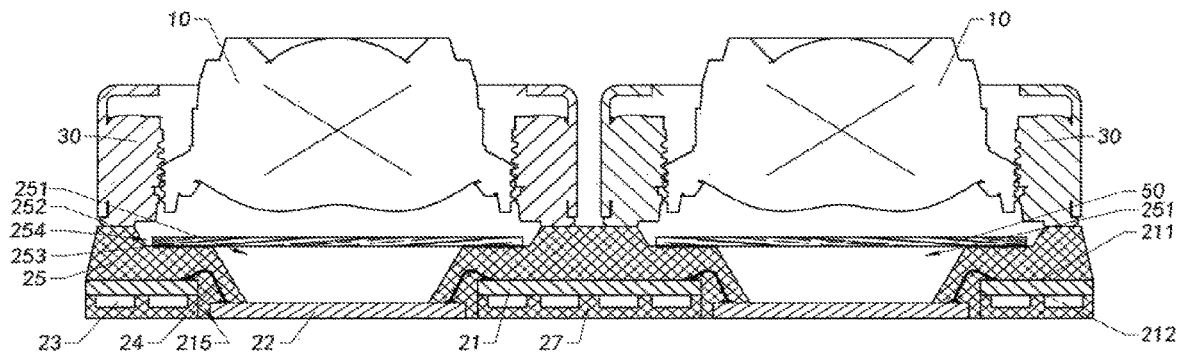
FIG. 69 is a schematic sectional view of another variant implementation of the array camera module according to the above preferred embodiment of the present invention.

In the example shown in FIG. 69, the upper surface of the photosensitive chip 22 can be lower than the front face 211 of the circuit board 21, for example, the upper surface of the photosensitive chip 22 can be at a same height as the back face 212 of the circuit board 21, and even, the upper surface of the photosensitive chip 22 can be lower than the back face 212 of the circuit board 21, that is, the height of the photosensitive chip 22 relative to the circuit board 21 can be adjusted conveniently. Of course, in some other embodiments, the embedding portion 27 can further embed the lower surface of the photosensitive chip 22, as shown in FIG. 70.

Figure 70:
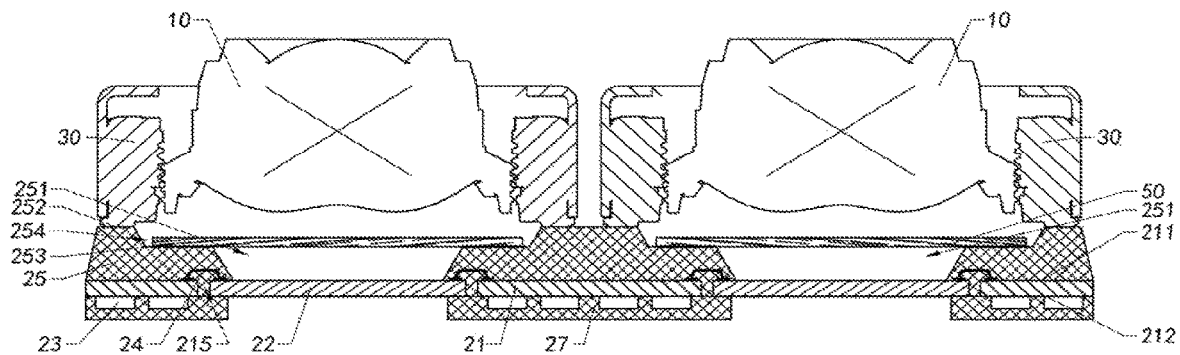
FIG. 70 is a schematic sectional view of another variant implementation of the array camera module according to the above preferred embodiment of the present invention.

With further reference to FIG. 70, the embedding portion 27 of the array camera module 100 has at least one notch 271. Therefore, when the array camera module 100 is assembled into one of the electronic device bodies 200 subsequently to form the electronic device, the components (for example, a resistance, a capacitance, and the like) of the electronic device can be accommodated in the notch 271 of the embedding portion 27, so that the components of the electronic device can be overlapped with the embedding portion 27 of the array camera module 100 in the length and width direction of the electronic device, thereby facilitating the development of the electronic device towards becoming lighter and thinner.

Preferably, in this specific example of the array camera module 100 shown in FIG. 70, the notch 271 of the embedding portion 27 corresponds to the photosensitive chip 22, wherein the notch 271 of the embedding portion 27 can be formed in a process that the embedding portion 27 is molded. More preferably, the notch 271 of the embedding portion 27 of the array camera module 100 is formed in a middle portion of the embedding portion 27, so that the embedding portion 27 surrounds the notch 271. In other words, when viewed from a top view of the array camera module 100, the shape of the embedding portion 27 may be, but not limited to, " ⊓ ", " ⊞ ", " ⊟ ", and the like.

Figure 71:
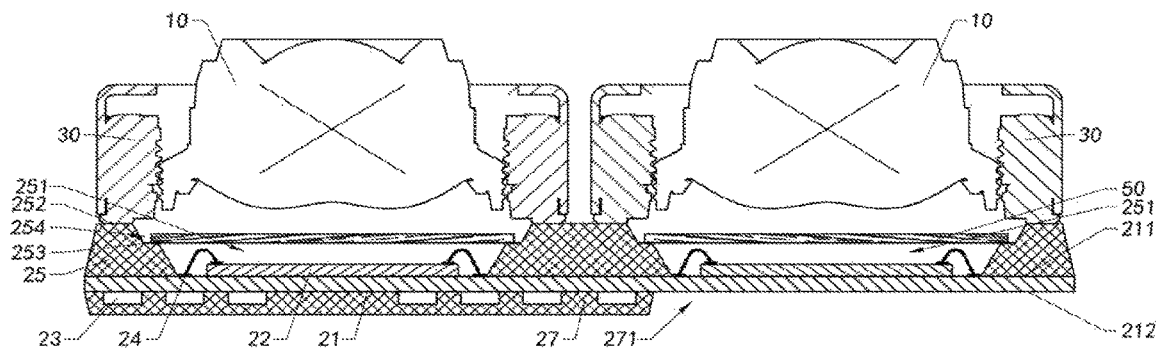
FIG. 71 is a schematic sectional view of another variant implementation of the array camera module according to the above preferred embodiment of the present invention.

In this example shown in FIG. 71, the notch 271 of the embedding portion 27 of the array camera module 100 is formed on a side portion of the embedding portion 27. That is, the embedding portion 27 may be bonded only to one side or one end of the back face 212 of the circuit board 21 during the process of molding, thereby forming the notch 271 on the other side or the other end of the back face 212 of the circuit board 21.

It should be understood by those skilled in the art that since the embedding portion 27 is formed by integrally bonding the molding material 500 to the back face 212 of the circuit board 21 by a molding process, therefore, the position and size of the back face 212 of the circuit board 21 to which the embedding portion 27 is bonded is relatively flexible. For example, in this specific example of the array camera module 100 shown in FIG. 71 of the present invention, the ratio of the area of the back face 212 of the circuit board 21 bonded by the embedding portion 27 to the total area of the back face 212 of the circuit board 21 may be 1:2, or the ratio may be 2:3, or the ratio ranges from greater than or equal to 1:2 to less than or equal to 2:3. Nonetheless, it should be understood by those skilled in the art that the ratio of the area of the back face 212 of the circuit board 21 bonded by the embedding portion 27 to the total area of the back face 212 of the circuit board 21 ranging from greater than or equal to 1:2 and less than or equal to 2:3 disclosed above is only an example, which should not be regarded as limiting the content and scope of the array camera module 100 of the present invention. In other words, the area of the back face 212 of the circuit board 21 bonded by the embedding portion 27 is not limited in the array camera module 100 of the present invention, as long as the embedding portion 27 can embed the electronic component 23.

Figure 72:
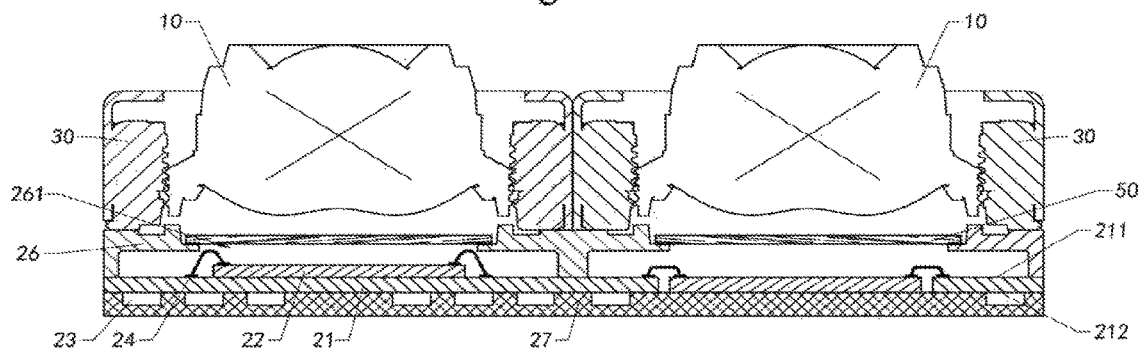
FIG. 72 is a schematic sectional view of another variant implementation of the array camera module according to the above preferred embodiment of the present invention.

In this example shown in FIG. 72, the circuit board 21 of the array camera module 100 has at least one accommodation space 215 implemented as a through hole, wherein the embedding portion 27 integrally bonded to at least a part of the back face 212 of the circuit board 21 may be formed on the back face 212 of the circuit board 21 by a molding process. Preferably, in this specific example of the array camera module 100 shown in FIG. 72, the embedding portion 27 further embeds the electronic component 23 protruding from the back face 212 of the circuit board 21. After the embedding portion 27 is bonded to the back face 212 of the circuit board 21, the accommodation space 215 of the circuit board 21 corresponds to the embedding portion 27. That is, a part of the embedding portion 27 is exposed in the accommodation space 215 of the circuit board 21.

One of the photosensitive chip 22 is attached to the front face 211 of the circuit board 21, another of the photosensitive chip 22 is attached to the embedding portion 27 via the accommodation space 215 of the circuit board 21, and the lead 24 are then formed between a chip connector of each of the photosensitive chips 22 and a circuit board connector of the circuit board 21 by a wiring process to conductively connect each of the photosensitive chips 22 and the circuit board 21 by the lead 24.

In this specific example of the array camera module 100 shown in FIG. 72, the lens base 26 is attached to the front face 211 of the circuit board 21, and the photosensitive areas of each of the photosensitive chips 22 respectively correspond to each of the light through holes 261 of the lens base 26, so that the lens base 26 surrounds each of the photosensitive chips 22, and at this point, each of the filtering elements 50 attached to the lens base 26 is held in a photosensitive path of each of the photosensitive chips 22, respectively. Each of the drivers 30 is respectively attached to the lens base 26 to respectively hold each of the optical lenses 10 that is drivably disposed in each of the drivers 30 in a photosensitive path of each of the photosensitive chips 22 by each of the drivers 30, respectively, and each of the filtering elements 50 is held between each of the photosensitive chips 22 and each of the optical lenses 10, respectively.

Figure 73:
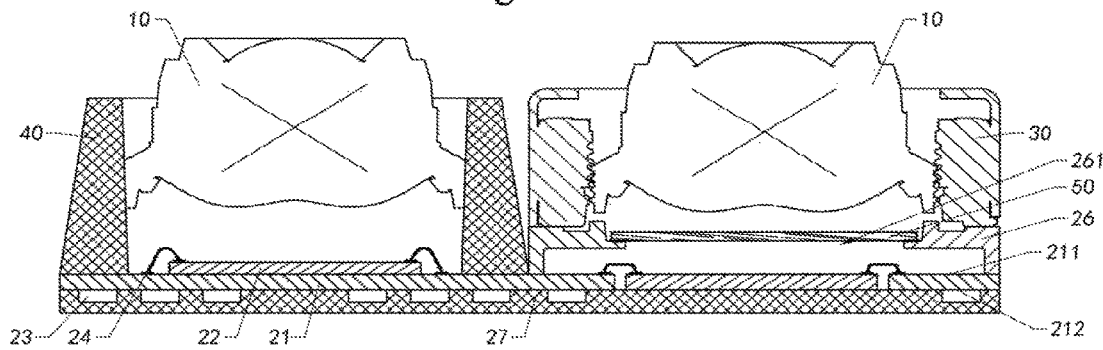
FIG. 73 is a schematic sectional view of another variant implementation of the array camera module according to the above preferred embodiment of the present invention.

Different from the array camera module 100 shown in FIG. 72, in this specific example of the array camera module 100 shown in FIG. 73, the number of the light through holes 261 of the lens base 26 of the array camera module 100 is less than the number of the photosensitive chips 22. With reference to this specific example shown in FIG. 73, the lens base 26 is attached to one end of the circuit board 21, so that the photosensitive area of the photosensitive chip 22 attached to the embedding portion 27 corresponds to the light through hole 261 of the lens base 26, and the filtering element 50 attached to the lens base 26 is held in the photosensitive path of the photosensitive chip 22. The driver 30 is attached to the lens base 26 to hold the optical lens 10 which is drivably disposed in the driver 30 in the photosensitive path of the photosensitive chip 22 by the driver 30, and the filtering element 50 is held between the optical lens 10 and the photosensitive chip 22. In addition, the array camera module 100 further comprises a lens tube 40, wherein the lens tube 40 is attached to another end of the circuit board 21, so that the optical lens 10 disposed in the lens tube 40 is held in the photosensitive path of the photosensitive chip 22 by the lens tube 40.

Figure 74:
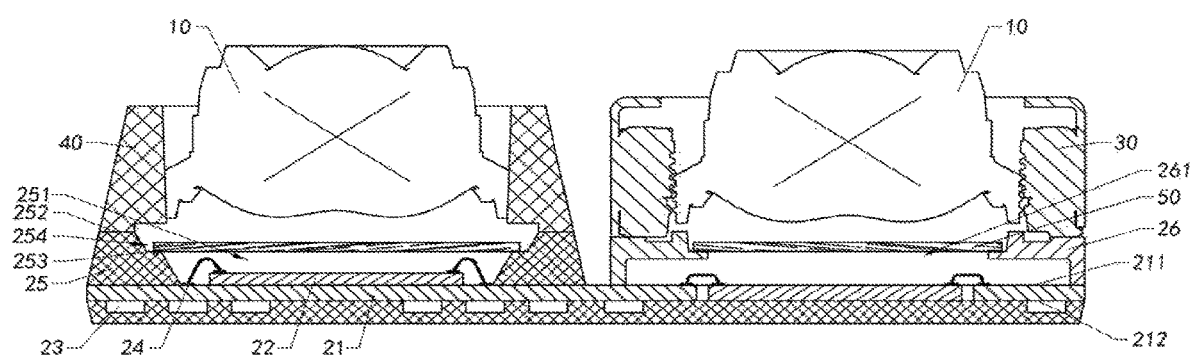
FIG. 74 is a schematic sectional view of another variant implementation of the array camera module according to the above preferred embodiment of the present invention.

Different from the array camera module 100 shown in FIG. 73, in this specific example of the array camera module 100 shown in FIG. 74, the molding base 25 integrally bonded to the circuit board 21 is formed on the front face 211 of the circuit board 21, and the molding base 25 surrounds the photosensitive area of the photosensitive chip 22 that is attached to the front face 211 of the circuit board 21, so that the photosensitive area of the photosensitive chip 22 that is attached to the front face 211 of the circuit board 21 corresponds to the light window 251 of the molding base 25. The filtering element 50 is attached to the molding base 25, and the filtering element 50 is held in the photosensitive path of the photosensitive chip 22. The lens tube 40 is attached to the molding base 25, so that the optical lens 10 disposed in the lens tube 40 is held in the photosensitive path of the photosensitive chip 22 by the lens tube 40.

Figure 75:
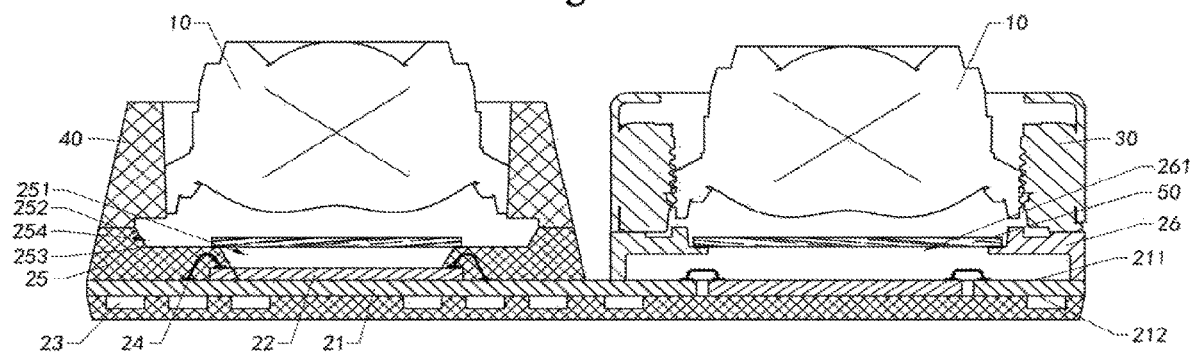
FIG. 75 is a schematic sectional view of another variant implementation of the array camera module according to the above preferred embodiment of the present invention.

Different from the array camera module 100 shown in FIG. 74, in this specific example of the array camera module 100 shown in FIG. 75, the molding base 25 further embeds at least a part of the non-photosensitive area of the photosensitive chip 22 so as to further reduce the length and width of the array camera module 100.

According to another aspect of the present invention, the present invention further provides a method for manufacturing an array camera module, comprising the following steps:

(a) connecting at least one electronic component 23 to a circuit board 21 conductively with a free side of the electronic component 23 oriented towards a side where a back face 212 of the circuit board 21 is located;

(b) connecting each photosensitive chip 22 to the circuit board 21 conductively with a photosensitive area of each of the photosensitive chips 22 oriented towards a side where a front face 211 of the circuit board 21 is located; and (c) holding each optical lens 10 in a photosensitive path of each of the photosensitive chips 22 respectively, thereby producing the array camera module 100.

The manufacturing method further comprises the step of bonding at least one embedding portion 27 to the back face 212 of the circuit board 21 integrally. It is worth mentioning that, in an example of the manufacturing method of the present invention, the step of integrally bonding the embedding portion 27 to the back face 212 of the circuit board 21 may be after the step (a) and before the step (b), therefore, in the step (a), after the electronic component 23 is connected on the back face 212 of the circuit board 21, the embedding portion 27 is integrally bonded to the back face 212 of the circuit board 21, and then, in the step (b), each of the photosensitive chips 22 is conductively connected to the front face 211 of the circuit board 21. And in another example of the manufacturing method of the present invention, the step of integrally bonding the embedding portion 27 to the back face 212 of the circuit board 21 may be after the step (b), so that after the front face 212 of the circuit board 21 is conductively connected to each of the photosensitive chips 22, the embedding portion 27 is then integrally bonded to the back face 212 of the circuit board 21.

Figure 87:
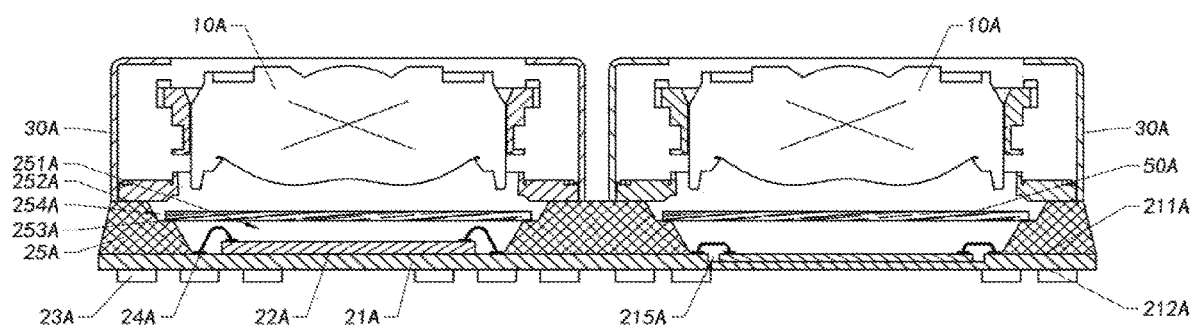
FIG. 87 is a schematic diagram of another manufacturing process of the array camera module according to the above preferred embodiment of the present invention.
Figure 88:
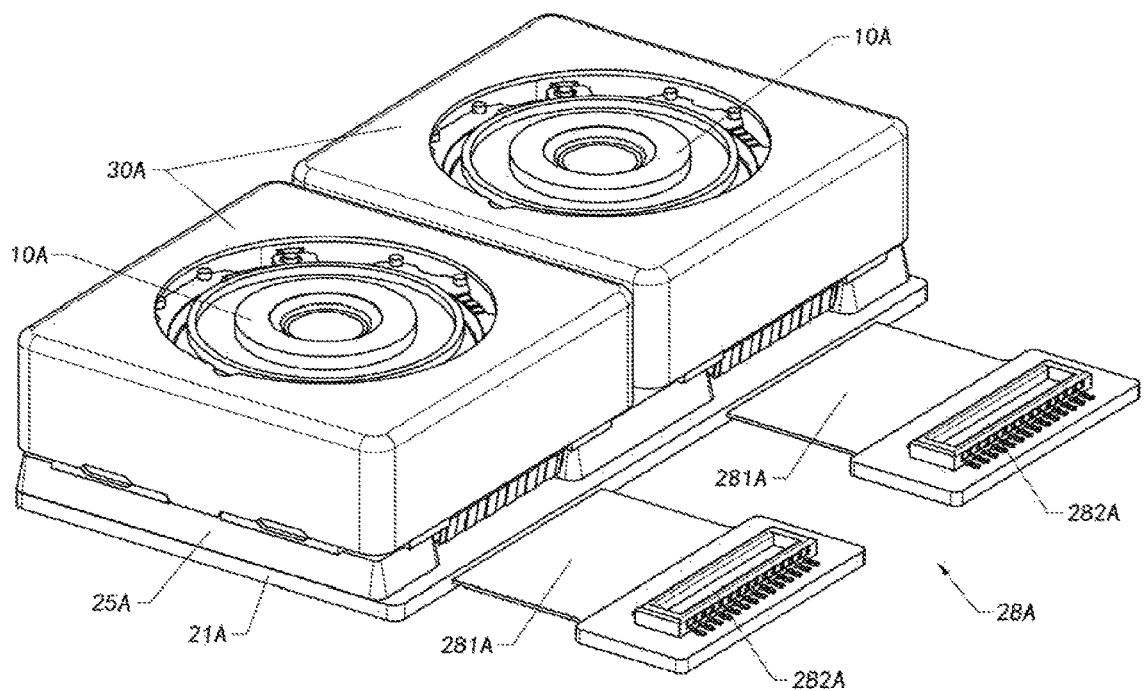
FIG. 88 is a stereoscopic schematic diagram of the array camera module according to the above preferred embodiment of the present invention.
Figure 89:
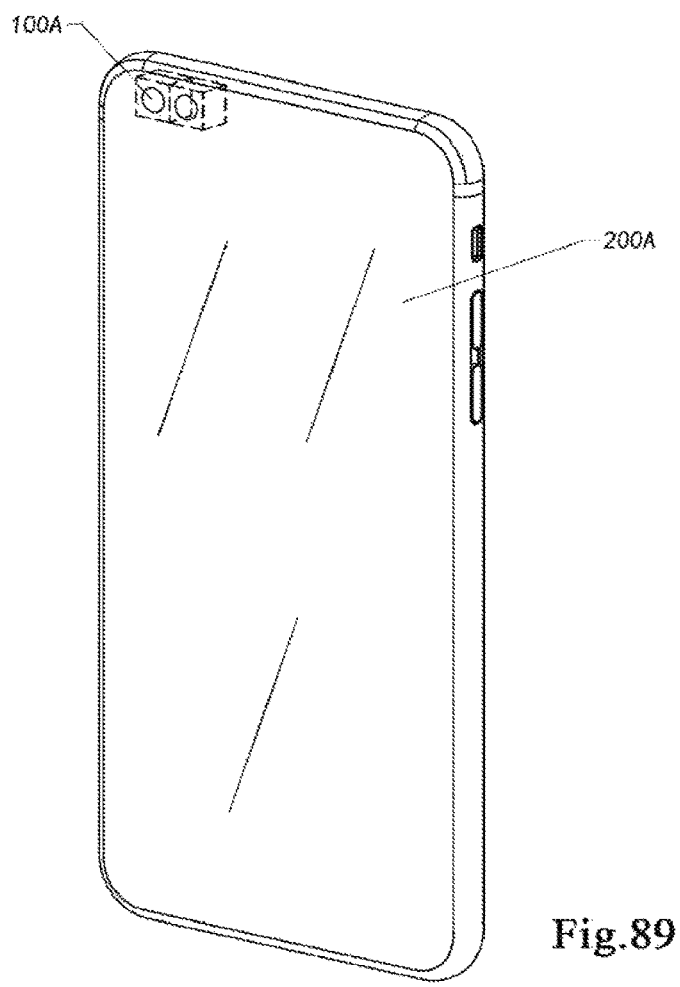
FIG. 89 is a schematic diagram of an application state of the array camera module according to the above preferred embodiment of the present invention.

With reference to FIG. 87 to FIG. 89 of the accompanying drawings of the present invention, an array camera module 100A according to a preferred embodiment of the present invention is set forth in the following description, wherein one of the usage states of the array camera module 100A shown in FIG. 89, for example, in the example shown in FIG. 89, one of the array camera modules 100A can be applied to an electronic device body 200A that is embodied as a smart phone, so that the array camera module 100A can be combined with the electronic device body 200A to form an electronic device.

It is worth mentioning that although in the example shown in FIG. 89, the number of the array camera modules 100A is one, and the array camera module 100A is disposed at rear of the electronic device body 200A, but in other examples, the number of the array camera module 100A is not limited to one, and the position of the array camera module 100A is not limited to being disposed at the rear of the electronic device body 200A, for example, the array camera module 100A can be disposed at front of the electronic device body 200A, and of course, it is also possible that the array camera module 100A is disposed at other positions of the electronic device body 200A.

In addition, although the electronic device body 200A is implemented as a smart phone in FIG. 89, but in other examples of the present invention, the electronic device body 200A can also be implemented as a tablet, a notebook computer, a camera, a personal digital assistant, an electronic book, an MP3/4/5, and any electronic device that can be configured with the array camera module 100A. Of course, it can be understood by those skilled in the art that it is also possible to configure the array camera module 100A on conventional appliances such as a refrigerator, a washing machine, a television, etc., or it is possible to configure the array camera module 100A on buildings such as a security door or a wall. Therefore, the application environment and usage mode of the array camera module 100A should not be regarded as limiting the content and scope of the camera module of the present invention.

It is worth mentioning that in this specific application of the array camera module 100A shown in FIG. 89, the electronic device body 200A is implemented as a smart phone, and the array camera module 100A is disposed at the rear of the electronic device body 200A to form a rear camera module of the smart phone. It should be understood by those skilled in the art that in other possible examples, the array camera module 100A may also be disposed at the front of the electronic device body 200A to form a front camera module of the smart phone.

With reference to FIG. 87 to FIG. 89, the array camera module 100A comprises at least two optical lenses 10A and one circuit board assembly 20A, wherein the circuit board assembly 20A comprises at least one circuit board 21A, at least one photosensitive chip 22A, and at least one electronic component 23A, and wherein each of the photosensitive chips 22A is conductively connected to the circuit board 21A, respectively, and a photosensitive surface of at least one of the photosensitive chips 22A and a photosensitive surface of the other photosensitive chip 22A have a height difference, each of the electronic components 23A is attached to the circuit board 21A, and each of the optical lenses 10A is held in a photosensitive path of each of the photosensitive chips 22A, respectively. Light reflected by the object can respectively enter the interior of the array camera module 100A from each of the optical lens 10A for subsequently received and imaged by each of the photosensitive chip 22A, respectively, thereby obtaining an image associated with the object. It is worth mentioning that the photosensitive surface of the photosensitive chip 22A according to the array camera module 100A of the present invention refers to a side surface oriented towards the optical lens 10A of the photosensitive chip 22A.

For example, in this specific example of the array camera module 100A shown in FIG. 87 and FIG. 88, the array camera module 100A comprises two optical lens 10A and one circuit board assemblies 20A, wherein the circuit board assembly 20A comprises one circuit board 21A, two photosensitive chips 22A, and a plurality of the electronic components 23A, and wherein the two photosensitive chips 22A are attached to one side of the circuit board 21A by mutually spaced, and the photosensitive surfaces of the two photosensitive chips 22A have a height difference, each of the electronic components 23A is attached to the other side of the circuit board 21A by mutually spaced, and each of the optical lenses 10A is held in a photosensitive path of each of the photosensitive chips 22A, respectively. Light reflected by the object can respectively enter the interior of the array camera module 100A from each of the optical lens 10A, and then is received and imaged by each of the photosensitive chip 22A at corresponding positions, respectively, thereby obtaining an image associated with the object.

In the array camera module 100A of the present invention, the imaging capability of the array camera module 100A can be improved and the function of the array camera module 100A can be increased by means of making a height difference between the photosensitive surface of at least one of the photosensitive chips 22A and the photosensitive surface of the other photosensitive chip 22A. For example, in this specific example of the array camera module 100A shown in FIG. 87 and FIG. 88, the two photosensitive chips 22A of the array camera module 100A can respectively obtain images with different focal lengths. That is, two optical systems formed by the optical lens 10A and the photosensitive chip 22A can have different focal lengths by making a height difference between the photosensitive surfaces of the two photosensitive chips 22A, thereby obtaining different images with different focal lengths, which facilitates greatly improving the imaging capability of the array camera module 100A. In some other examples of the array camera module 100A of the present invention, one of the photosensitive chips 22A of the array camera module 100A can be used for obtaining an image associated with the object, and the other of the photosensitive chip 22A can record a depth of field associated with the object, so that other mechanisms of the electronic device can optimize an image associated with the object which is obtained by one of the photosensitive chips 22A and a depth of field associated with the object which is obtained by another of the photosensitive chip 22A to obtain a better image, thereby improving the imaging capability of the array camera module 100A.

In addition, in other examples of the array camera module 100A of the present invention, the area of the photosensitive area of at least one of the photosensitive chips 22A is different from the area of the photosensitive area of other of the photosensitive chips 22A. For example, in this specific example of the array camera module 100A shown in FIG. 87 and FIG. 88, the two photosensitive chips 22A have photosensitive areas with different areas.

With further reference to FIG. 87 and FIG. 88, the circuit board 21A has one front face 211A, one back face 212A corresponding to the front face 211A and at least one accommodation space 215A, wherein the front face 211A and the back face 212A of the circuit board 21A correspond to each other to define the thickness of the circuit board 21A, and wherein the accommodation space 215A extends from the front face 211A of the circuit board 21A toward the back face 212A. Each of the photosensitive chips 22A may be bonded to the circuit board 21A by means of being attached to the front face 211A of the circuit board 21A, and one of the photosensitive chips 22A can be accommodated in the accommodation space 215A of the circuit board 21A, so that the photosensitive surfaces of the two photosensitive chips 22A have a height difference. For example, in this specific example of the array camera module 100A shown in FIG. 87, although both of the photosensitive chips 22A are attached to the front face 211A of the circuit board 21A, the photosensitive chip 22A located on the right side of the drawing is held in the accommodation space 215A of the circuit board 21A. In this way, the photosensitive surface of the photosensitive chip 22A located on the left side of the drawing is higher than the photosensitive surface of the photosensitive chip 22A located on the right side of the drawing, so that the photosensitive surfaces of the two photosensitive chips 22A have a height difference. Correspondingly, each of the electronic components 23A can be bonded to the circuit board 21A by means of being attached to the back face 212A of the circuit board 21A. In other words, each of the electronic components 23A is connected to the circuit board 21A on the back face 212A of the circuit board 21A. That is, in this specific example of the array camera module 100A shown in FIG. 87, each of the electronic components 23A is located on the back face 212A of the circuit board 21A.

It is worth mentioning that in other possible examples of the array camera module 100A of the present invention, at least one of the electronic components 23A may be conductively connected to the circuit board 21A on the front face 211A of the circuit board 21A. That is, in this specific example of the array camera module 100A, at least one of the electronic components 23A may be conductively connected to the circuit board 21A on the front face 211A of the circuit board 21A, and the other electronic components 23A may be conductively connected to the circuit board 21A on the back face 212A of the circuit board 21A.

It is also worth mentioning that, although the electronic component 23A being conductively connected to the circuit board 21A in such a manner that the electronic component 23A is attached to the back face 212A of the circuit board 21A is shown in FIG. 87 and FIG. 88, in other possible examples of the array camera module 100A of the present invention, the electronic component 23A may be conductively connected to the circuit board 21A in such a manner that at least a part of the electronic component 23A is embedded in the circuit board 21A.

It is worth mentioning that in one example of the array camera module 100A of the present invention, the electronic component 23A can be implemented as passive electronic components such as a resistor, a capacitor, a relay, a processor, etc. In other words, the type of the electronic component 23A is not limited in the array camera module 100A of the present invention.

Further, the circuit board assembly 20A further comprises at least one set of leads 24A, wherein two ends of each of the leads 24A are respectively connected to the circuit board 21A and the photosensitive chip 22A, so that each of the leads 24A connects the photosensitive chip 22A and the circuit board 21A.

For example, in one example, the photosensitive chip 22A may be attached on the front face 211A of the circuit board 21A firstly, and each of the leads 24A is then disposed between the photosensitive chip 22A and the circuit board 21A through a process such as wire, so that the circuit board 21A and the photosensitive chip 22A are connected by each of the leads 24A. It can be understood that the flatness of the photosensitive chip 22A is limited by the flatness of the circuit board 21A. Of course, in some other examples, it is not necessary to directly attach the photosensitive chip 22A to the circuit board 21A together, so that the flatness of the photosensitive chip 22A can be prevented from being affected by the flatness of the circuit board 21A, or even if the photosensitive chip 22A is attached to the circuit board 21A, the flatness of the photosensitive chip 22A may not be affected by the flatness of the circuit board 21A. In this way, the circuit board 21A can be made by employing a plate with thinner thickness. In a subsequent disclosure, the present invention will describe how the flatness of the photosensitive chip 22A would not be limited by the flatness of the circuit board 21A.

The wiring direction of the lead 24A is not limited in the array camera module 100A of the present invention. For example, the wiring direction of the wire 24A may be from the photosensitive chip 22A to the circuit board 21A, or may be from the circuit board 21A to the photosensitive chip 22A, and of course, the lead 24A may also be used to connect the photosensitive chip 22A and the circuit board 21A in other manners, and the array camera module 100A of the present invention is not limited in this respect. It can be understood that the material of the lead 24A is not limited in the array camera module 100A of the present invention, for example, the lead 24A can be, but not limited to, a gold wire, a silver wire, a copper wire, etc.

Of course, it can be understood that in some examples of the array camera module 100A, the photosensitive chip 22A can be provided with a chip connector in advance, the circuit board 21A can be provided with a circuit board connector in advance, and the two ends of the lead 24A can be in contact with the chip connector of the photosensitive chip 22A and the circuit board connector of the circuit board 21A, respectively, to connect the photosensitive chip 22A and the circuit board 21A by the lead 24A, for example, the two ends of the lead 24A may be welded to the chip connector of the photosensitive chip 22A and the circuit board connector of the circuit board 21A, respectively, so that the photosensitive chip 22A and the circuit board 21A are connected by the lead 24A. It is worth mentioning that the shape and size of the chip connector of the photosensitive chip 22A and the circuit board connector of the circuit board 21A may not be limited, for example, the chip connector of the photosensitive chip 22A and the circuit board connector of the circuit board 21A can be implemented as, but not limited to, a disk shape, a sphere shape, etc., respectively.

With reference to FIG. 87 and FIG. 88, in this embodiment of the array camera module 100A of the present invention, each of the electronic components 23A is respectively attached to the back face 212A of the circuit board 21A by mutually spaced, that is, each of the electronic components 23A may not need to be disposed in the circumferential direction of the photosensitive chip 22A. In this way, it facilitates reducing at least one of the length and width of the circuit board assembly 20A, thereby reducing at least one of the length and width of the array camera module 100A, so that the array camera module 100A can be applied to the electronic device that is intended to be lighter and thinner. Preferably, the length and width of the circuit board assembly 20A can be simultaneously reduced by means of respectively attaching each of the electronic components 23A to the back face 212A of the circuit board 21A by mutually spaced, and further reducing the length and width of the array camera module 100A. Therefore, when the electronic device is formed when the array camera module 100A is mounted on the electronic device body 200A, the array camera module 100A can occupy less space inside the electronic device body 200A, and therefore, it not only facilitates thinning and lighting of the electronic device, but also facilitate the electronic device to be configured with more intelligent components, so that the electronic device is developed to be more intelligent.

The circuit board assembly 20A further comprises a molding base 25A, wherein the molding base 25A may be integrally formed on the front face 211A of the circuit board 21A, wherein the molding base 25A has at least one light window 251A, the photosensitive area of the photosensitive chip 22A corresponds to the light window 251A to form a light path between the optical lens 10A and the photosensitive chip 22A via the light window 251A of the molding base 25A. That is, the light entering the interior of the array camera module 100A from the optical lens 10A can be received and imaged by the photosensitive chip 22A after passing through the light window 251A of the molding base 25A.

For example, in this specific example of the array camera module 100A shown in FIG. 87 and FIG. 88, the molding base 25A has two light windows 251A independent of each other, wherein the photosensitive area of each of the photosensitive chips 22A respectively correspond to each of the light windows 251A of the molding base 25A so as to respectively form a light path between each of the optical lens 10A and each of the photosensitive chips 22A by each of the light windows 251A of the molding base 25A. That is, the light reflected by the object can be received by the photosensitive area of the photosensitive chip 22A via each of the light windows 251A of the molding base 25A after entering the interior of the array camera module 100A from each of the optical lens 10A, and is subsequently imaged by each of the photosensitive chip 22A after photoelectric conversion.

The molding base 25A can be integrally molded on the front face 211A of the circuit board 21A by a molding process, and in this way, it is not necessary to provide substances such as glue for connecting the molding base 25A and the circuit board 21A between the molding base 25A and the circuit board 21A. In this way, not only the height of the array camera module 100A can be reduced, but also the flatness of the circuit board 21A can be effectively ensured to improve the imaging quality of the array camera module 100A. In addition, since it is not necessary to provide substances such as glue for connecting the molding base 25A and the circuit board 21A between the molding base 25A and the front face 211A of the circuit board 21A, therefore, the height of the array camera module 100A can be reduced to facilitate the application of the array camera module 100A to the electronic device that is intended to be lighter and thinner. It is more important that the molding base 25A is integrally bonded to the circuit board 21A during the process of molding, so that on one hand, the molding base 25A does not need to be pre-fabricated, and on the other hand, there is no need to worry about that the molding base 25A may be deformed before being bonded to the circuit board 21A. Moreover, the molding base 25A can reinforce the strength of the circuit board 21A to ensure the flatness of the circuit board 21A, so that even when the circuit board 21A is selected from a thinner circuit board such as a thinner PCB board, an FPC board, or a hard and soft board, the molding base 25A can ensure the flatness of the circuit board 21A, and in this way, the coaxiality of a plurality of the photosensitive chips 22A can be ensured.

The array camera module 100A further comprises at least one driver 30A, wherein the optical lens 10A is drivably disposed on the driver 30A, and the driver 30A is disposed on the molding base 25A, so that the optical lens 10A is held in the photosensitive path of the photosensitive chip 22A by the cooperation of the driver 30A and the molding base 25A. The driver 30A can drive the optical lens 10A to move along the photosensitive path of the photosensitive chip 22A to adjust the focal length of the camera module 100A, so that the array camera module 100A has the capacities of automatic zooming and automatic focusing. Preferably, the driver 30A can be implemented as, but not limited to, a voice coil motor.

For example, in this specific example of the array camera module 100A shown in FIG. 87 and FIG. 88, the number of the drivers 30A is implemented as two, wherein each of the optical lenses 10A is drivably disposed on each of the drivers 30A, respectively, and each of the drivers 30A is respectively attached to the molding base 25A in such a manner that each of the optical lenses 10A corresponds to each of the light windows 251A of the molding base 25A, so that each of the optical lenses 10A is held in the photosensitive path of each of the photosensitive chips 22A by each of the drivers 30A.

It is worth mentioning that in some specific examples of the array camera module 100A of the present invention, each of the drivers 30A drives each of the optical lenses 10A to move along the photosensitive path of each of the photosensitive chips 22A in a simultaneous and identical amplitude manner, respectively. In some other specific examples of the array camera module 100A of the present invention, each of the drivers 30A individually drives each of the optical lenses 10A to move along the photosensitive path of each of the photosensitive chips 22A, respectively. For example, in this specific example of the array camera module 100A shown in FIG. 87, the driver 30A on the left side of the figure can drive the optical lens 10A to move along the photosensitive path of the photosensitive chip 22A, while the driver 30A on the right side of the figure may not move, which enables the two optical systems to have different focal lengths.

With further reference to FIG. 87, the array camera module 100A can comprise at least one filtering element 50A, wherein each of the filtering elements 50A is held between each of the photosensitive chips 22A and each of the optical lenses 10A respectively for filtering stray light in the light entering the interior of the array camera module 100A from each of the optical lenses 10A, thereby improving the imaging quality of the array camera module 100A. The type of the filtering element 50A is not limited, for example, the filtering element 50A can be implemented as, but not limited to, an infrared cut-off filter.

For example, in this specific example of the array camera module 100A shown in FIG. 87, the array camera module 100A comprises two filtering elements 50A, wherein each of the filtering elements 50A is attached to the molding base 25A respectively, and each of the filtering elements 50A is held between each of the photosensitive chips 22A and each of the optical lenses 10A respectively so as to filter, by each of the filtering elements 50A, stray light in the light entering the interior of the array camera module 100A from each of the optical lenses 10A. Nonetheless, it can be understood by those skilled in the art that in some other specific examples of the array camera module 100A of the present invention, the array camera module 100A may comprise one filtering element 50A, and at this point, more than two photosensitive chips 22A may be corresponding to different positions of the same filtering element 50A so as to filter, by the filtering element 50A, stray light in the light entering the interior of the array camera module 100A from each of the optical lenses 10A.

It is worth mentioning that in the example in which the array camera module 100A comprises more than two filtering elements 50A, the type of each of the filtering elements 50A may be the same or may be different, which is employed as needed. It can be understood by those skilled in the art that if the type of each filtering element 50A of the array camera module 100A is different, each optical system of the array camera module 100A may have different imaging characteristics. It is worth mentioning that each optical system of the array camera module 100A is formed by one of the photosensitive chips 22A and one of the optical lenses 10A that is held in the photosensitive path of the photosensitive chip 22A. For example, in this specific example of the array camera module 100A shown in FIG. 87, the type of the filtering element 50A on the left side of the figure and the type of the filtering element 50A on the right side of the figure may be different.

Further, with continued reference to FIG. 87, the molding base 25A has an outer attaching face 252A and at least one inner attaching face 253A, wherein each of the inner attaching faces 253A surrounds each of the light windows 251A of the molding base 25A respectively, and the outer attaching face 252A surrounds each of the inner attaching faces 253A, and wherein each of the drivers 30A can be attached to different positions of the outer attaching face 252A of the molding base 25A, and each of the filtering elements 50A can be attached to each of the inner attaching faces 253A of the molding base 25A respectively. In this way, each of the optical lenses 10A can be held in the photosensitive path of each of the photosensitive chips 22A respectively, and each of the filtering elements 50A can be held between each of the photosensitive chips 22A and each of the optical lenses 10A.

In one example of the array camera module 100A, the outer attaching face 252A and the inner attaching face 253A of the molding base 25A can be in a same plane. In another example of the array camera module 100A, there may be a height difference between the outer attaching face 252A and the inner attaching face 253A of the molding base 25A so as to form at least one attaching groove 254A of the molding base 25A. Specifically, the plane where the inner attaching face 253A of the molding base 25A is located is lower than the plane where the outer attaching face 252A is located, so that the molding base 25A forms the attaching groove 254A at a position corresponding to the inner attaching face 253A, and therefore, the filtering element 50A attached to the inner attaching face 253A is held in the attaching groove 254A. In this way, the height of the array camera module 100A can be further reduced, with reference to the array camera module 100A shown in FIG. 87.

Figure 76:
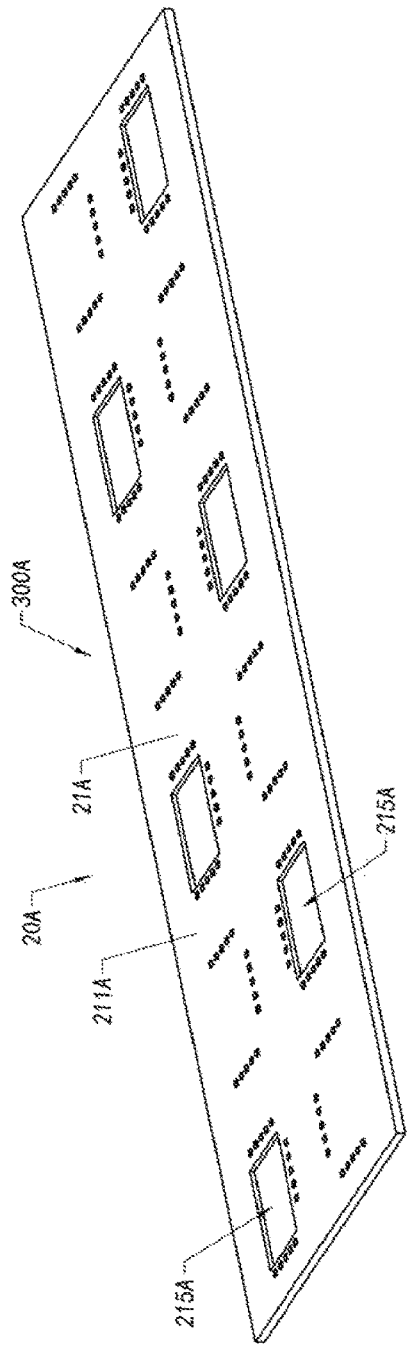
FIG. 76 is a schematic diagram of a manufacturing process of an array camera module according to a preferred embodiment of the present invention.

FIG. 76 to FIG. 87 of the accompanying drawings of the present invention show a manufacturing process of the array camera module 100A, wherein at the stage shown in FIG. 76, more than two circuit boards 21A can be arranged together to form a jointed board unit 300A, thereby facilitating a subsequent molding process. For example, a plurality of the circuit boards 21A can be arranged into, but not limited to, two rows to form the jointed board unit 300A. Of course, it can be understood by those skilled in the art that in other examples of the array camera module 100A of the present invention, the jointed board unit 300A can comprises more rows of the circuit boards 21A.

It is worth mentioning that the circuit board 21A can be arranged after being formed so as to form the jointed board unit 300A, for example, the circuit board 21A formed independently can be arranged on one substrate to form the jointed board unit 300A, or a plurality of the circuit boards 21A can be of an integral structure, which is separated by cutting after subjected to the molding process. In the following description of the present invention, taking a plurality of the circuit boards 21A being of an integral structure as an example, the manufacturing process of the array camera module 100A is disclosed and illustrated continuously.

Figure 77:
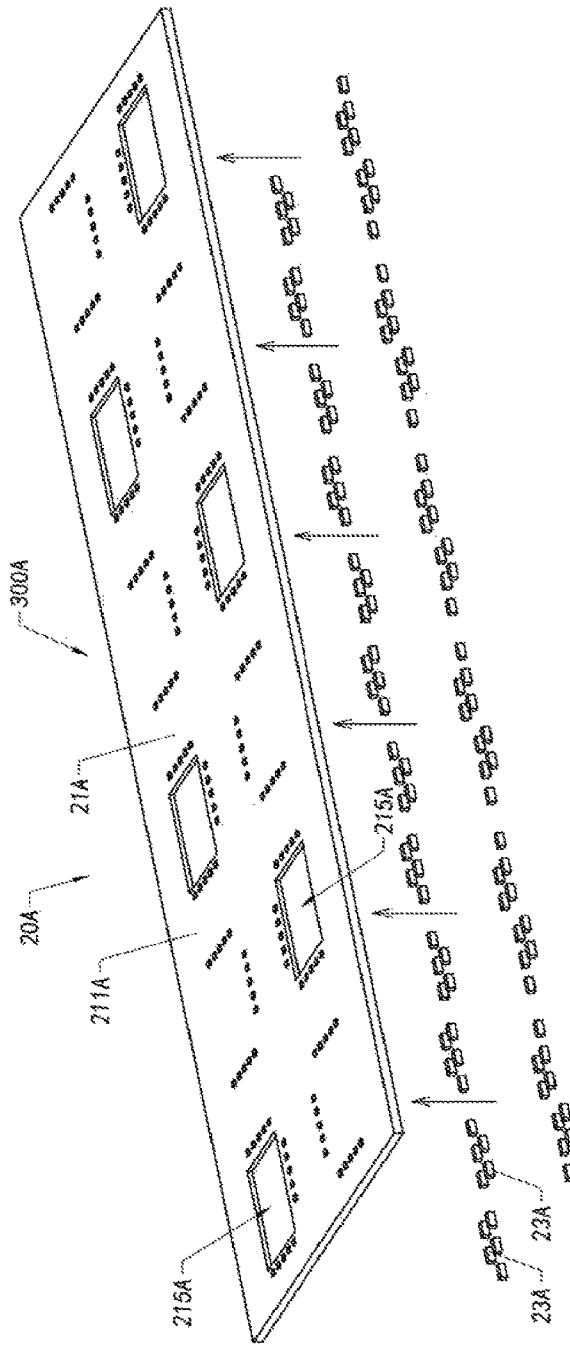
FIG. 77 is a schematic diagram of another manufacturing process of the array camera module according to the above preferred embodiment of the present invention.

At the stage shown in FIG. 77, each of the electronic components 23A can be attached to the circuit board 21A on the back face 212A of the circuit board 21A, respectively. Nonetheless, it can be understood by those skilled in the art that some of the electronic components 23A can be attached to the back face 212A of the circuit board 21A, and some other electronic components 23A can be attached to the front face 211A of the circuit board 21A. The array camera module 100A of the present invention is not limited in this respect.

It is worth mentioning that although in the specific example of the array camera module 100A shown in FIG. 77, the electronic component 23A is attached to the back face 212A of the circuit board 21A, in some other specific examples, at least a part of the electronic component 23A can be embedded in the back face 212A of the circuit board 21A, for example, a part of the electronic component 23A can be embedded in the circuit board 21A, and the other electronic component 23A is exposed to or protrudes from the back face 212A of the circuit board 21A. Alternatively, all of the electronic component 23A can be embedded in the circuit board 21A.

It is also worth mentioning that in the example of manufacturing each of the circuit boards 21A independently and arranging each of the circuit boards 21A into the jointed board unit 300A, each of the electronic components 23A can also be attached to the back face 212A of the circuit board 21A firstly, and each of the circuit boards 21A are then arranged to form the jointed board unit 300A.

In addition, the circuit boards 21A can be arranged into patterns different from those shown in FIG. 76 and FIG. 77, or the circuit board 21A may not be arranged, so that in a subsequent molding process, the molding process can be performed on the circuit board 21A independently so as to form the molding base 25A that is integrally bonded to the circuit board 21A.

Preferably, the distance between adjacent circuit boards 21A of the jointed board unit 300A ranges from 0.01 mm to 500 mm (including 0.01 mm and 500 mm) so as to facilitate the cutting of the circuit board 21A after the molding process is completed. Preferably, the distance between adjacent substrate 311 ranges from 0.05 mm to 200 mm (including 0.05 mm and 200 mm). In addition, in order to improve the stability of partial molding, the minimum size of the jointed board unit 300A ranges from 1 mm to 100000 mm (including 1 mm and 100000 mm), preferably 10 mm to 1000 mm (including 10 mm and 1000 mm).

With reference to FIG. 78A to FIG. 81, the jointed board unit 300A is placed in a molding die 400A to perform a molding process, wherein the molding die 400A comprises an upper die 401A and a lower die 402A, wherein at least one of the upper die 401A and the lower die 402A can be operated to enable the upper die 401A and the lower die 402A of the molding die 400A to be clamped and demolded.

Figure 78A:
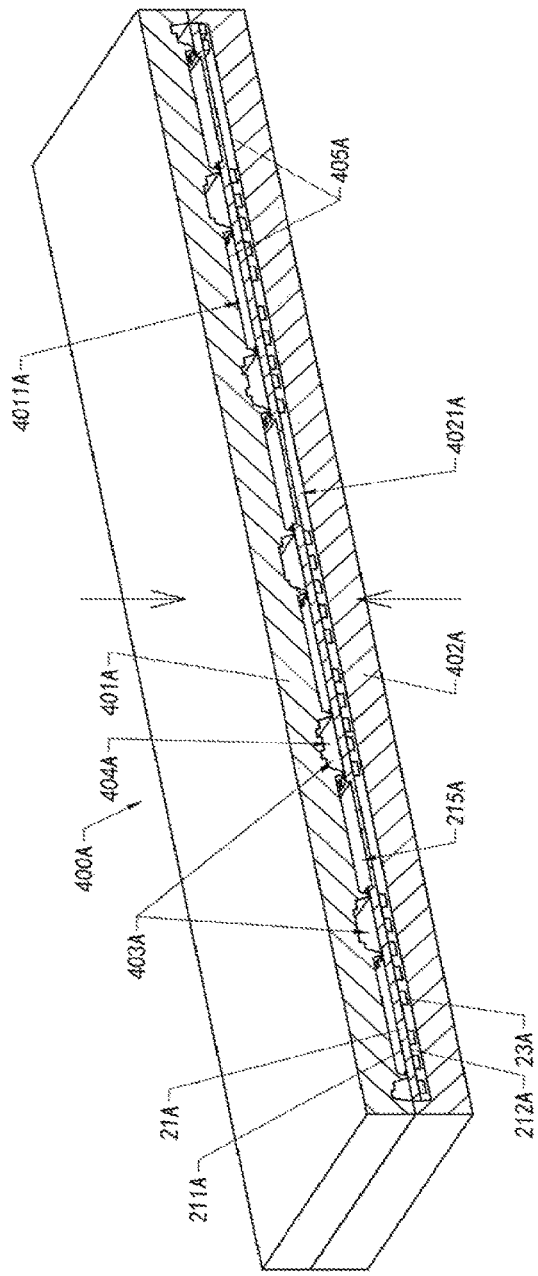
FIG. 78A and FIG. 78B are schematic diagrams of another manufacturing process of the array camera module according to the above preferred embodiment of the present invention.
Figure 78B:
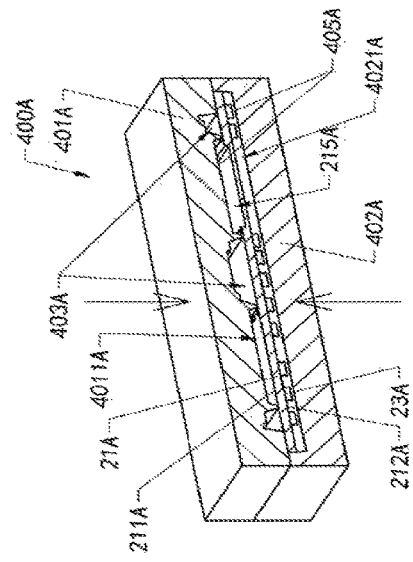

With reference to FIG. 78A to FIG. 78B, the jointed board unit 300A is placed between the upper die 401A and the lower die 402A of the molding die 400A, and at least one molding space 403A is formed between the jointed board unit 300A and the upper die 401A, and the front face 211A of the circuit board 21A of the jointed board unit 300A faces towards the upper die 401A. Preferably, the upper die 401A has at least one upper die yielding space 4011A, wherein after the upper die 401A and the lower die 402A are clamped and the jointed board unit 300A is held between the upper die 401A and the lower die 402A, a circuit board connector protruding from the front face 211A of the circuit board 21A is held in the upper die yielding space 4011A of the upper die 401A to prevent the circuit board connector protruding from the front face 211A of the circuit board 21A from being damaged by the pressure, so that the reliability of the circuit board 21A is ensured during the process of performing a molding process on the jointed board unit 300A. Preferably, after the upper die 401A and the lower die 402A are clamped, at least one communication channel 404A is formed between the upper die 401A and the jointed board unit 300A for communicating the adjacent molding spaces 403A. In addition, the lower die 402A has at least one lower die yielding space 4021A, wherein after the upper die 401A and the lower die 402A are clamped, the back face 212A of the circuit board 21A of the jointed board unit 300A faces towards the lower die 402A, and the electronic component 23A protruding from the back face 212A of the circuit board 21A or a free side exposed to the back face 212A of the circuit board 21A of the electronic component 23A is held in the lower die yielding space 4021A of the lower die 402A so as to prevent the inner surface of the lower die 402A from damaging the electronic component 23A due to contact with the outer surface of the electronic component 23A, so that the reliability of the circuit board 21A and the electronic component 23A is ensured during the process of performing a molding process on the jointed board unit 300A.

With continued reference to FIG. 78A and FIG. 78B, the molding die 400A can also comprise a covering film 405A, wherein the covering film 405A is disposed on the inner surface of the upper die 401A and the inner surface of the lower die 402A in an overlapping manner, so that after the upper die 401A and the lower die 402A are subjected to a clamping operation, the covering film 405 is held between the upper die 401A and the front face 211A of the circuit board 21A and between the lower die 402A and the back face 212A of the circuit board 21A, so that the upper die 401A and the lower die 402A are prevented from damaging the front face 211A and the back face 212A of the circuit board 21A by directly contacting the surfaces of the front face 211A and the back face 212A of the circuit board 21A. Preferably, the covering film 405A is elastic, so that when the upper die 401A and the lower die 042 of the molding die 400A are clamped, the covering film 405A can absorb the impact force generated by the upper die 401A and the lower die 402A due to clamping so as to prevent the impact force from acting on the circuit board 21A, thereby protecting the circuit board 21A.

Figure 81:
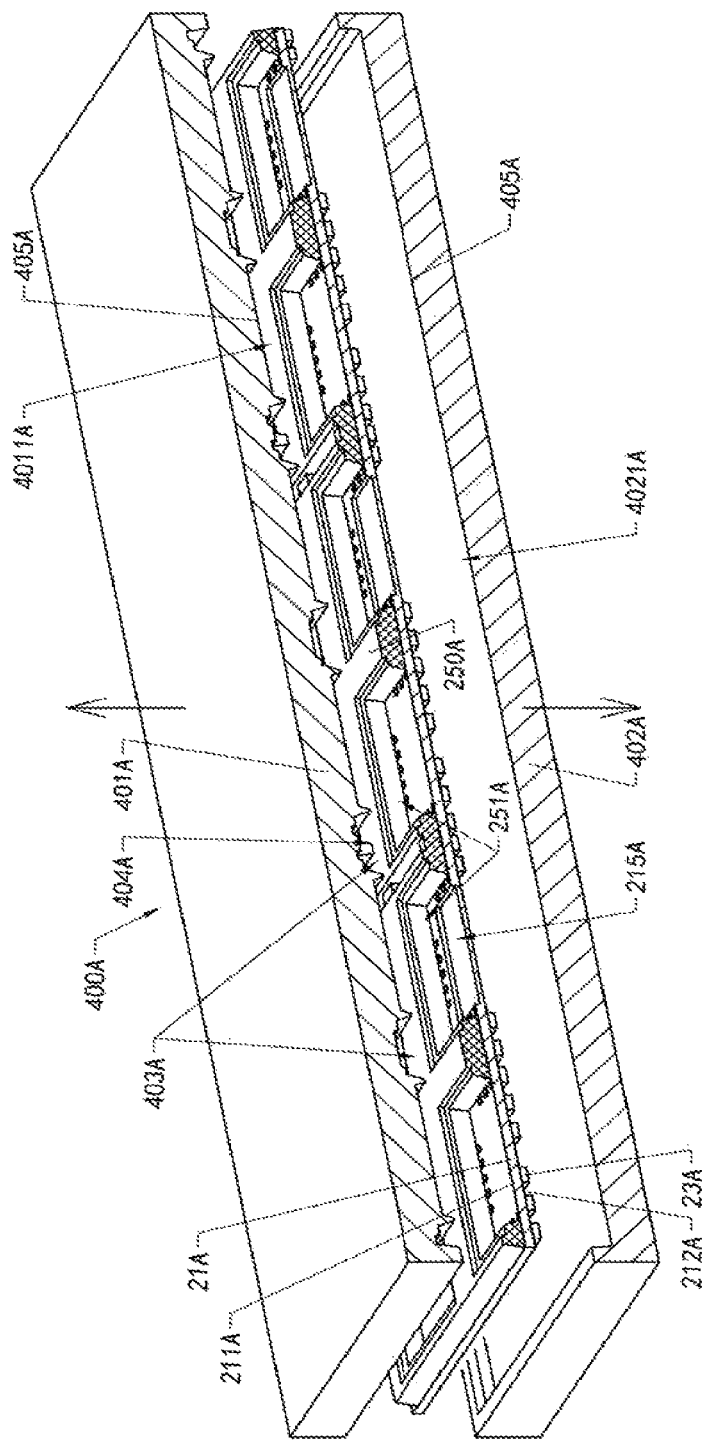
FIG. 81 is a schematic diagram of another manufacturing process of the array camera module according to the above preferred embodiment of the present invention.

With reference to FIG. 79 to FIG. 81, the fluid-state molding material 500A is added into at least one of the molding spaces 403A, wherein the molding material 500A can fill up all of the molding spaces 403A of the molding die 400A through the communication channel 404A, and after the molding material 500A is solidified in the molding space 403A and the molding die 400A is subjected to a demolding operation, an integral molding base 250A that is integrally bonded to the front face 211A of the circuit board 21A, and a plurality of the light windows 251A of the integral molding base 250A are formed at the same time. In the process of performing demolding on the upper die 401A and the lower die 402A, since the covering film 405A can isolate the inner surface of the upper die 401A from the integral molding base 250A, so that the covering film 405A facilitates the upper die 401A being demolded and therefore can prevent the upper die 401A from scratching the surface of the integral molding base 250A, and in particular, the covering film 405A can prevent the upper die 401A from scratching the inner surface of the integral molding base 250A for forming the light window 251A.

It is worth mentioning that the molding material 500A can be, but not limited to, solid particles, liquid, and mixtures of solid particles and liquid.

In addition, at the stage shown in FIG. 78A and FIG. 78B, when the upper die 401A and the lower die 402A of the molding die 400A are clamped, the covering film 405A can prevent, by means of deformation, a gap from being formed between the upper die 401A and the front face 211A of the circuit board 21A, so that at the stage shown in FIG. 79 and FIG. 80, not only can the fluid-state molding material 500A be prevented from entering the upper die yielding space 4011A from the molding space 403A or the communication channel 404A, but also the molding material 500A can be prevented from entering between the upper die 401A and the front face 211A of the circuit board 21A so as to avoid an undesirable phenomenon of "flash".

It is worth mentioning that after performing demolding on the upper die 401A and the lower die 402A, an integral circuit board assembly 200A can be obtained, wherein the integral circuit board assembly 200A comprises the circuit board 21A, the electronic component 23A conductively connected to the circuit board 21A, and the integral molding base 250A integrally bonded to the circuit board 21A.

Figure 82A:
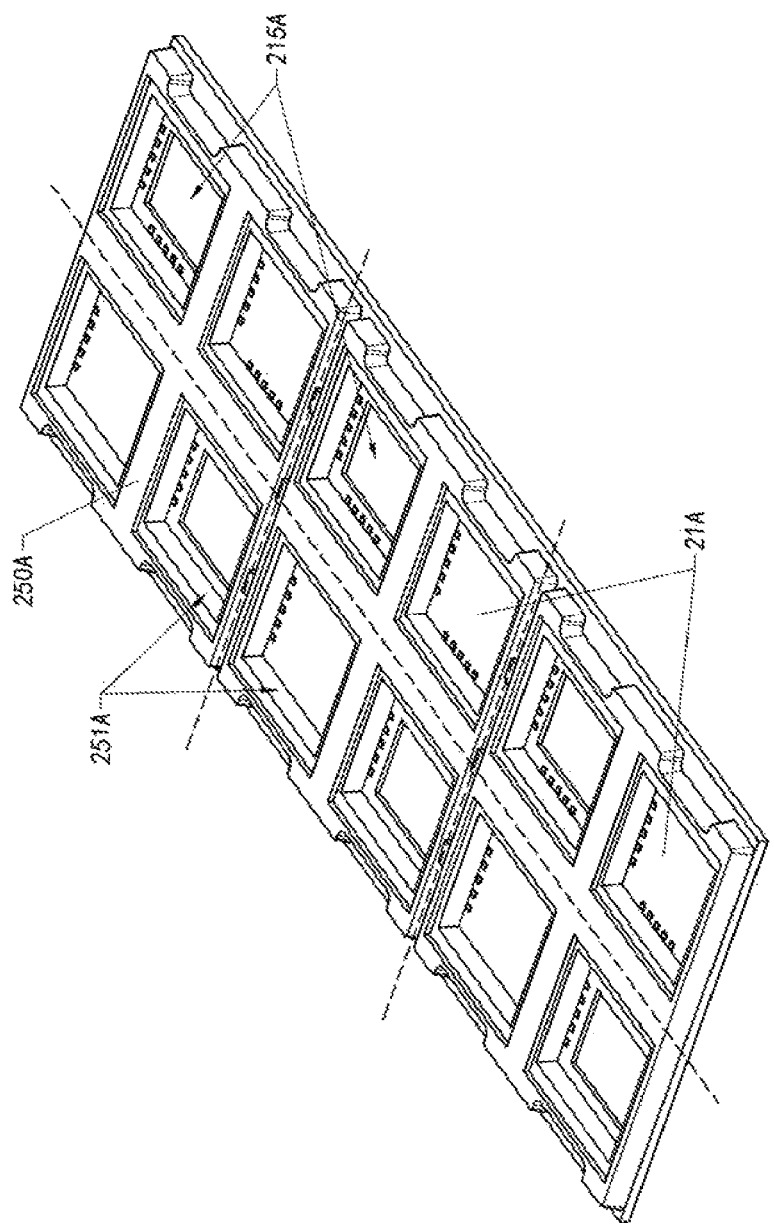
FIG. 82 is a schematic diagram of another manufacturing process of the array camera module according to the above preferred embodiment of the present invention.
Figure 82B:
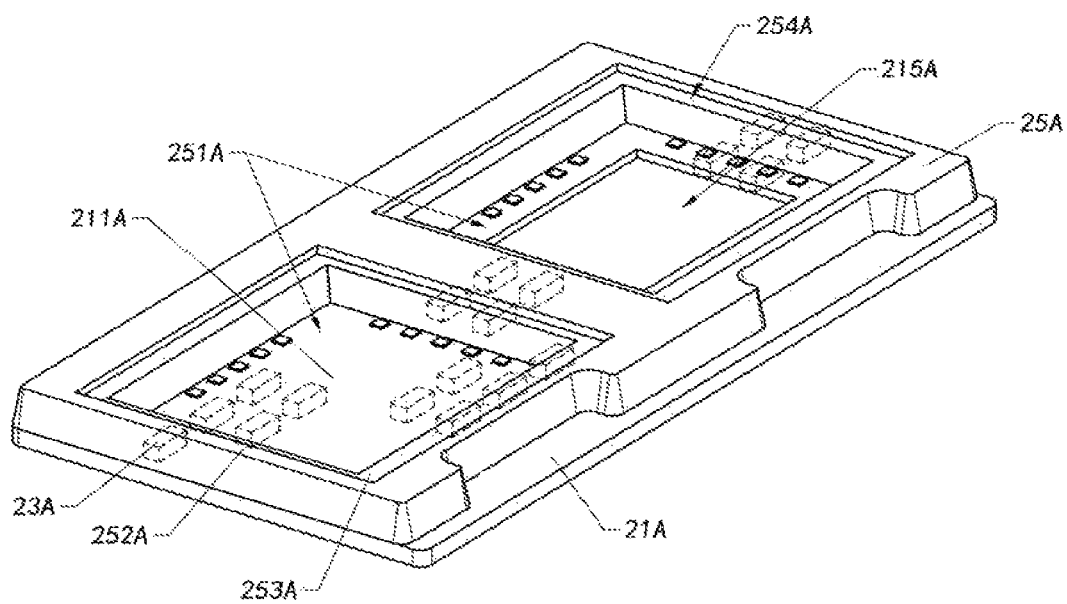

With further reference to the stage shown in FIG. 82A and FIG. 82B, after the integral circuit board assembly 200A is obtained in a manner in which the integral molding base 250A are molded on the jointed board unit 300A by the molding die 400A by a molding process, the circuit board 21A and the integral molding base 250A that constitute the jointed board unit 300A can be divided to obtain a semi-finished product of the circuit board assembly 20A, for example, excessive portions of the circuit board 21A and the integral molding base 250A can be removed by a process such as cutting or etching to obtain the semi-finished product of the circuit board assembly 20A, wherein the integral molding base 250A forms the molding base 25A after divided, and the light window 251A of the integral molding base 250A forms the light window 251A of the molding base 25A.

Figure 83:
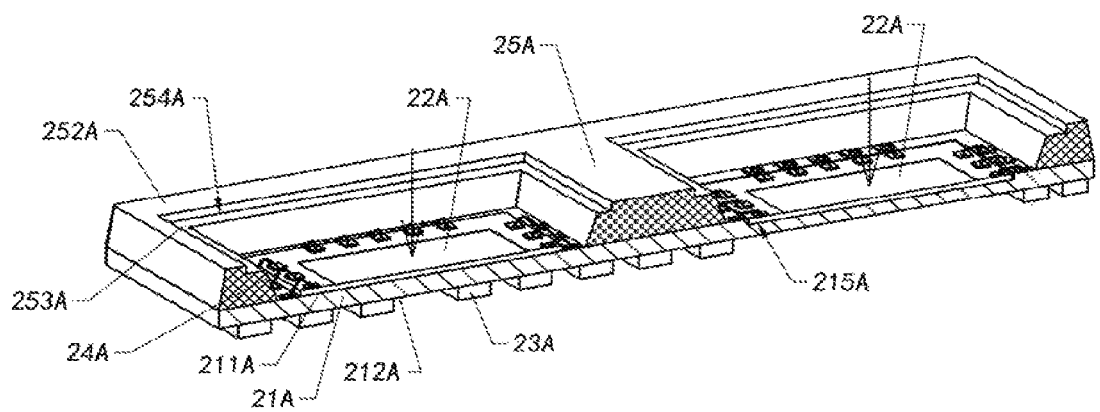
FIG. 83 is a schematic diagram of another manufacturing process of the array camera module according to the above preferred embodiment of the present invention.

At the stage shown in FIG. 83, the photosensitive chip 22A is attached to the front face of the circuit board 21A via the light window 251A of the molding base 25A, and the lead 24A is formed between the chip connector of the photosensitive chip 22A and the circuit board connector of the circuit board 21A by a wiring process so as to obtain the circuit board assembly 20A, wherein the photosensitive area of the photosensitive chip 22A corresponds to the light window 251A of the molding base 25A.

Figure 84:
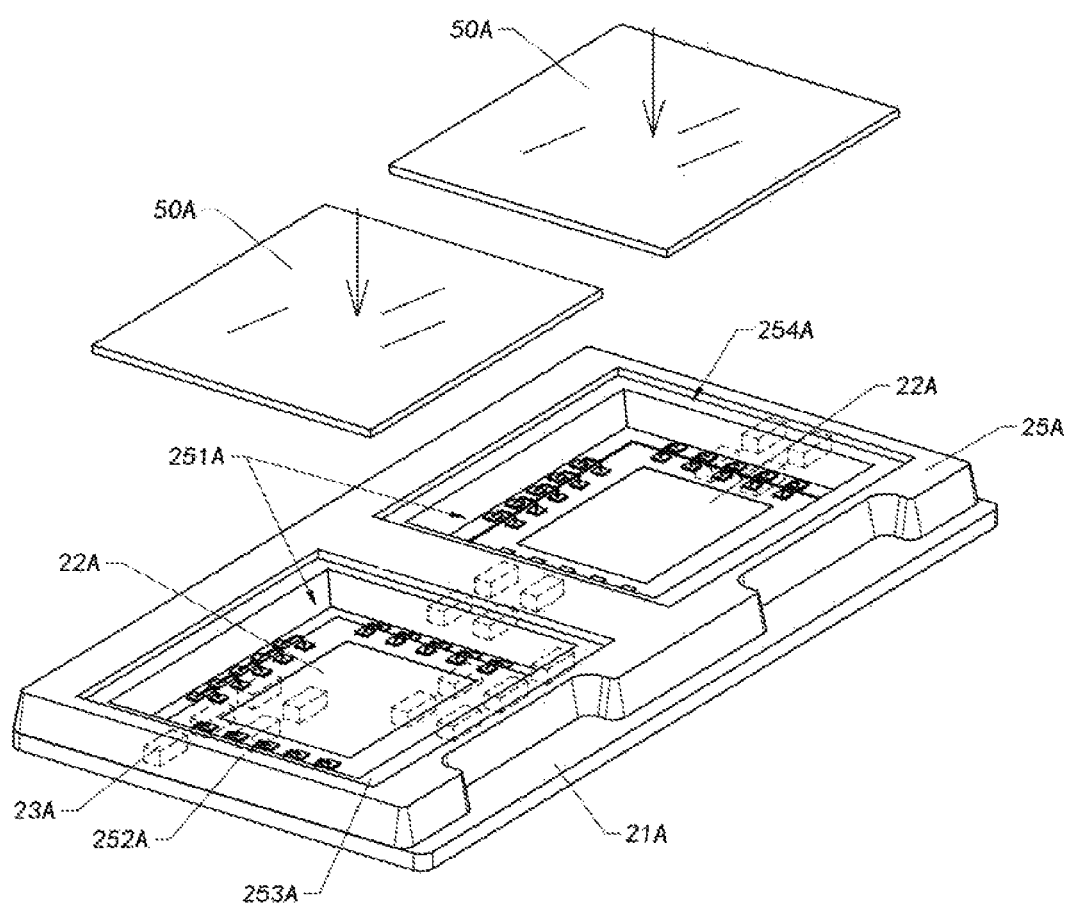
FIG. 84 is a schematic diagram of another manufacturing process of the array camera module according to the above preferred embodiment of the present invention.
Figure 85:
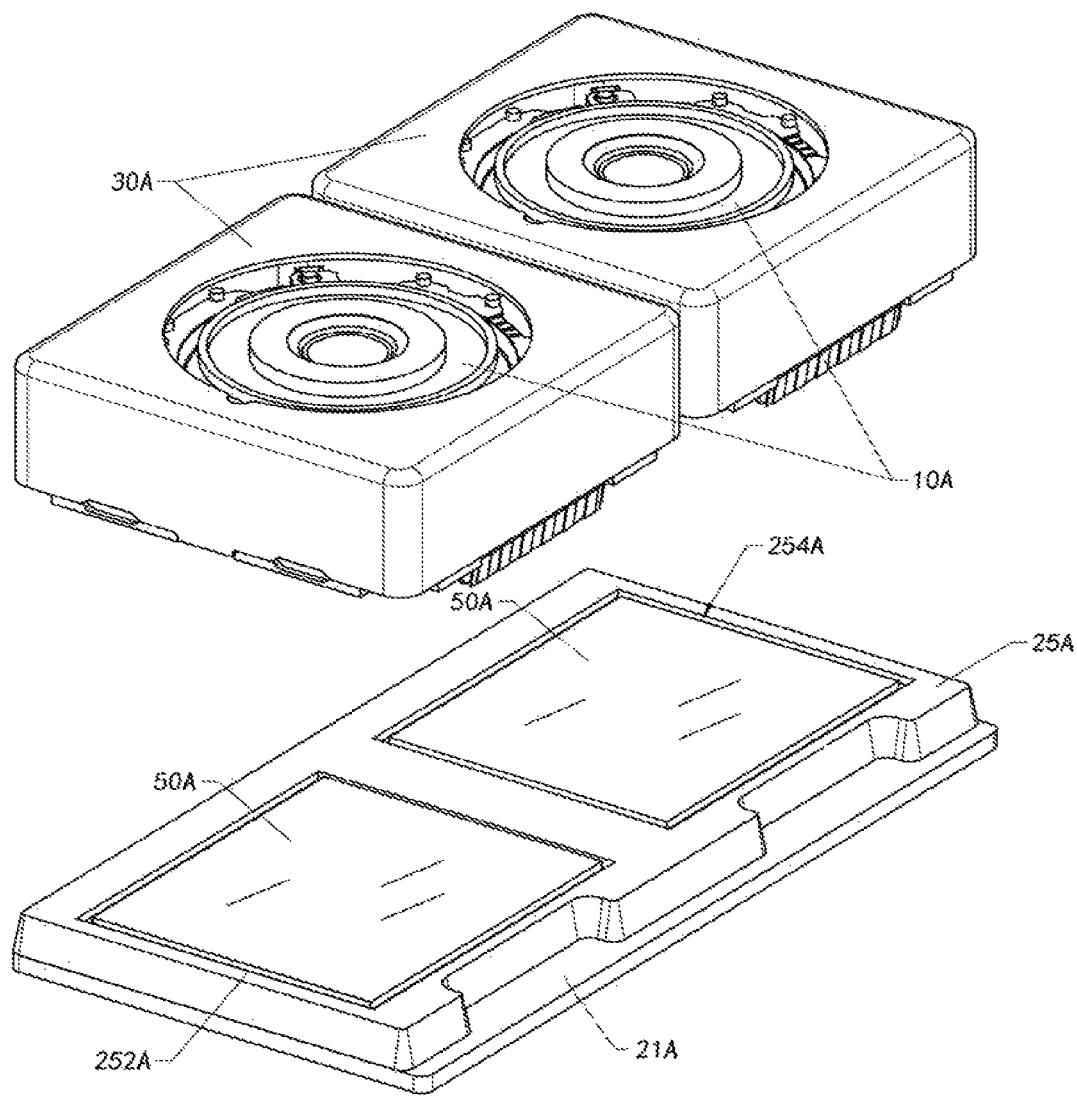
FIG. 85 is a schematic diagram of another manufacturing process of the array camera module according to the above preferred embodiment of the present invention.

With reference to the stage shown in FIG. 84, the filtering element 50A is attached to the inner attaching face 253A of the molding base 25A, so that the filtering element 50A is held in the photosensitive path of the photosensitive chip 22A. At the stage shown in FIG. 85, the driver 30A assembled with the optical lens 10A is attached to the outer attaching face 252A of the molding base 25A, so that the optical lens 10A is held in the photosensitive path of the photosensitive chip 22A, and the filtering element 50A is held between the optical lens 10A and the photosensitive chip 22A.

Figure 86:
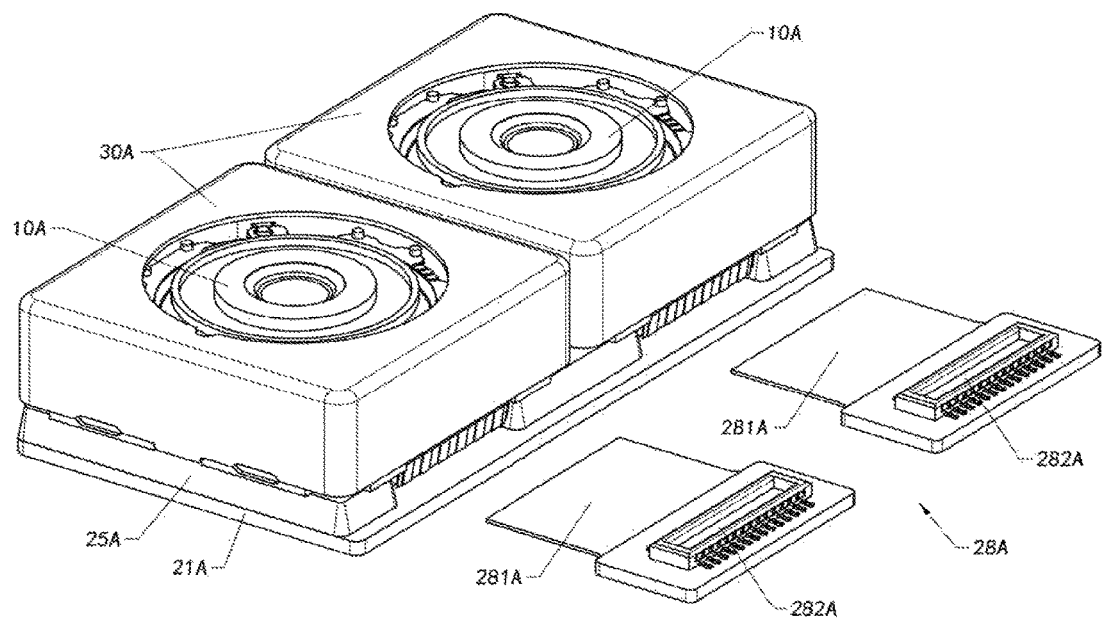
FIG. 86 is a schematic diagram of another manufacturing process of the array camera module according to the above preferred embodiment of the present invention.

Further, the circuit board assembly 20A comprises a connection plate unit 28A, wherein the connection plate unit 28A further comprises at least one connection plate 281A and at least one mounting member 282A that is disposed at a free end of the connection plate 281A, and wherein at the stage shown in FIG. 86, the connection plate 281A of the connection plate unit 28A can be attached to the circuit board 21A, and the circuit board 21A and the connection plate 281A can be made connected. Preferably, the connection plate 281A of the connection plate unit 28A can be deformed, thereby facilitating the subsequent assembling of the array camera module 100A into the electronic device.

It is worth mentioning that although at the stage shown in FIG. 86, the connection plate 281A of the connection plate unit 28A is attached to the back face 212A of the circuit board 21A so as to produce the array camera module 100A. In other possible examples of the array camera module 100A of the present invention, the connection plate 281A of the connection plate unit 28A may also be attached to the front face 211A of the circuit board 21A. Alternatively, the connection plate 281A of the connection plate unit 28A and the circuit board 21A can also be of an integral structure.

It is also worth mentioning that although in this specific example of the array camera module 100A shown in FIG. 86, a connecting end of the connection plate 281A of the connection plate unit 28A is attached in the width direction of the circuit board 21A, so that the connection plate 281A is held in a side portion of the array camera module 100A, in some other examples of the array camera module 100A of the present invention, the connecting end of the connection plate 281A of the connection plate unit 28A can be attached in the length direction of the circuit board 21A, so that the connection plate 281A is held in an end portion of the array camera module 100A. The array camera module 100A of the present invention is not limited in this respect.

Figure 90:
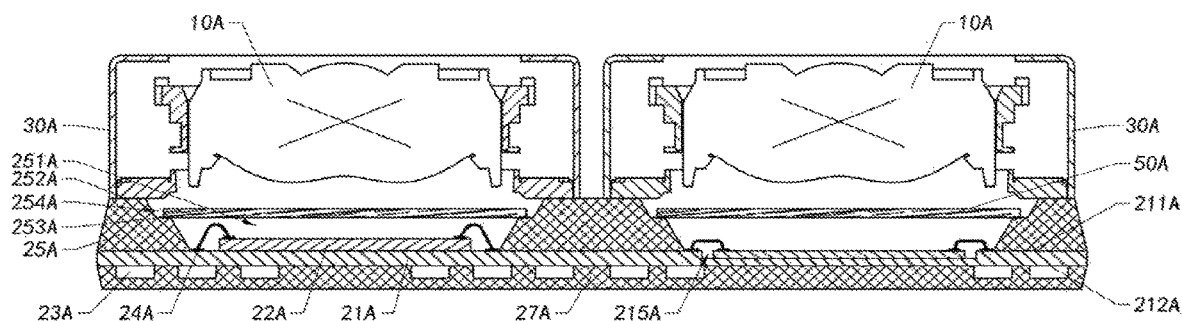
FIG. 90 is a schematic sectional view of another variant implementation of the camera module according to the above preferred embodiment of the present invention.

FIG. 90 shows another variant implementation of the array camera module 100A, which differs from the array camera module 100A shown in FIG. 88 in that in this specific implementation of the array camera module 100A shown in FIG. 90, the circuit board assembly 20A further comprises an embedding portion 27A, wherein the embedding portion 27A is integrally bonded to the back face 212A of the circuit board 21A. Preferably, the embedding portion 27A can embed at least a part of at least one electronic components 23A that protrudes from the back face 212A of the circuit board 21A. More preferably, the embedding portion 27A can embed all of the electronic components 23A which protrude from the back face 212A of the circuit board 21A. In such a manner that the embedding portion 27A embeds the electronic component 23A that protrudes from the back face 212A of the circuit board 21A, in one aspect, the embedding portion 27A can isolate the surface of the electronic component 23A from the external environment to prevent the electronic component 23A from being oxidized; in another aspect, the embedding portion 27A can isolate the adjacent electronic components 23A to prevent the occurrence of mutual interference between the adjacent electronic components 23A; and in a third aspect, since the embedding portion 27A can prevent the occurrence of mutual interference between the adjacent electronic components 23A by isolating the adjacent electronic components 23A, so that the distance between the adjacent electronic components 23A can be shorter, and this way, it facilitates reducing at least one of the length and width of the array camera module 100A, thereby facilitating the miniaturization of the array camera module 100A. In addition, since the embedding portion 27A can prevent the occurrence of mutual interference of the adjacent electronic components 23A by isolating the adjacent electronic components 23A, therefore, in a case where the circuit board 21A provides the same attaching area, the back face 212A of the circuit board 21A can be attached with more and larger electronic components 23A so as to facilitate further improving the imaging capability of the array camera module 100A.

In addition, the embedding portion 27A can further reinforce the circuit board 21A by means of being integrally bonded to the back face 212A of the circuit board 21A, so that the circuit board 21A has better flatness. Since a plurality of the photosensitive chips 22A of the array camera module 100A are all attached to the front face 211A of the circuit board 21A, therefore, ensuring the flatness of the circuit board 21A can improve the parallelism of the photosensitive paths of a plurality of the photosensitive chips 22A, which is very important for ensuring and improving the imaging capability of the array camera module 100A.

It is worth mentioning that the embedding portion 27A may be bonded to the back face 212A of the circuit board 21A in such a manner that the molding base 25A is bonded to the front face 211A of the circuit board 21A. Alternatively, the embedding portion 27A is bonded to the back face 212A of the circuit board 21A while the molding base 25A is bonded to the front face 211A of the circuit board 21A. Also alternatively, after the molding base 25A is bonded to the front face 211A of the circuit board 21A, the embedding portion 27A is bonded to the back face 212A of the circuit board 21A, or the embedding portion 27A is bonded to the back face 212A of the circuit board 21A before the molding base 25A is bonded to the front face 211A of the circuit board 21A. The array camera module 100A of the present invention is not limited in this respect.

Figure 91:
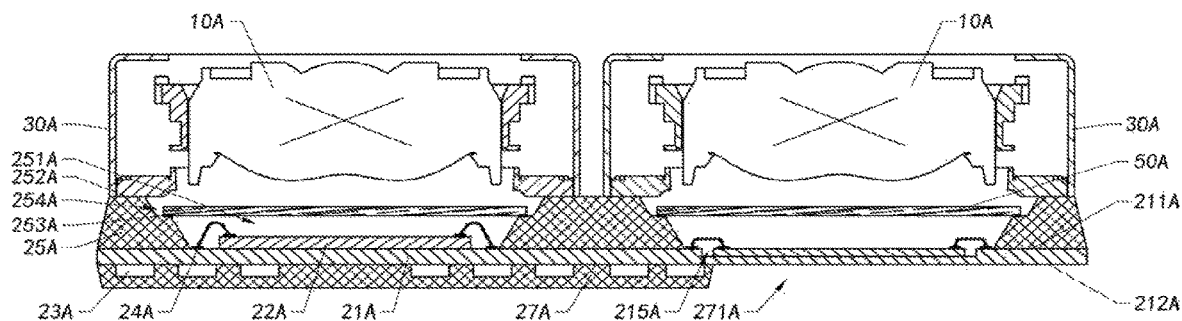
FIG. 91 is a schematic sectional view of another variant implementation of the camera module according to the above preferred embodiment of the present invention.

FIG. 91 shows another variant implementation of the array camera module 100A, which differs from the array camera module 100A shown in FIG. 90 in that in this specific example of the array camera module 100A shown in FIG. 91, the embedding portion 27A is bonded to a part of the back face 212A of the circuit board 21A to form a notch 271A in a middle portion and/or a side portion of the embedding portion 27A, for example, in this specific example of the array camera module 100A shown in FIG. 91, the embedding portion 27A is bonded to one side of the back face 212A of the circuit board 21A, and the notch 271A of the embedding portion 27A is formed on the other side of the back surface 212A of the circuit board 21A. Preferably, the ratio of the area to which the embedding portion 27A is bonded of the back face 212A of the circuit board 21A to the total area of the back face 212A of the circuit board 21A is 1:2, or 2:3. Alternatively, the ratio of the area to which the embedding portion 27A is bonded of the back face 212A of the circuit board 21A to the total area of the back face 212A of the circuit board 21A ranges from greater than or equal to 1:2, and less than or equal to 2:3. Nonetheless, it should be understood by those skilled in the art that the ratio of the area of the back face 212A of the circuit board 21A bonded by the embedding portion 27A to the total area of the back face 212A of the circuit board 21A ranging from greater than or equal to 1:2 and less than or equal to 2:3 disclosed above is only an example, which should not be regarded as limiting the content and scope of the array camera module 100A of the present invention. In other words, the area of the back face 212A of the circuit board 21A embedded by the embedding portion 27A is not limited in the array camera module 100A of the present invention, as long as the embedding portion 27A can embed the electronic component 23A.

Figure 92:
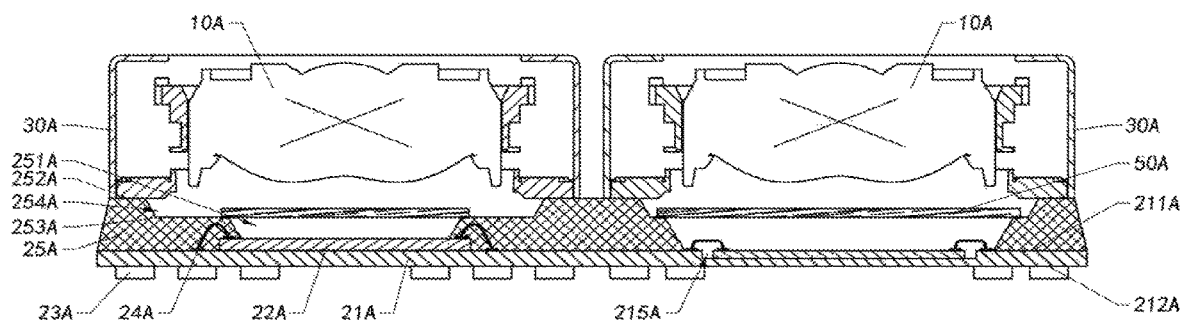
FIG. 92 is a schematic sectional view of another variant implementation of the camera module according to the above preferred embodiment of the present invention.

FIG. 92 shows a variant implementation of the array camera module 100A, which differs from the array camera module 100A shown in FIG. 88 in that in this specific example of the array camera module 100A shown in FIG. 92, the molding base 25A embeds at least one non-photosensitive area of the photosensitive chip 22A. In this way, at least one of the length and width of the array camera module 100A can be further reduced to facilitate the miniaturization of the array camera module 100A. Preferably, the molding base 25A embeds the non-photosensitive area of the photosensitive chip 22A having a higher photosensitive surface, for example, in this specific example of the array camera module 100A shown in FIG. 92, the non-photosensitive area of the photosensitive chip 22A on the left side of the figure is embedded by the molding base 27.

It can be understood by those skilled in the art that in this specific example of the array camera module 100A shown in FIG. 92, the photosensitive chip 22A may be attached to the front face 211A of the circuit board 21A firstly, and then a molding process may be performed on the jointed board unit 300A to which the photosensitive chip 22A is attached so as to obtain the molding base 25A bonded to the front face 212 of the circuit board 21A of the jointed board unit 300A, and the molding base 25A may embed the non-photosensitive area of the photosensitive chip 22A.

It is worth mentioning that in the array camera module 100A of the present invention, by means of embedding the non-photosensitive area of the photosensitive chip 22A through the molding base 25A, the flatness of the photosensitive chip 22A can be ensured by the molding base 25A, so that the flatness of the photosensitive chip 22A can be no longer limited by the flatness of the circuit board 21A, and the molding base 25A can also function to reinforce the circuit board 21A. In this way, even if circuit boards such as a thinner PCB board, an FPC board, and a soft and hard plate is employed for the circuit board 21A, the flatness of the circuit board 21A can be ensured to further reduce the height of the array camera module 100A.

Preferably, the molding base 25A may embed all of the non-photosensitive areas of the photosensitive chip 22A. Therefore, it should be understood by those skilled in the art that the array camera module 100A shown in FIG. 92 is only an example to disclose that the molding base 25A of the array camera module 100A of the present invention can embed the non-photosensitive area of the photosensitive chip 22A, which should not be regarded as the limitation of the content and scope of the array camera module 100A of the present invention.

Figure 93:
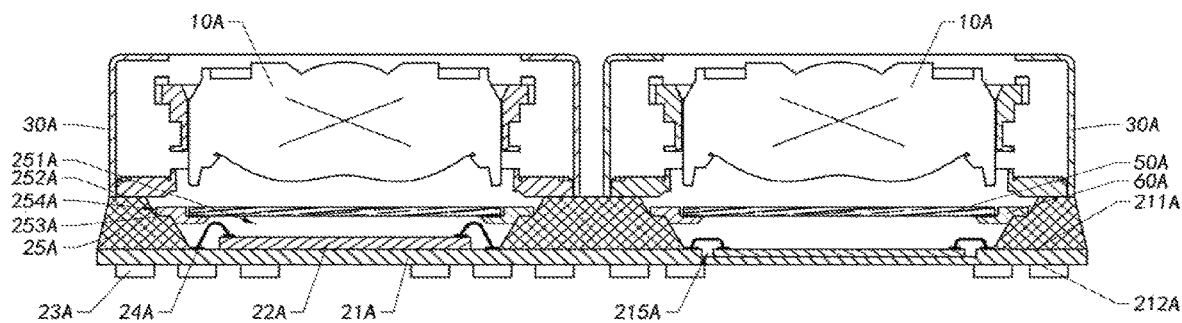
FIG. 93 is a schematic sectional view of another variant implementation of the camera module according to the above preferred embodiment of the present invention.

FIG. 93 shows a variant implementation of the array camera module 100A, which differs from the array camera module 100A shown in FIG. 88 in that in this specific example of the array camera module 100A shown in FIG. 93, the array camera module 100A can further comprise at least one frame-type bracket 60A, wherein the filtering element 50A is attached to the bracket 60A, and the bracket 60A is attached to the inner attaching face 253A of the molding base 25A so as to hold the filtering element 50A in the photosensitive path of the photosensitive chip 22A by the bracket 60A and the molding base 25A. The array camera module 100A of the present invention holds the filtering element 50 in the photosensitive path of the photosensitive chip 22A via the bracket 60A and the molding base 25A by means of attaching the filtering element 50A to the bracket 60A and attaching the bracket 60A to the molding base 25A, which can reduce the length and width of the filtering element 50A so as to reduce the manufacturing cost of the array camera module 100A.

Preferably, the bracket 60A is held in the attaching groove 254A of the molding base 25A, and in this way, the height of the array camera module 100A can be further reduced.

Preferably, a plurality of the filtering elements 50A can be attached to the same bracket 60A as shown in FIG. 93. Alternatively, the number of the filtering elements 50A is the same as the number of the brackets 60A, therefore, each of the filtering elements 50A is attached to each of the brackets 60A respectively, and each of the brackets 60A is attached to the molding base 25A respectively, so that each of the filtering elements 50A is held in the photosensitive path of each of the photosensitive chips 22A respectively by each of the brackets 60A.

Figure 94:
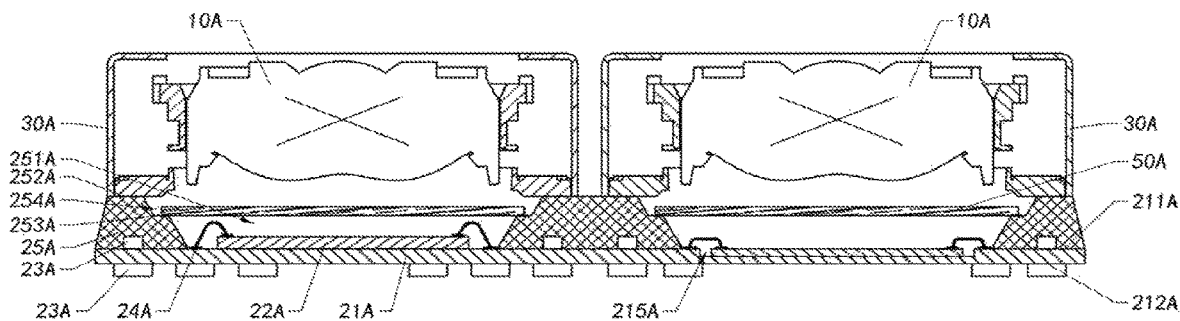
FIG. 94 is a schematic sectional view of another variant implementation of the camera module according to the above preferred embodiment of the present invention.

FIG. 94 shows another variant implementation of the array camera module 100A, which differs from the array camera module 100A shown in FIG. 88 in that in this specific example of the array camera module 100A shown in FIG. 94, a part of the electronic components 23A are attached to the back face 212A of the circuit board 21A, and the other electronic components 23A are attached to the front face 211A of the circuit board 21A, wherein the molding base 25A can embed at least a part of at least one electronic components 23A protruding from the front face 211A of the circuit board 21A. Preferably, the molding base 25A can embed all of the electronic components 23A protruding from the front face 211A of the circuit board 21A, so that the molding base 25A can isolate the electronic component 23A from the external environment to prevent the surface of the electronic component 23A from being oxidized, and isolate the adjacent electronic components 23A so as to avoid an undesirable phenomenon of mutual interference between the adjacent electronic components 23A.

Different from the conventional camera module, in this specific example of the array camera module 100A of the present invention, the array camera module 100A embeds the electronic component 23A in the molding process of the molding base 25A, so that no matter in the height direction or the length and width direction of the array camera module 100A, it is not necessary to reserve a safe distance between the molding base 25A and the electronic component 23A, which facilitates reducing the length and width as well as the height of the array camera module 100A to facilitate the miniaturization of the array camera module 100A.

Figure 95:
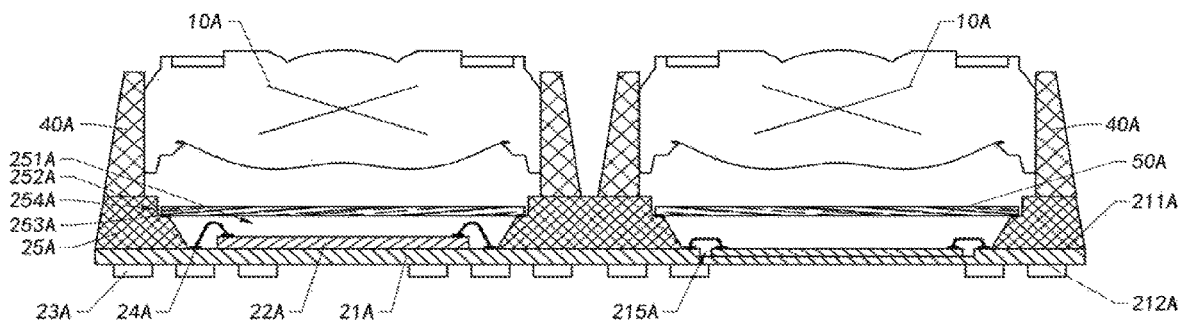
FIG. 95 is a schematic sectional view of another variant implementation of the camera module according to the above preferred embodiment of the present invention.

FIG. 95 shows a variant implementation of the array camera module 100A, which differs from the array camera module 100A shown in FIG. 88 in that there may be no driver 30A in this specific example of the array camera module 100A shown in FIG. 95, and specifically, the array camera module 100A comprises at least two lens tubes 40A, wherein each of the optical lenses 10A is assembled to each of the lens tubes 40A, and each of the lens tubes 40A is attached to the outer attaching face 252A of the molding base 25A respectively in such a manner that each of the optical lenses 10A is held in the photosensitive path of each of the photosensitive chips 22A, respectively. In other words, each of the lens tubes 40A is used to hold each of the optical lenses 10A in the photosensitive path of each of the photosensitive chips 22A, respectively.

Figure 96:
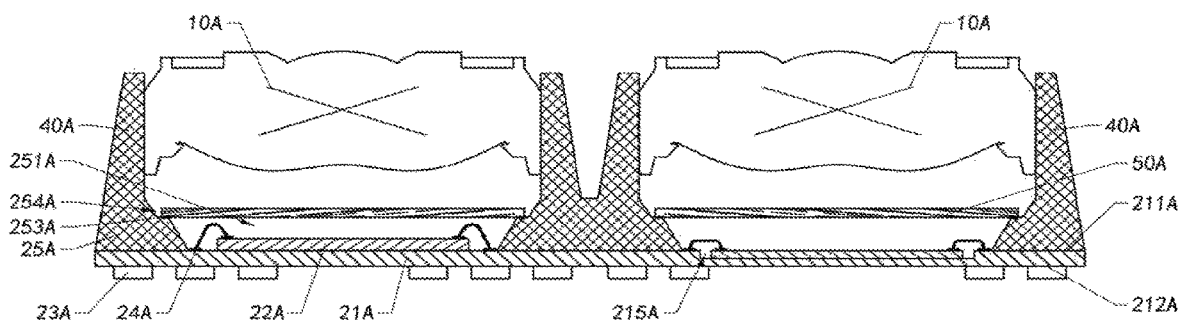
FIG. 96 is a schematic sectional view of another variant implementation of the camera module according to the above preferred embodiment of the present invention.

FIG. 96 shows another variant implementation of the array camera module 100A, which differs from the array camera module 100A shown in FIG. 95 in that in this specific example of the array camera module 100A shown in FIG. 96, each of the lens tubes 40A may be integrally molded with the molding base 25A respectively, that is, each of the lens tubes 40A integrally extends over the molding base 25A, respectively. Preferably, a plurality of the lens tubes 40A may be of an integral structure.

Figure 97:
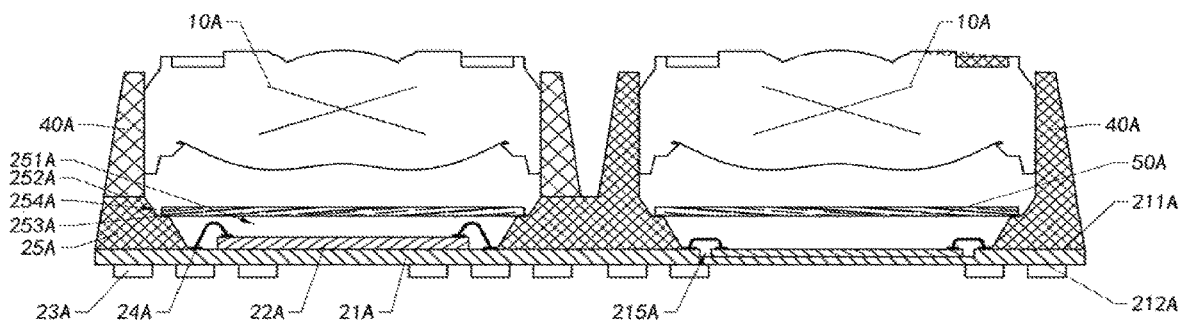
FIG. 97 is a schematic sectional view of another variant implementation of the camera module according to the above preferred embodiment of the present invention.

FIG. 97 shows another variant implementation of the array camera module 100A, which differs from the array camera module 100A shown in FIG. 95 in that in this specific example of the array camera module 100A shown in FIG. 97, at least one of the lens tubes 40A is attached to the molding base 25A and the other lens tubes 40A integrally extend over the molding base 25A, and the lens tube 40A extending over the molding base 25A is adjacent to the lens tube 40A attached to the molding base 25A.

Figure 98:
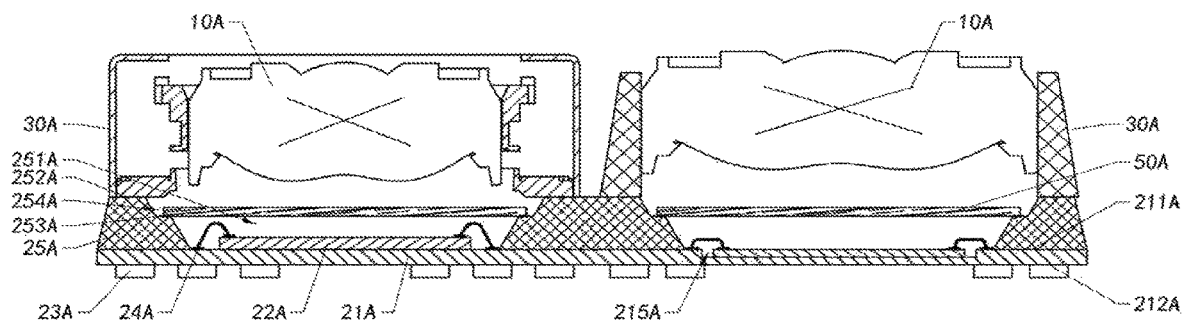
FIG. 98 is a schematic sectional view of another variant implementation of the camera module according to the above preferred embodiment of the present invention.

FIG. 98 shows another variant implementation of the array camera module 100A, which differs from the array camera module 100A shown in FIG. 88 in that in this specific example of the array camera module 100A shown in FIG. 98, at least one driver 30A is attached to the outer attaching face 251 of the molding base 25A, at least one lens tube 40A is attached to the outer attaching face 252A of the molding base 25A, and the driver 30A is adjacent to the lens tube 40A.

Figure 99:
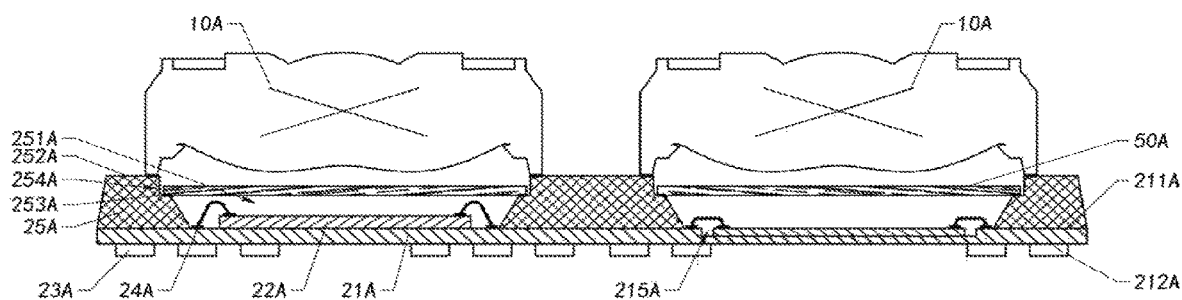
FIG. 99 is a schematic sectional view of another variant implementation of the camera module according to the above preferred embodiment of the present invention.

FIG. 99 shows another variant implementation of the array camera module 100A, which differs from the array camera module 100A shown in FIG. 88 in that in this specific example of the array camera module 100A shown in FIG. 99, each of the optical lenses 10A can be directly attached to the outer attaching face 252A of the molding base 25A, so that each of the optical lenses 10A is held in the photosensitive path of each of the photosensitive chips 22A, respectively.

Figure 100:
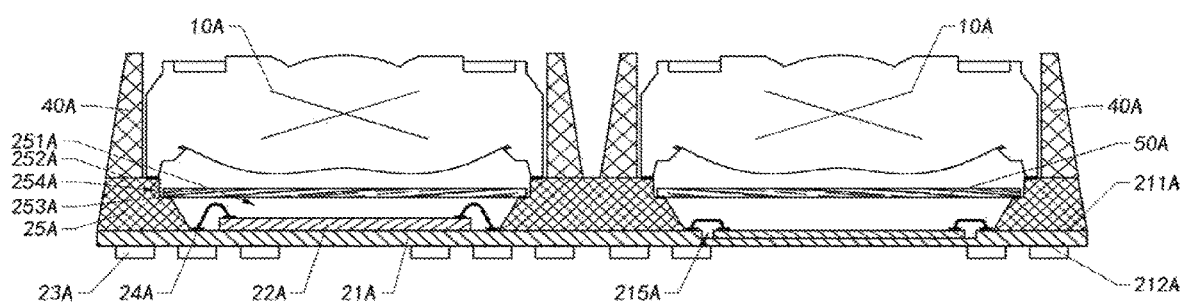
FIG. 100 is a schematic sectional view of another variant implementation of the camera module according to the above preferred embodiment of the present invention.

FIG. 100 shows another variant implementation of the array camera module 100A, which differs from the array camera module 100A shown in FIG. 99 in that in this specific example of the array camera module 100A shown in FIG. 100, each of the lens tubes 40A is attached to the molding base 25A in such a manner that each of the lens tubes 40A surrounds each of the optical lenses 10A respectively, and the optical lens 10A can be not in contact with the inner wall of the lens tube 40A. The array camera module 100A of the present invention can protect the optical lens 10A by surrounding the lens tube 40A around the optical lens 10A so as to prevent the array camera module 100A from being damaged by touching the optical lens 10A during transportation or mounting of the array camera module 100A. Alternatively, each of the lens tube 40A may integrally extend over the molding base 25A, respectively.

Figure 101:
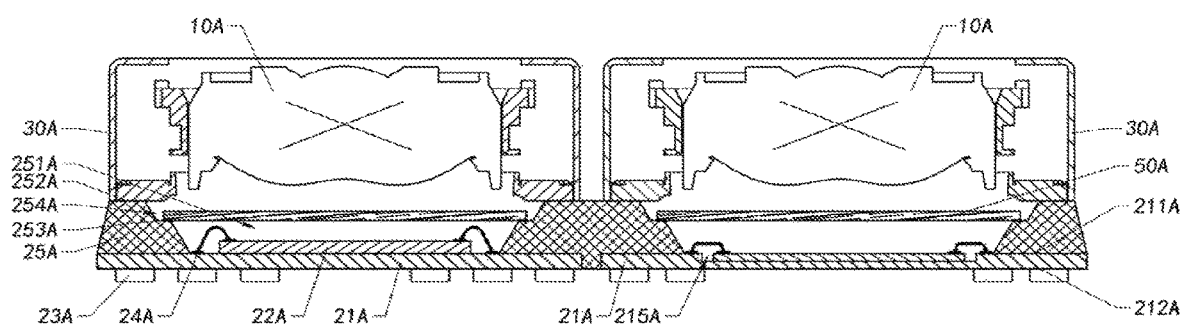
FIG. 101 is a schematic sectional view of another variant implementation of the camera module according to the above preferred embodiment of the present invention.

FIG. 101 shows another variant implementation of the array camera module 100A, which differs from the array camera module 100A shown in FIG. 88 in that the array camera module 100A comprises two or more circuit boards 21A, for example, the number of the circuit boards 21A is the same as the number of the photosensitive chips 22A. Specifically, with reference to FIG. 101, taking the array camera module 100A comprising two photosensitive chips 22A and two circuit boards 21A as an example, the circuit board 21A on the left side of the figure does not have the accommodation space 215A, and the circuit board 21A on the right side of the figure is provided with the accommodation space 215A, wherein the photosensitive chip 22A attached to the circuit board 21A on the right side of the figure is held in the accommodation space 215A of the circuit board 21A, so that the photosensitive surface of the photosensitive chip 22A of the circuit board 21A attached to the left side of the figure and the photosensitive surface of the photosensitive chip 22A of the circuit board 21A attached to the right side of the figure have a height difference.

Figure 102:
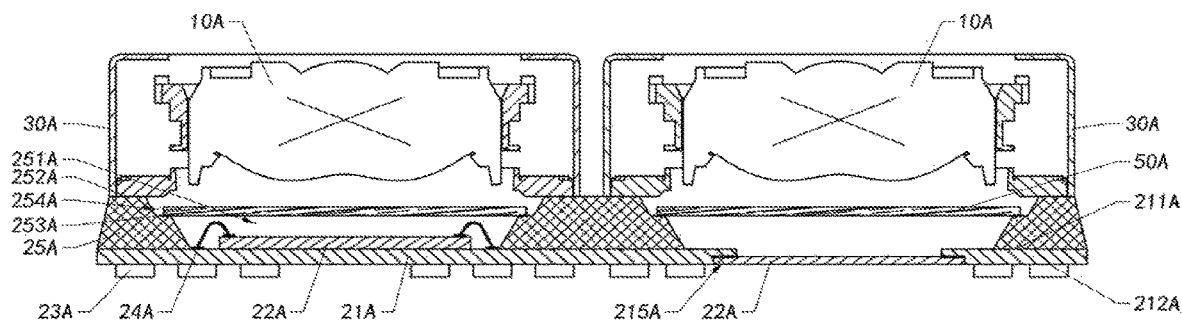
FIG. 102 is a schematic sectional view of another variant implementation of the camera module according to the above preferred embodiment of the present invention.

FIG. 102 shows another variant implementation of the array camera module 100A, which differs from the array camera module 100A shown in FIG. 88 in that the accommodation space 215A of the circuit board 21A is the through hole shaped accommodation space 215A. In this specific example of the array camera module 100A shown in FIG. 102, the content and features of the array camera module 100A are continuously disclosed and illustrated by taking the array camera module 100A comprising two photosensitive chips 22A as an example, wherein the portion of the circuit board 21A on the right side of the figure has the through hole shaped accommodation space 215A, the photosensitive chip 22A on the left side is attached to the front face 211A of the circuit board 21A on the left side, and the photosensitive chip 22A on the right side is attached to the back face 212A of the circuit board 21A on the right side, and the photosensitive area of the photosensitive chip 22A on the right side is exposed to the accommodation space 215A of the circuit board 21A, so that the photosensitive surfaces of the two photosensitive chips 22A have a height difference.

Figure 103:
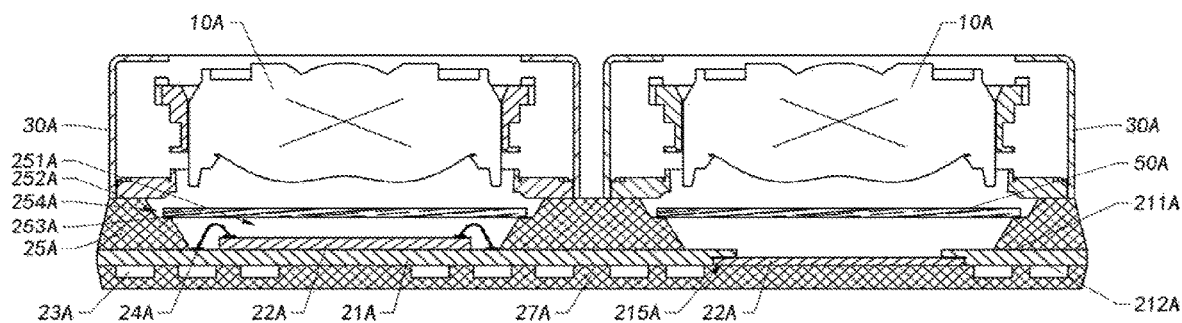
FIG. 103 is a schematic sectional view of another variant implementation of the camera module according to the above preferred embodiment of the present invention.

FIG. 103 shows another variant implementation of the array camera module 100A, which differs from the array camera module 100A shown in FIG. 102 in that in this specific example of the array camera module 100A shown in FIG. 103, the back face 212A of the circuit board 21A further bonded with the embedding portion 27A to embed the electronic component 23A protruding from the back face 212A of the circuit board 21A by the embedding portion 27A. Preferably, the embedding portion 27A may also bonded to at least a part of the back face of the photosensitive chip 22A on the right side of the figure.

Figure 104:
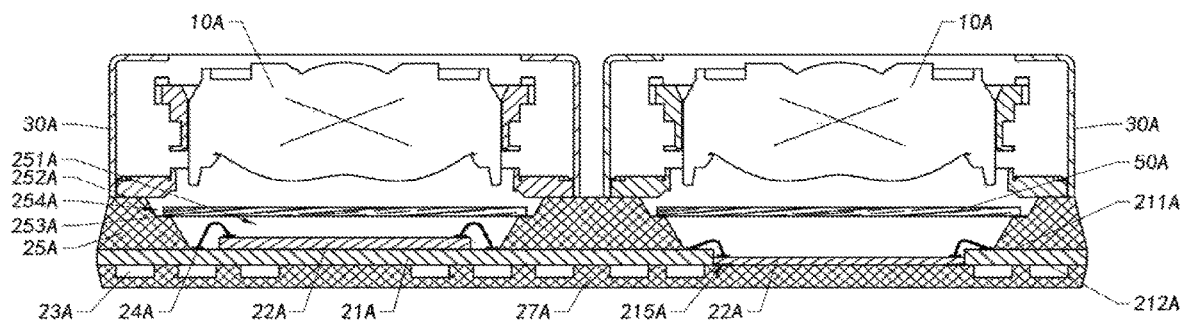
FIG. 104 is a schematic sectional view of another variant implementation of the camera module according to the above preferred embodiment of the present invention.

FIG. 104 shows another variant implementation of the array camera module 100A, which differs from the array camera module 100A shown in FIG. 103 in that in this specific example of the array camera module 100A shown in FIG. 104, the photosensitive chip 22A on the right side may not be attached to the back face 212A of the circuit board 21A, but after the embedding portion 27A is bonded to the back face 212A of the circuit board 21A in such a manner that a part of the embedding portion 27A is held in the accommodation space 215A of the circuit board 21A, the photosensitive chip 22A on the right side is attached to the embedding portion 27A so that the photosensitive surfaces of the two photosensitive chips 22A have a height difference.

It can be understood by those skilled in the art that the above embodiments are merely examples, and the features of different embodiments can be combined with each other to obtain an embodiment which is easily conceived according to the disclosure of the present invention but is not explicitly indicated in the accompany drawings.

It can be understood by those skilled in the art that the embodiments of the present invention described in the above description and the accompanying drawings are by way of example only and do not limit the present invention. The object of the present invention has been achieved completely and effectively. The functions and structural principles of the present invention have been shown and described in the embodiments, and the embodiments of the present invention may be varied or modified without departing from the principles.

The invention claimed is:

1. An array camera module, comprising at least two optical lenses and a circuit board assembly, wherein the circuit board assembly further comprises:
   one circuit board;
   at least two photosensitive chips, wherein at least one of the photosensitive chips is conductively connected to a front surface of the circuit board, and at least one other of the photosensitive chips is accommodated in at least one accommodation space implemented as a through-hole in the circuit board, each of the optical lenses is held in a photosensitive path of each of the photosensitive chips respectively, and there is a height difference between a photosensitive surface of at least one of the photosensitive chips and a photosensitive surface of at least one other of the photosensitive chips;
   at least one electronic component, wherein each of the electronic components is conductively connected to the circuit board respectively, and at least one of the electronic components is located on a back face of the circuit board; and
   an embedding portion which is integrally bonded to the back face of the circuit board,
   wherein the embedding portion is formed by solidifying a fluid-state molding material which is added into a lower molding space between the circuit board and a lower die by filling up the lower molding space through a lower communication channel and performing a demolding operation of the lower die.

2. The array camera module of claim 1, wherein the circuit board assembly further comprises a molding base having at least one light window, wherein the molding base is integrally bonded to the front face of the circuit board and surrounds the photosensitive chip, so that a photosensitive area of the photosensitive chip corresponds to the light window of the molding base.

3. The array camera module of claim 2, wherein the molding base further embeds a non-photosensitive area of the photosensitive chip.

4. The array camera module of claim 2, wherein the embedding portion embeds at least a part of at least one of the electronic components that protrudes from the back face of the circuit board.

5. The array camera module of claim 4, wherein at least one notch is disposed in a middle portion and/or a side portion of the embedding portion.

6. The array camera module of claim 4, wherein the ratio of the area to which the embedding portion is bonded of the back face of the circuit board to the total area of the back face of the circuit board is greater than or equal to 1:2 and is less than or equal to 2:3.

7. The array camera module of claim 4, wherein the molding base is integrally bonded to the front face of the circuit board at the same time when the embedding portion is integrally bonded to the back face of the circuit board.

8. The array camera module of claim 4, wherein the molding base is bonded to the front face of the circuit board after the embedding portion is integrally bonded to the back face of the circuit board.

9. The array camera module of claim 1, wherein the circuit board assembly further comprises a molding base having at least one light window and a lens frame having at least one light through hole, wherein the molding base is integrally bonded to the front face of the circuit board and surrounds at least one of the photosensitive chips, so that a photosensitive area of the photosensitive chip corresponds to the light window of the molding base, and wherein the lens frame is attached to the front face of the circuit board and surrounds other photosensitive chips, so that photosensitive areas of the other photosensitive chips correspond to the light through hole of the lens frame, and the molding base is adjacent to the lens frame.

10. The array camera module of claim 1, wherein the embedding portion is integrally bonded to the back face of each of the circuit board and a part of which is exposed to the accommodation space of the circuit board, wherein at least one of the photosensitive chips is attached to the front face of the circuit board, and at least one other of the photosensitive chips is attached to the embedding portion via the accommodation space of the circuit board, so that there is a height difference between a photosensitive surface of at least one of the photosensitive chips and a photosensitive surface of other photosensitive chips.

11. An electronic device, comprising:
   an electronic device body; and
   at least one array camera module according to claim 1, wherein the array camera module is disposed in the electronic device body.

12. The electronic device of claim 11, wherein the electronic device is a smart phone.

13. The electronic device of claim 12, wherein the array camera module is a front-facing camera module of the smart phone, or the array camera module is a rear-facing camera module of the smart phone.

* * * * *